United States Patent
Ueno et al.

(10) Patent No.: US 8,538,455 B2
(45) Date of Patent: Sep. 17, 2013

(54) STORAGE MEDIUM STORING RELAY CONTROL PROGRAM, RELAY SERVER DEVICE, AND RELAY CONTROL METHOD

(75) Inventors: Hitoshi Ueno, Kawasaki (JP); Kenichi Abiru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 294 days.

(21) Appl. No.: 13/169,412

(22) Filed: Jun. 27, 2011

(65) Prior Publication Data

US 2012/0034906 A1    Feb. 9, 2012

(30) Foreign Application Priority Data

Aug. 5, 2010    (JP) ................................. 2010-176668

(51) Int. Cl.
*H04W 24/00* (2009.01)
(52) U.S. Cl.
USPC .............. 455/456.1; 455/456.2; 455/456.3; 455/456.4; 455/456.5; 455/456.6
(58) Field of Classification Search
USPC .......................................... 455/456.1–456.6
See application file for complete search history.

(56) References Cited

U.S. PATENT DOCUMENTS

| | | | |
|---|---|---|---|
| 7,003,288 B2 | 2/2006 | Ueda et al. | |
| 2002/0183070 A1* | 12/2002 | Bloebaum et al. | 455/456 |
| 2005/0181805 A1* | 8/2005 | Gallagher | 455/456.1 |
| 2006/0121916 A1* | 6/2006 | Aborn et al. | 455/456.5 |
| 2008/0085727 A1* | 4/2008 | Kratz | 455/456.5 |
| 2008/0108319 A1* | 5/2008 | Gallagher | 455/404.2 |
| 2008/0318596 A1* | 12/2008 | Tenny | 455/456.2 |
| 2009/0176483 A1* | 7/2009 | Ki | 455/414.3 |
| 2010/0332326 A1* | 12/2010 | Ishai | 705/14.58 |

FOREIGN PATENT DOCUMENTS

| | | |
|---|---|---|
| JP | 2006-196008 A | 7/2006 |
| WO | WO-02/31441 A | 4/2002 |

* cited by examiner

*Primary Examiner* — Nathan Mitchell
(74) *Attorney, Agent, or Firm* — Fujitsu Patent Center

(57) ABSTRACT

A relay server receives from a mobile terminal a delivery request to a delivery server device that provides an application to the mobile terminal. The relay server obtains position information of the mobile terminal from a representative device connected to a position managing server that holds the position information of the mobile terminal. The relay server transmits the position information of the mobile terminal obtained from the representative device to a relay device that relays a communication to inquire about the position information of the mobile terminal to the representative device. The relay server updates the position information obtained from the representative device with the position information received from the relay device when the position information of the mobile terminal is received from the relay device. The relay server transfers the received delivery request to the delivery server device identified based on the updated position information.

13 Claims, 46 Drawing Sheets

FIG. 4

| USER ID | POSITION |
|---------|----------|
| ALICE   | AREA A   |
| BOB     | AREA B   |

FIG. 5

| USER ID | NODE TYPE | ADDRESS |
|---|---|---|
| ALICE TOM | REPRESENTATIVE NODE | 10.10 |
| ALICE TOM | RELAY NODE | 10.11 |

FIG. 6

| MESSAGE ADDRESS | POSITION | DELIVERY SERVER ADDRESS |
|---|---|---|
| cs.fj.jp | AREA A | host1.fj.com |
| cs.fj.jp | AREA B | host22.fj.com |

FIG. 7

```
71 { GET/ad.index HTTP/1.1
     Cookie: userid=Tom
     Accept: image/gif, image/jpeg, */*
72 { Accept-Language: ja
     User-Agent: aaa
     Host: cs.fj.jp
     Connection: Keep-Alive
```

FIG. 9

| USER ID | INQUIRY SOURCE ADDRESS |
|---------|------------------------|
| ALICE   | 10.2                   |

FIG. 10

| USER ID | POSITION |
|---------|----------|
| ALICE   | AREA A   |

FIG. 11

| USER | NODE TYPE | ADDRESS |
|---|---|---|
| ALICE TOM | POSITION MANAGING SERVER | 11.10 |
| BOB | RELAY NODE | 10.12 |

FIG. 29

| USER ID | POSITION | REFERENCE TIME |
|---------|----------|----------------|
| ALICE   | AREA A   | 13:10:11       |
| BOB     | AREA B   | 13:31:23       |

FIG. 30

| PARAMETER | VALUE |
|---|---|
| CACHE DISCARDING TIME | ONE HOUR |

FIG. 35

| USER ID | NODE TYPE | SYSTEM | ADDRESS |
|---|---|---|---|
| ALICE TOM | REPRESENTATIVE NODE | - | 10.10 |
| ALICE TOM | RELAY NODE | MAIN | 10.11 |
| ALICE TOM | RELAY NODE | SUB | 10.40 |

STORAGE MEDIUM STORING RELAY CONTROL PROGRAM, RELAY SERVER DEVICE, AND RELAY CONTROL METHOD

CROSS-REFERENCE TO RELATED APPLICATIONS

This application is based upon and claims the benefit of priority of the prior Japanese Patent Application No. 2010-176668, filed on Aug. 5, 2010, the entire contents of which are incorporated herein by reference.

FIELD

The embodiments discussed herein are related to a storage medium storing a relay control program, a relay server device, and a relay control method.

BACKGROUND

Conventionally, in the case that a user of a mobile terminal uses an application that has been stored in a delivery server, the mobile terminal uses a relay system to request delivery of applications or the like from the nearest delivery server to the device itself.

Such a relay system has a mobile terminal, delivery server, position managing server, and intermediate node that are mutually connected via the Internet or the like. The mobile terminal is a cellular phone, for example, and obtains the application from the delivery server and executes the application. The delivery server stores an application for example, and delivers the stored application to the mobile terminal according to a delivery request from the mobile terminal. The position managing server obtains position information of the terminal via a base station, for example. The intermediate node receives a delivery request message received from the mobile terminal, and transfers the delivery request message to the delivery server existing nearest to the mobile terminal.

The flow of the mobile terminal obtaining the application from the delivery server in such a system will be described. The intermediate node receives a delivery request message wherein a user ID which has been assigned individually to the mobile terminal is stored. Next, the intermediate node transmits the user ID stored in the received delivery request message to the position managing server and obtains the position information of the mobile terminal, and based on the obtained position information, transfers the delivery request message to the delivery server nearest to the mobile terminal.

The delivery server responds to the received delivery request message via the intermediate node, and delivers the application to the mobile terminal. Accordingly, by using such a relay system, the mobile terminal can request delivery of an application from the delivery server nearest the device itself, and can obtain the requested application.

Now, with an intermediate node which thus relays a delivery request message, in the case that multiple intermediate nodes simultaneously request the position information of the mobile terminal to be obtained from the position managing server, the load on the position managing server increases greatly. Consequently, time for application delivery to the user may increase, or the delivery request message may not be transferred to the correct delivery server.

With regard to the increase of load to the position managing server which can occur in this case, the load on the position managing server has been reduced by relay control nodes between the intermediate nodes and the position managing server. This will be described with reference to the specific example shown in FIG. 45.

FIG. 45 is a diagram showing an example of a relay system to reduce the load to the position managing server by providing relay control node. As shown in FIG. 45, the relay system has mobile terminals A through C, intermediate nodes, relay control nodes, and a position managing server. Of these, the mobile terminals A through C and the position managing server have functions similar to the above-described mobile terminal and position managing server. The relay control node has representative nodes and relay nodes, which are configured in tree form. The representative nodes can inquire about position information of the mobile terminal from the position managing server. The intermediate nodes, in the case of receiving a request for position information of the mobile terminal from the relay node, inquire about position information of the mobile terminal from the representative node.

For example, in the case of the intermediate node A inquiring about position information from the position managing server, position information is inquired in the order of relay node A, relay node B, and representative node A. Also, in the case of the intermediate node B inquiring about position information from the position managing server, position information is inquired in the order of relay node C and representative node A. Also, in the case of the intermediate node C inquiring about position information from the position managing server, position information is inquired in the order of relay node D and representative node B. That is to say, the relay system restricts the access to the position managing server to the representative node A and representative node B, thereby reducing load on the position managing server.

Also, the relay system causes the relay nodes to cache the position information, and in the case of receiving inquiries from a downstream node, respond if there is any applicable mobile terminal information, whereby the load on the position managing server can also be reduced. This will be described using the specific example shown in FIG. 46.

FIG. 46 is a diagram showing an example of reducing the load on the position managing server by causing relay nodes to cache position information. As shown in FIG. 46, the relay nodes have caches, whereby position information can be stored. For example, in the case of receiving an inquiry about position information of the mobile terminal from the relay node A, if there is any position information of the mobile terminal in the cache, the relay node A obtains the position information from the cache and notifies the intermediate node A of the position information. Also, if there is no position information of the mobile terminal, the relay node A inquires about position information of the mobile terminal from the relay node B.

However, according to the above-described conventional techniques, there is a problem in that accurate position information of the mobile terminal requesting delivery of the application cannot be obtained in a short amount of time. Specifically, in the case that the relay system has the representative nodes and the relay nodes configured in tree form, the number of routes increases as the number of nodes increases, thereby increasing the time to inquire about mobile terminal position information.

Similarly, in the case of causing the relay node to cache the terminal position information, if there is no terminal position information in either of the relay node caches, the relay system has to obtain the terminal position information from the position managing server. In this case, the waiting time until the terminal position information is obtained is no different from the case of not providing a cache.

Also, with such a relay system, there are cases wherein the mobile terminal moves from the time that the mobile terminal position information is obtained until the time that the delivery request message is transferred to the delivery server identified by the obtained mobile terminal position information. In this case, the delivery request message is transferred, not to the delivery server identified by the position information of the mobile terminal after having moved, but the delivery server identified by the position information of the mobile terminal before moving. That is to say, with the relay system, in the case that the delivery server identified based on the position information before moving and the delivery server identified based on position information after moving are different, the delivery request message cannot be transferred to the delivery server to which transfer should be made. Consequently, an irregular situation may occur, such as the application not being delivered to the mobile terminal.

SUMMARY

According to an aspect of the invention, a relay server receives from a mobile terminal a delivery request to a delivery server device that provides an application to the mobile terminal. The relay server obtains position information of the mobile terminal from a representative device connected to a position managing server that holds the position information of the mobile terminal when the delivery request is received. The relay server transmits the position information of the mobile terminal obtained from the representative device to a relay device that relays a communication to inquire about the position information of the mobile terminal to the representative device. The relay server updates the position information obtained from the representative device with the position information received from the relay device when the position information of the mobile terminal is received from the relay device. The relay server transfers the received delivery request to the delivery server device identified based on the updated position information.

The object and advantages of the invention will be realized and attained by at least the features, elements, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 4 is a diagram illustrating an example of information stored as a position information cache table according to the first embodiment;

FIG. 5 is a diagram illustrating an example of information stored as an higher order node storage table according to the first embodiment;

FIG. 6 is a diagram illustrating an example of information stored as an assignment destination server storage table according to the first embodiment;

FIG. 7 is a diagram illustrating an example of a delivery request message that the delivery request message receiving unit receives from a portable terminal according to the first embodiment;

FIG. 9 is a diagram illustrating an example of information stored as an inquiry source storage table according to the first embodiment;

FIG. 10 is a diagram illustrating an example of information stored as a position information cache table according to the first embodiment;

FIG. 11 is a diagram illustrating an example of information stored as an higher order node storage table according to the first embodiment;

FIG. 29 is a diagram illustrating an example of information stored as a position information cache table according to the fourth embodiment;

FIG. 30 is a diagram illustrating an example of information stored as an operation settings storage table according to the fourth embodiment;

FIG. 35 is a diagram illustrating an example of information stored as an higher order node storage table according to a fifth embodiment;

DESCRIPTION OF EMBODIMENTS

Embodiments of the control program, relay server device and relay control method disclosed by the present application will be described based on the drawings. Note that the present invention is not restricted by these embodiments.

First Embodiment

Configuration of System According to First Embodiment

Figure 1:
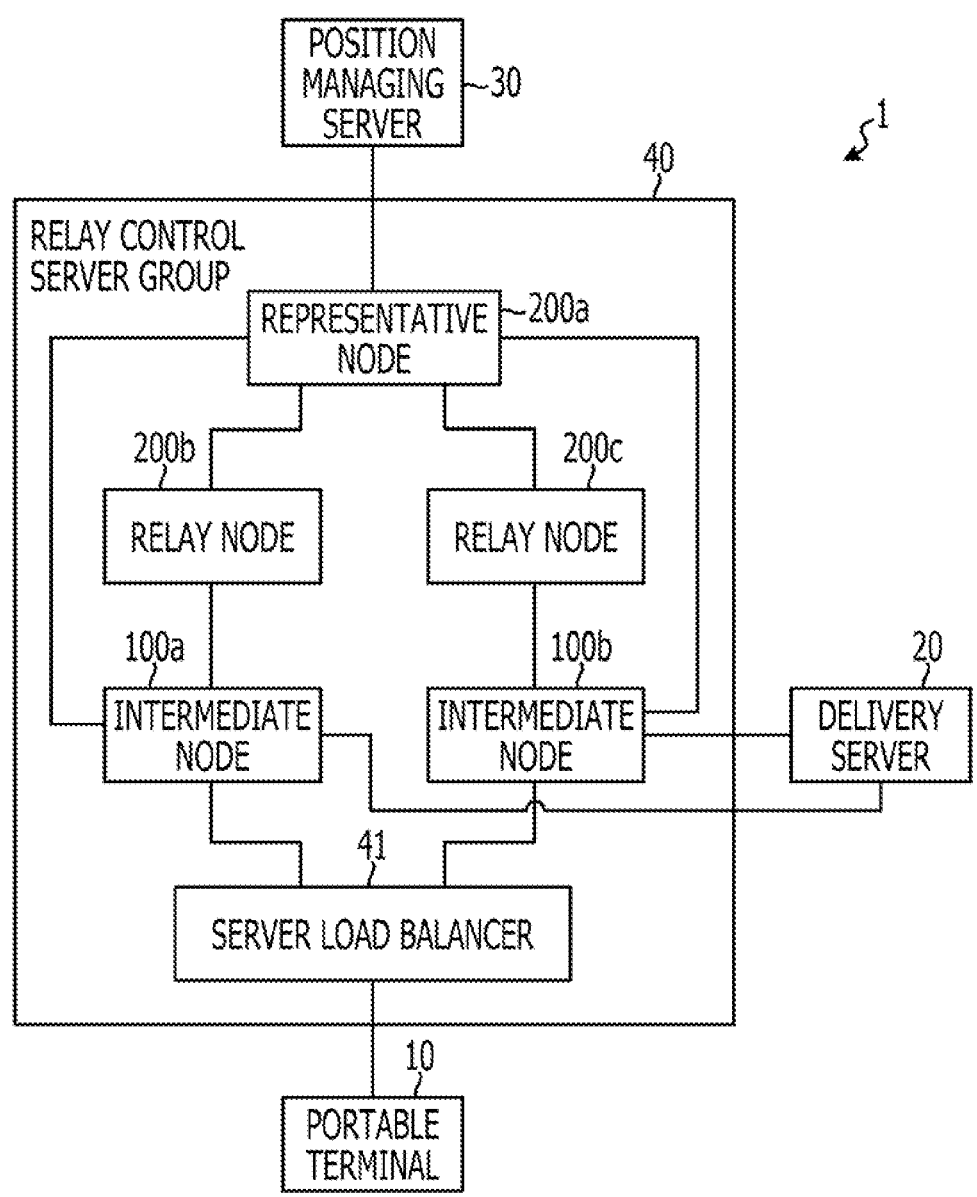
FIG. 1 is a diagram illustrating a relay system according to a first embodiment.

First, a system configuration of a relay system 1 including a relay device relating to a first embodiment will be described. FIG. 1 is a diagram illustrating a system configuration of the relay system 1 including a relay device relating to the first embodiment. As shown in FIG. 1, the relay system 1 connects a portable terminal 10, delivery server 20, position managing server 30, and relay control server group 40, via a network.

The portable terminal 10 is a terminal which, in the case of accepting execution of an application from a user, transmits a delivery request message to a delivery server 20 via a relay control server group 40. The portable terminal 10 is portable communication terminal such as a smart phone, personal computer, PDA (Personal Digital Assistant), PHS (Personal Handy-phone System), or cellular phone.

The delivery server 20 is a server device that stores applications and the like, and accepts access from a terminal used by a user who has obtained a public address assigned from a communication carrier, and delivers the requested application to the terminal.

The position managing server 30 stores position information of a base station on a wireless network or networking equipment such as an ADSL (Asymmetric Digital Subscriber Line) modem or the like on a cable network. The position managing server 30 accepts a notification of an address and user name of the portable terminal 10 connected to the networking equipment from the networking equipment. The position managing server 30 identifies the position of the portable terminal 10 by the position information of the networking equipment, in other words the position of the base station used by the portable terminal 10, and correlates and stores the address, user name, and position information of the portable terminal 10.

Upon accepting an inquiry for position information of the portable terminal 10 from the relay control server group 40, with a user ID as a key, the position managing server 30 notifies the relay control server group 40 of the position information that is correlated to the user ID and stored. Also, upon accepting to transmit a request to notify that the position of the portable terminal 10 has changed, with a user ID as a key, from the relay control server group 40, the position managing server 30 transmits a position update notification to the relay control server group 40 each time the position information of the applicable user ID changes.

The relay control server group 40 receives a delivery request message to transmit in the event of the portable terminal 10 requesting to obtain an application, and identifies a user ID from the received message. The relay control server group 40 obtains the position information of the portable terminal 10 from the position managing server 30 using the identified user ID, and transfers the delivery request message to the delivery server 20 nearest the obtained portable terminal 10.

Configuration of Position Managing Server According to First Embodiment

Figure 2:
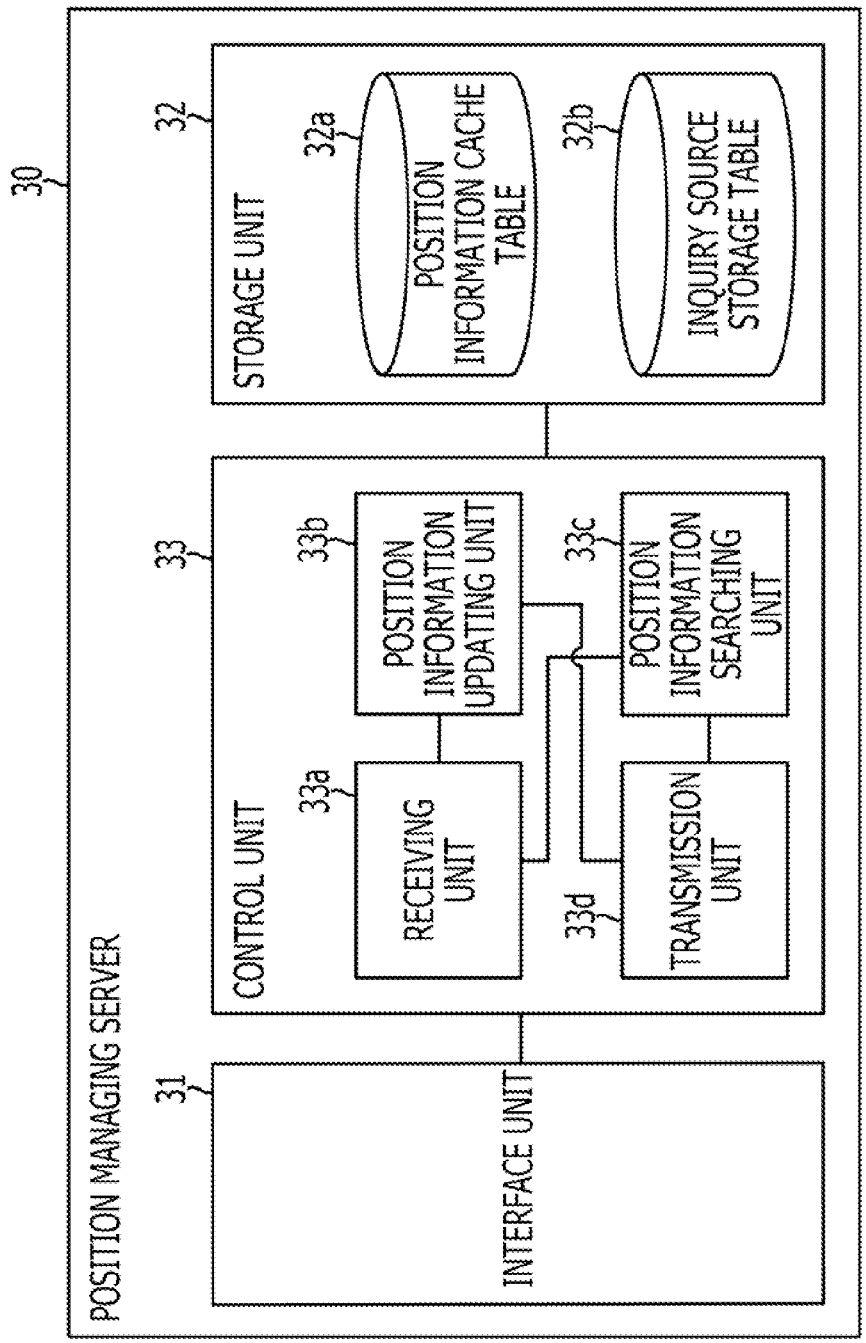
FIG. 2 is a block diagram illustrating a configuration of a position managing server according to the first embodiment.

Next, a configuration of the position managing server 30 according to the first embodiment will be described. FIG. 2 is a block diagram illustrating a configuration of the position managing server according to the first embodiment. As shown in FIG. 2, the position managing server 30 has an interface unit 31, storage unit 32, and control unit 33.

The interface unit 31 is an interface that controls communication with the relay control server group 40 via a network. The interface unit 31 accepts inquiries for position information of the portable terminal 10 from the relay control server group 40, and notifies the position information of the accepted portable terminal 10 to the relay control server group 40.

The storage unit 32 is a storage device such as a semiconductor memory device or hard disk, for example, and has a position information cache table 32a and inquiry source storage table 32b. The position information cache table 32a correlates and stores the user ID of the portable terminal 10 and the position of the networking equipment to which the portable terminal 10 is connected. Also, the inquiry source storage table 32b correlates and stores the portable terminal name and the address of the relay device inquiring about the position information of the portable terminal 10.

The control unit 33 has a receiving unit 33a, position information updating unit 33b, position information searching unit 33c, and transmission unit 33d. The receiving unit 33a accepts notification indicating that the position of the portable terminal 10 has changed from the networking equipment such as the base station, and extracts the user ID and position information from the received notification. Also, the receiving unit 33a accepts an inquiry message for position information of the portable terminal 10 from a representative node 200a, and extracts the user ID stored in the accepted inquiry message.

In the case of accepting a user ID extracted by the receiving unit 33a and the position information, the position information updating unit 33b stores these in a position information cache table 32a and updates the position information of the portable terminal 10. Also, in the case the position information of the portable terminal 10 is updated, the position information updating unit 33b searches the inquiry source storage table 32b with the user ID as a key, and obtains the inquiry source address. The position information updating unit 33b then generates a position information updating notification wherein the position information is stored, with the obtained address as the destination address.

In the case of having accepted an inquiry from the representative node 200a, the position information searching unit 33c searches the position information cache table 32a with the user ID as a key, and obtains the position information of the portable terminal 10. The position information searching unit 33c then generates a position information response notification having stored therein the obtained position information of the portable terminal 10. The transmission unit 33d transmits the position information updating notification generated by the position information updating unit 33b or the position information response notification generated by the position information searching unit 33c to the intermediate node 100a or the intermediate node 100b.

Configuration of Relay Control Server Group According to First Embodiment

Next, the configuration of the relay control server group 40 shown in FIG. 1 will be described. The relay control server group 40, as shown in FIG. 1, has a server load balancer 41, intermediate node 100a, intermediate node 100b, representative node 200a, relay node 200b, and relay node 200c. Note that after briefly describing each node making up the relay control server group 40, the specific configuration of each node will be described.

The server load balancer 41 assigns the delivery request messages received from the portable terminal 10 according to the load state of the intermediate nodes. For example, in the case of receiving a delivery request message for the portable terminal 10, the server load balancer 41 obtains the load state of the intermediate node 100a and the intermediate node 100b, and assigns the request to the intermediate node having less of a load.

The intermediate node 100a and the intermediate node 100b are servers that receive the delivery request message from the portable terminal 10 via the server load balancer 41 and that determine whether or not the position information of the portable terminal 10 is registered or not from the received delivery request message. In the case that the position information of the portable terminal 10 is registered, the intermediate node 100a and intermediate node 100b transfers a delivery request message to the delivery server 20 near the position of the portable terminal 10. Also, in the case that the position information of the portable terminal 10 is not registered, the intermediate node 100a and intermediate node 100b transfers a delivery request message to the delivery server 20 near the position of the portable terminal 10 obtained by inquiring about position information from the representative node 200a.

The representative node 200a is a server that, upon accepting an inquiry for position information of the portable terminal 10 by the intermediate node 100a, determines whether or not the position information of the portable terminal 10 is registered. Now, in the case that the position information of the portable terminal 10 is registered, the representative node 200a transmits the position information to the intermediate node 100a. Also, in the case that the position information of the portable terminal 10 is not registered, the representative node 200a transmits the position information of the portable terminal 10 obtained by inquiring about the position information from the position managing server 30 to the intermediate node 100a. Similarly, the representative node 200a accepts an inquiry for position information of the portable terminal 10 from the intermediate node 100b.

The relay node 200b controls communication between the intermediate node 100a and the representative node 200a. Also, the relay node 200c controls communication between the intermediate node 100b and the representative node 200a. Now, the representative node 200a is a higher order node of the relay node 200b and relay node 200c, and is a lower order node of the position managing server 30. Also, the relay node 200b and relay node 200c are each path control nodes of the intermediate node 100a and intermediate node 100b and are lower order nodes of the representative node 200a.

Note that the representative node, relay node, and intermediate node that the relay control server group 40 has are not restricted to that shown in FIG. 1. For example, the relay control server group 40 may have multiple representative nodes, and may connect the intermediate node and representative node without the relay node in between.

Configuration of Intermediate Node According to First Embodiment

Figure 3:
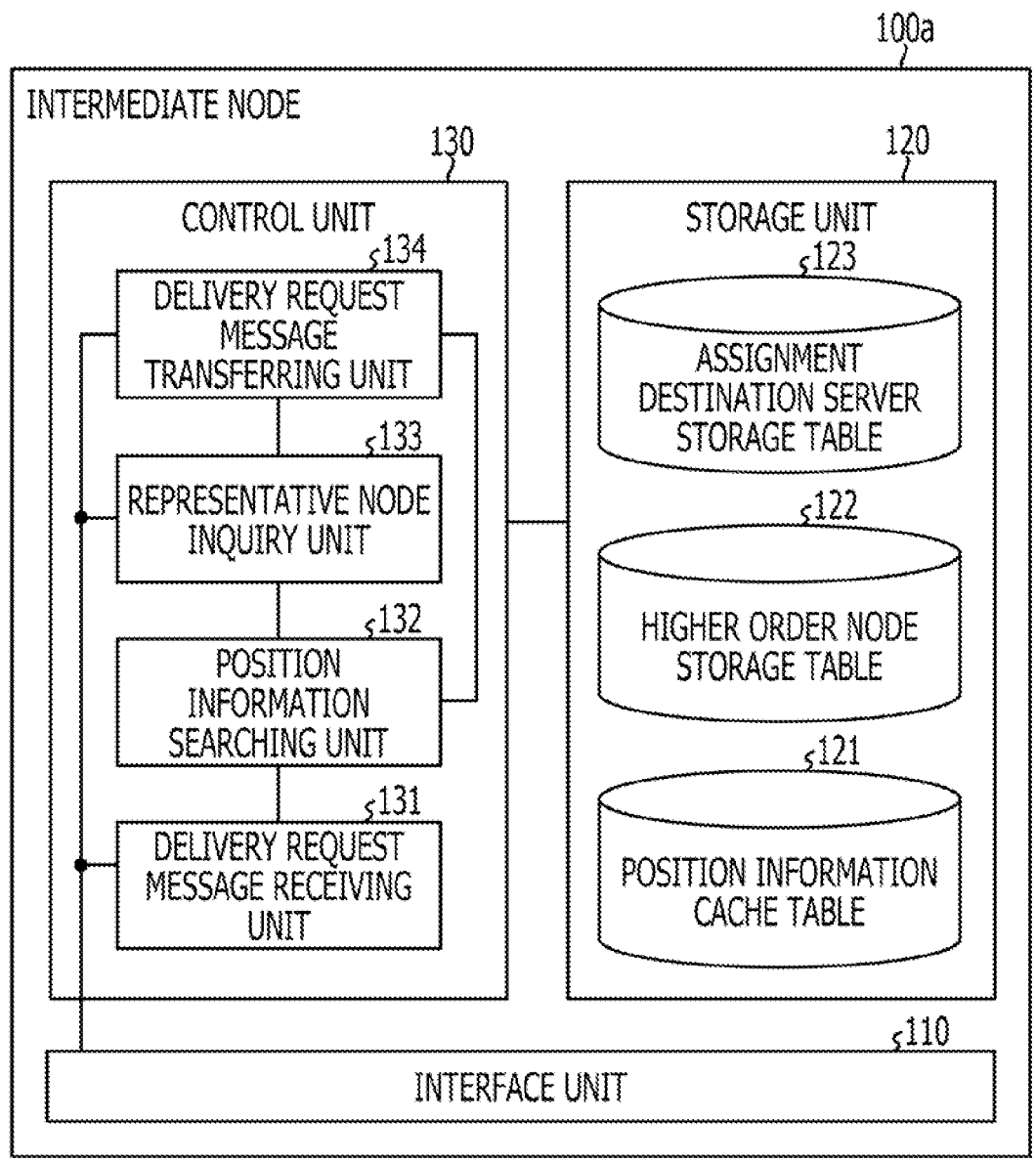
FIG. 3 is a block diagram illustrating a configuration of an intermediate node according to the first embodiment.

Next, the configuration of an intermediate node according to the first embodiment will be used with reference to FIG. 3. Note that the intermediate node 100a and intermediate node 100b have substantially similar configurations, so only the intermediate node 100a will be described herein. FIG. 3 is a block diagram illustrating a configuration of the intermediate node 100a according to the first embodiment. As shown in FIG. 3, the intermediate node 100a has an interface unit 110, a storage unit 120, and a control unit 130. Note that besides these functions, an input unit such as a keyboard and mouse, and an output unit such as a monitor and speaker, may also be provided.

The interface unit 110 controls the communication between each of the portable terminal 10, delivery server 20, representative node 200a, and relay node 200b, via a network. For example, the interface unit 110 transfers the delivery request message received from the portable terminal 10 to the delivery request message receiving unit 131. Also, the interface unit 110 transmits the position information inquiry message generated by the representative node inquiry unit 133 to the representative node 200a.

The storage unit 120 is a storage unit such as a semiconductor memory device or a hard disk, for example, and has a position information cache table 121, a higher order node storage table 122, and an assignment destination server storage table 123.

Figure 4:
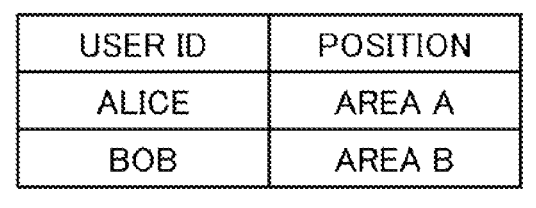

The position information of the portable terminal 10 is stored in the position information cache table 121. FIG. 4 is a diagram illustrating an example of the information stored as the position information cache table 121. For example, as shown in FIG. 4, information correlating "user ID" and "position" is stored in the position information cache table 121. "User ID" is an identifier that uniquely identifies the portable terminal 10. Also, "position" indicates to which network equipment the portable terminal 10 is connected. That is to say, "position" shows the position information of the portable terminal 10.

Specifically, in the case of FIG. 4, the portable terminal 10 having a user ID of "Alice" is shown to be positioned in "Area A". Also, the portable terminal 10 having a user ID of "Bob" is shown to be positioned in "Area B".

The higher order node storage table 122 stores node information of the higher order connected with the intermediate node 100a. FIG. 5 is a diagram illustrating an example of information stored as the higher order node storage table 122. For example, as shown in FIG. 5, information correlating the "user ID", "node type", and "address" are stored in the higher order node storage table 122. "User ID" is an identifier that uniquely identifies the portable terminal 10. "Node type" indicates whether the type of higher order node connected to the intermediate node 100a is a representative node or a relay node. "Address" indicates the address of the higher order node connected to the intermediate node 100a.

Specifically, in the case of FIG. 5, information is stored which indicates that the address of the representative node 200a of the portable terminal 10 having a user ID of "Alice" and "Tom" is "10.10". Also, information is stored which indicates that the address of the relay node 200b of the portable terminal 10 having a user ID of "Alice" and "Tom" is "10.11".

The address of the delivery server 20 corresponding to the position information of the portable terminal 10 is stored in the assignment destination server storage table 123. FIG. 6 is a diagram illustrating an example of information stored as the assignment destination server storage table 123. For example, information correlating "message address", "position", and "delivery server address" is stored in the assignment destination server storage table 123. "Message address" indicates the delivery server name. "Position" indicates the position information of the portable terminal 10. "Delivery server address" indicates the address to which the message is addressed according to the position information of the portable terminal 10.

Specifically, in the case of FIG. 6, in the case that the portable terminal 10 is positioned in "Area A", the delivery request message is transmitted to the delivery server "cs.fj.jp", addressed to the delivery server address "host1.fj.com". Also, in the case that the portable terminal 10 is positioned in "Area B", the delivery request message is transmitted to the delivery server "cs.fj.jp", addressed to the delivery server address "host22.fj.com".

The control unit 130 has an internal memory for storing control programs, programs stipulating various types of processing procedures, and data. The control unit 130 has a delivery request message receiving unit 131, position information searching unit 132, representative node inquiry unit 133, and delivery request message transfer unit 134. For example, the control unit 130 may be an integrated circuit such as ASIC (Application Specific Integrated Circuit) or FPGA (Field Programmable Gate Array), or an electronic circuit such as a CPU (Central Processing Unit) or MPU (Micro Processing Unit).

The delivery request message receiving unit 131 receives the delivery request message from the portable terminal 10. For example, in the case of receiving a delivery request message from the portable terminal 10, the delivery request message receiving unit 131 extracts the user ID and destination server name stored in the delivery request message.

As a specific example, description will be given using a case wherein the delivery request message receiving unit 131 receives the delivery request message shown in FIG. 7. FIG. 7 is a diagram illustrating an example of a delivery request message that the delivery request message receiving unit 131 received from the portable terminal 10. As shown in FIG. 7, the delivery request message has a request row 71 and a header portion 72.

The request row 71 has a method. In the example shown in FIG. 7, the method is "GET" indicating that obtaining a page will be requested from the server. The header portion 72 has a header name and header value. The header value corresponding to the header name "Cookie: userid" indicating "User ID" is "Tom". Also, the header value corresponding to the header name "Host" indicating the "message destination" is "cs.fj.jp". For example, in the case of receiving the delivery request message shown in FIG. 7, the delivery request message receiving unit extracts the user ID "Tom" and the message destination "cs.fj.jp". Note that the delivery request message receiving unit 131 corresponds to the receiving unit mentioned elsewhere.

In the case of accepting notification from the delivery request message receiving unit 131, the position information searching unit 132 determines whether or not the position information of the portable terminal 10 having received the delivery request message is stored in the position information cache table 121. For example, the position information searching unit 132 searches the position information cache table 121 using the user ID extracted by the delivery request message receiving unit 131 as a key, and determines whether or not the position information of the terminal is stored in the position information cache table 121.

In the case determination is made that the position information of the terminal is stored in the position information cache table 121, the position information searching unit 132 notifies the delivery request message transfer unit 134. On the other hand, in the case determination is made that position information of the terminal is not stored in the position information cache table 121, the position information searching unit 132 notifies the representative node inquiry unit 133.

For example, in the case of receiving the delivery request message shown in FIG. 7, the position information searching unit 132 searches the position information cache table 121 using the extracted user ID "Tom" as a key, and determines that the position information corresponding to the user ID "Tom" is not stored. The position information searching unit 132 then notifies the representative node inquiry unit 133. Note that the position information searching unit 132 corresponds to the obtaining unit mentioned elsewhere.

In the case that the position information searching unit 132 determines that the position information of the portable terminal 10 is not stored in the position information cache table 121, the representative node inquiry unit 133 requests the position information of the portable terminal 10 to the representative node 200a.

For example, the representative node inquiry unit 133 searches the higher order node storage table 122 shown in FIG. 5 with the user ID "Tom" as a key, and determines that the address of the representative node 200a is "10.10". The representative node inquiry unit 133 then generates a position information inquiring message storing the user ID "Tom", and transmits the generated position information inquiring message to the address "10.10".

Also, in the case of receiving a response to the position information inquiring message from the representative node 200a, the representative node inquiry unit 133 extracts the position information stored in the response message, and stores the extracted position information in the position information cache table 121. Upon storing the extracted position information in the position information cache table 121, the representative node inquiry unit 133 notifies the delivery request message transfer unit 134.

For example, in the case that "Area A" is stored in the response message, the representative node inquiry unit 133 stores "Tom" in the "user ID", and "Area A" in the "position"

of the position information cache table 121. Note that the representative node inquiry unit 133 corresponds to the obtaining unit mentioned elsewhere.

The delivery request message transfer unit 134 searches for the delivery server 20 nearest the position information of the portable terminal 10, and transfers the delivery request message received from the portable terminal 10 to the delivery server 20. For example, the delivery request message transfer unit 134 searches the assignment delivery server storage table 123 shown in FIG. 6, using the keys "cs.fj.jp" as "message destination" and "Area A" as "position". The delivery request message transfer unit 134 obtains the delivery server address "host1.fj.com", and transfers the delivery request message to the delivery server 20 of the obtained address. Note that the delivery request message transfer unit 134 corresponds to the transferring unit mentioned elsewhere.

Configuration of Representative Node According to First Embodiment

Figure 8:
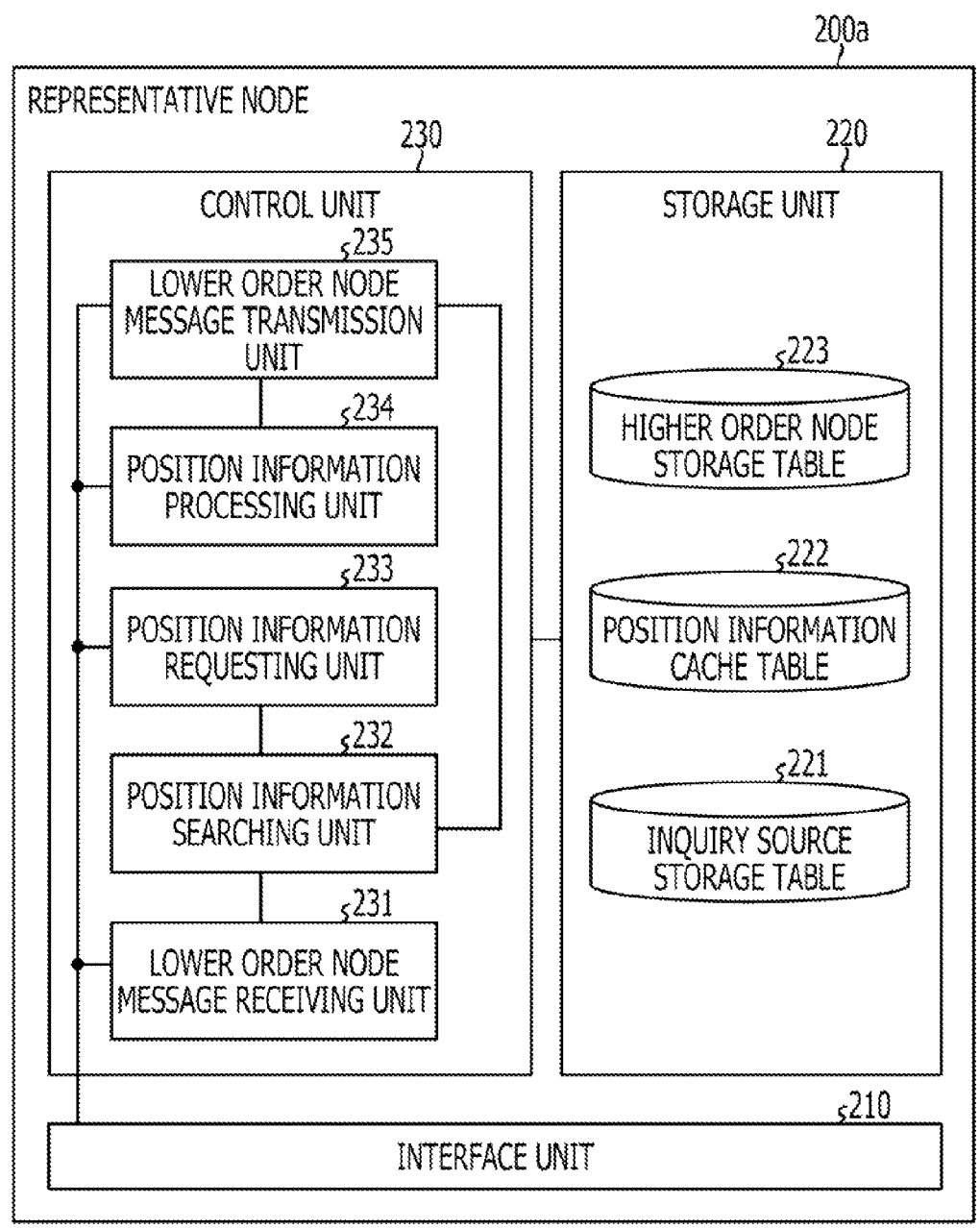
FIG. 8 is a block diagram illustrating a configuration of a representative node according to the first embodiment.

Next, the configuration of the representative node 200a according to the first embodiment will be shown with reference to FIG. 8. Note that the representative node 200a and the relay nodes 200b and 200c have substantially similar configurations, so only the representative node 200a will be described here. FIG. 8 is a block diagram illustrating the configuration of the representative node 200a according to the first embodiment. The configuration of the representative node 200a according to the first embodiment has an interface unit 210, storage unit 220, and control unit 230. Note that besides these functions, an input unit such as a keyboard and mouse, and an output unit such as a monitor and speaker, may also be provided.

The interface unit 201 is an interface that controls communication with the lower order node or higher order node via the network. For example, in the case of receiving a position information inquiring message from the intermediate node, the interface unit 210 transfers the received position information inquiring message to the lower order node message receiving unit 231. Also, for example, in the case of obtaining the position information of the portable terminal 10 from the position managing server 30, the interface unit 210 transfers the obtained position information to the position information processing unit 234.

The storage unit 220 is a storage device such as a semiconductor memory device or a hard disk, for example, and has an inquiry source storage table 221, position information cache table 222, and higher order node storage table 223.

Figure 9:
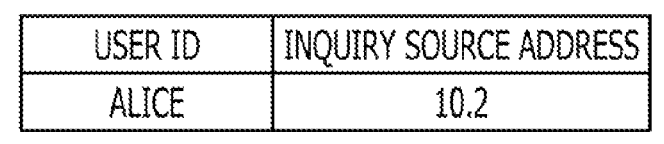

Information is stored in the inquiry source storage table 221 which correlates the "inquiry source address" which is the address that the intermediate node 10 has which transmitted the position information inquiry message and the "user ID" of the portable terminal 10 inquiring the position information. FIG. 9 is a diagram illustrating an example of information stored as the inquiry source storage table 221.

As shown in FIG. 9 information correlating the "user ID" and the "inquiry source address" is stored in the inquiry source storage table 221. "User ID" indicates an identifier that uniquely identifies the portable terminal 10. "Inquiry source address" indicates the address of the lower order node inquiring the position information of the portable terminal 10. Specifically, information indicating that the address of the lower order node inquiring the position information of the portable terminal 10 identified by the user ID "Alice" is "10.2" is stored in the inquiry source storage table 221 shown in FIG. 9.

Figure 10:
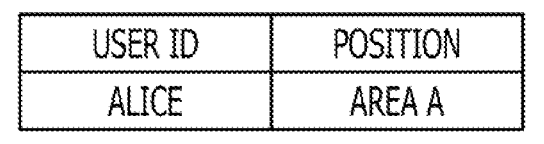

The position information of the portable terminal is stored in the position information cache table 222. FIG. 10 is a diagram illustrating an example of information stored as the position information cache table 222. For example, as shown in FIG. 10, information correlating "user ID" and "position" are stored in the position information cache table 222. "User ID" indicates an identifier that uniquely identifies the portable terminal 10. "Position" indicates the position information of the portable terminal 10. Specifically, in the case of FIG. 10, the portable terminal 10 which has a user ID of "Alice" is shown to be positioned in "Area A".

The higher order node information connecting to the representative node 200a is stored in the higher order storage table 223. FIG. 11 is a diagram illustrating an example of information stored as the higher order node storage table 223. For example, as shown in FIG. 11, information correlating "user ID", "node type", and "address" are stored in the higher order node storage table 223. "User ID" indicates an identifier that uniquely identifies the portable terminal 10. "Node type" indicates the type of higher order node connected to the representative node 200a. "Address" shows the address of the higher order node connected to the representative node 200a.

Specifically, information indicating that the address of the position managing server of the portable terminal 10 having a user of "Alice" and "Tom" is "11.10" is stored in the higher order node storage table 223 shown in FIG. 11. Also, information indicating that the address of the relay node of the portable terminal 10 having a user of "Bob" is "10.12" is stored in the higher order node storage table 223.

The control unit 230 has an internal memory for storing control programs, programs stipulating various types of processing procedures, and data. The control unit 230 has a lower order node message receiving unit 231, position information searching unit 232, position information requesting unit 233, position information processing unit 234, and lower order message transmission unit 235. For example, the control unit 230 may be an integrated circuit such as ASIC or FPGA, or an electronic circuit such as a CPU or MPU.

In the case of receiving a message from the lower order node, the lower order node message receiving unit 231 analyzes the received message. For example, in the case of receiving a position information inquiry message from the intermediate node 100a, the lower order node message receiving unit 231 extracts the transmission source address and user ID stored in the position information inquiry message. The lower order node message receiving unit 231 then stores the extracted transmission source address and user ID in the inquiry source storage table 221.

In the case of receiving a position information inquiry message for the portable terminal 10, identified with a user ID of "Alice", from the intermediate node 100a having an address of "10.2", the lower order node message receiving unit 231 stores the information shown in FIG. 9 in the inquiry source storage table 221.

In the case of accepting a notification from the lower order message receiving unit 231, the position information searching unit 232 determines whether or not the position information of the portable terminal 10 stored in the position information inquiry message is stored in the position information cache table 222. For example, the position information searching unit 232 searches the position information cache table 222 with the user ID extracted by the lower order node message receiving unit 231 as a key, and determines whether or not the position information of the portable terminal 10 is stored in the position information cache table 222.

In the case determination is made that the position information of the portable terminal 10 is stored in the position information cache table 222, the position information searching unit 232 notifies the lower order node message transmission unit 235. On the other hand, in the case determination is made that the position information of the portable terminal 10 is not stored in the position information cache table 222, the position information searching unit 232 notifies the position information requesting unit 233.

Specifically, in the case of receiving the position information inquiry message, the position information searching unit 232 searches the position information cache table 222 illustrated in FIG. 10 with the extracted user ID "Tom" as a key. The position information searching unit 232 determines that the position information corresponding to the user ID "Tom" is not stored, and notifies the position information requesting unit 233.

In the case of accepting a notification from the position information searching unit 232, the position information requesting unit 233 inquires about the position information to the higher order node. For example, in the case that the position information searching unit 232 determines that the position information of the portable terminal 10 is not stored in the position information cache table 222, the position information requesting unit 233 searches the higher order node storage table 223, with the user ID as a key. The position information requesting unit 233 obtains the node type and address, and transmits a position information inquiry message to the obtained address. Specifically, the position information requesting unit 233 requests position information from the position managing server 30.

The position information processing unit 234 receives a response message from the upper node, and extracts the position information of the portable terminal 10 stored in the response message. The position information processing unit 234 stores the extracted position information in the position information cache table 222. Also, the position information processing unit 234 notifies the position information extracted from the response message to the lower order node message transmission unit 235.

Specifically, in the case that the position information processing unit 234 extracts "Area A" as the position information of the portable terminal 10 having a user ID of "Alice" from the response message, information such as shown in FIG. 10 is stored in the position information cache table 222.

The lower order node message transmission unit 235 transmits position information to the lower order node. For example, the lower order node message transmission unit 236 searches the inquiry source storage table 221 with the user ID as a key, and obtains the inquiry source address. The lower order node message transmission unit 235 transmits the response message storing the position information of the portable terminal 10 to the obtained lower order node address.

Specifically, in the case of searching the inquiry source storage table 221 as shown in FIG. 9, the lower order node message transmission unit 235 transmits the position information of the portable terminal 10 to the obtained intermediate node 100a address "10.2".

Processing Procedures of Processing by Relay System According to First Embodiment (Processing Procedures of Position Inquiry by Intermediate Node According to First Embodiment)

Figure 12:
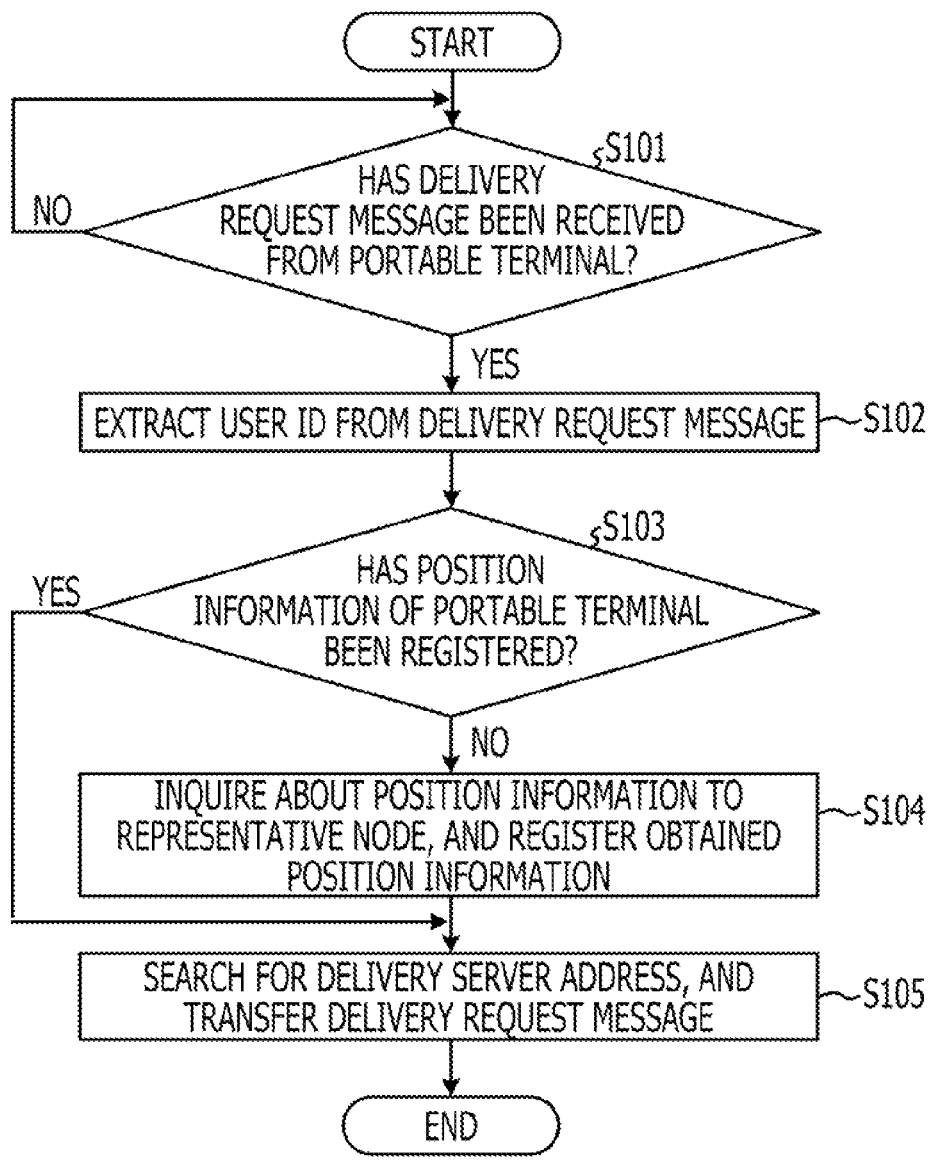
FIG. 12 is a flowchart illustrating process procedures for a position inquiring processing by an intermediate node according to the first embodiment.

Next, the processing procedures of the position inquiry processing by the intermediate node 100a according to the first embodiment will be described with reference to FIG. 12. FIG. 12 is a flowchart illustrating the processing procedures of the position inquiry processing by the intermediate node 100a according to the first embodiment.

In the case of receiving a delivery request message from the portable terminal 10 (Yes in operation S101), the delivery request message receiving unit 131 extracts the user ID from the delivery request message (operation S102). Next, the position information searching unit 132 searches the position information cache table 121 using the user ID extracted by the delivery request message receiving unit 131 as a key, and determines whether or not the position information of the portable terminal 10 is registered (operation S103).

In the case determination is made by the position information searching unit 132 that the position information of the portable terminal 10 is not registered (No in operation S103), the representative node inquiry unit 133 inquires of the portable terminal 10 to the representative node 200a, and registers the obtained position information (operation S104). Next, the delivery request message transfer unit 134 searches for the address of the delivery server 20, transfers the delivery request message (operation S105), and ends the processing.

In the case determination is made by the position information searching unit 132 that the position information of the portable terminal 10 is registered (Yes in operation S103), the delivery request message transfer unit 134 searches for the address of the delivery server 20, transfers the delivery request message (operation S105), and ends the processing.

Figure 13:
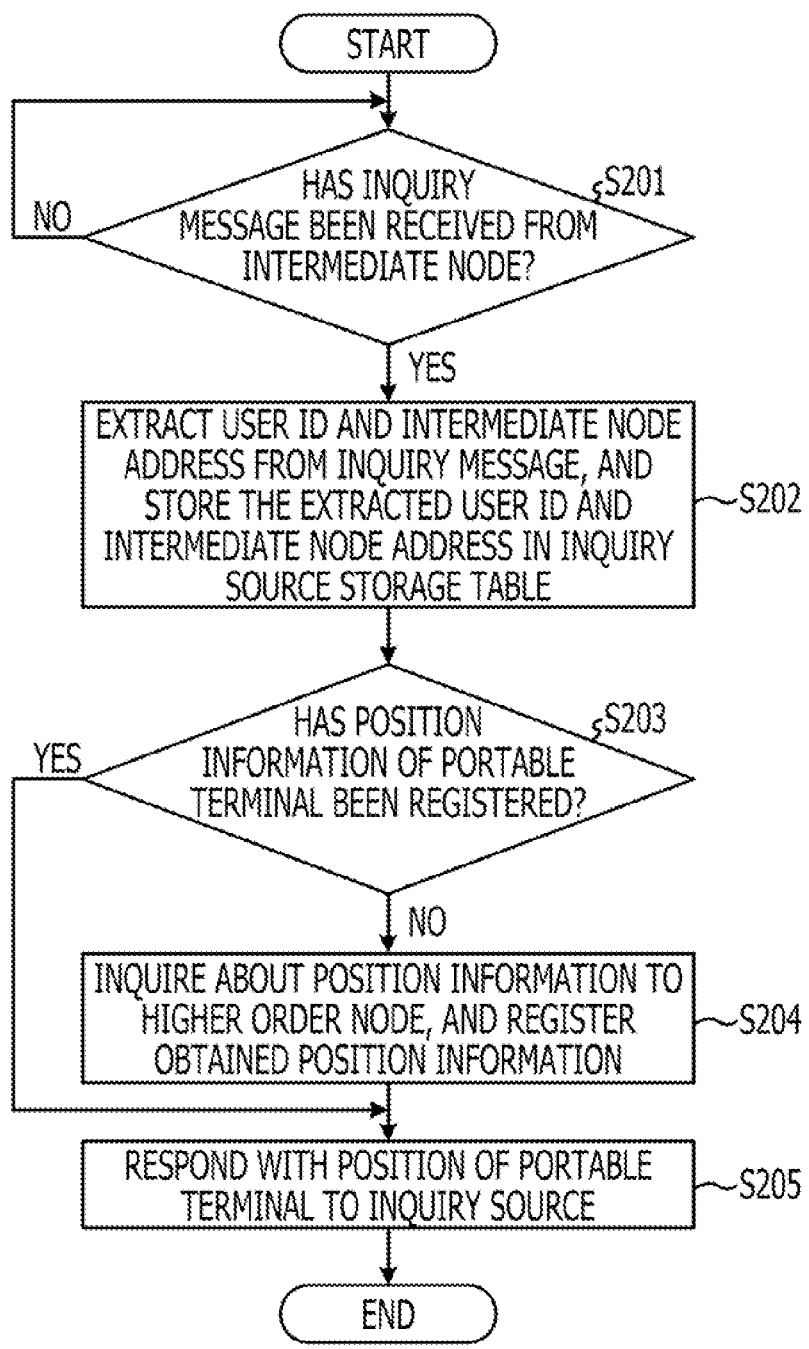
FIG. 13 is a flowchart illustrating process procedures for a position inquiring processing by a representative node according to the first embodiment.

Processing Procedures of Position Inquiry Processing by Representative Node According to First Embodiment Next, the processing procedures for position inquiry processing by the representative node 200a according to the first embodiment will be described. FIG. 13 is a flowchart illustrating the processing procedures for position inquiry processing by the representative node 200a according to the first embodiment.

In the case that an inquiry message is received from the intermediate node 100a (Yes in operation S201), the lower order node message receiving unit 231 executes the processing in operation S202. That is to say, the lower order node message receiving unit 231 extracts the user ID and the intermediate node address from the inquiry message, and stores the extracted user ID and intermediate node address in the inquiry source storage table 221 (operation S202). Next, the position information searching unit 232 determines whether or not the position information of the portable terminal 10 is registered (operation S203).

In the case determination is made by the position information searching unit 232 that the position information of the portable terminal 10 is not registered (No in operation S203), the position information requesting unit 233 executes the processing in operation S204. That is to say, the position information requesting unit 233 inquires about the position information of the portable terminal 10 to the position managing server 30, and registers the obtained position information (operation S204). Next, the lower order node message transmission unit 235 transmits the position of the portable terminal 10 to the intermediate node 100a (operation S205), and ends the processing.

In the case determination is made by the position information searching unit 232 that the position information of the portable terminal 10 is registered (Yes in operation S203), the lower order node message transmission unit 236 transmits the position of the portable terminal 10 to the intermediate node 100a (operation S205), and ends the processing.

Advantages of the First Embodiment

As described above, according to the first embodiment, the intermediate node 100a inquires about the position information of the portable terminal 10 directly to the representative node 200a. Accordingly, the position information of the portable terminal 10 requesting delivery of an application can be obtained in a short amount of time.

Second Embodiment

Description has been given of an example according to the first embodiment wherein the intermediate node 100a inquires of the position information terminal 10 to the representative node 200a. However, there may be cases in a relay system wherein the portable terminal moves after the intermediate node obtains the position information. Thus, with a second embodiment, description will be given of an example wherein, in the case that the portable terminal moves, the intermediate node receives notification of the position information of the portable terminal from the higher order node.

Configuration of Relay System According to Second Embodiment

Figure 14:
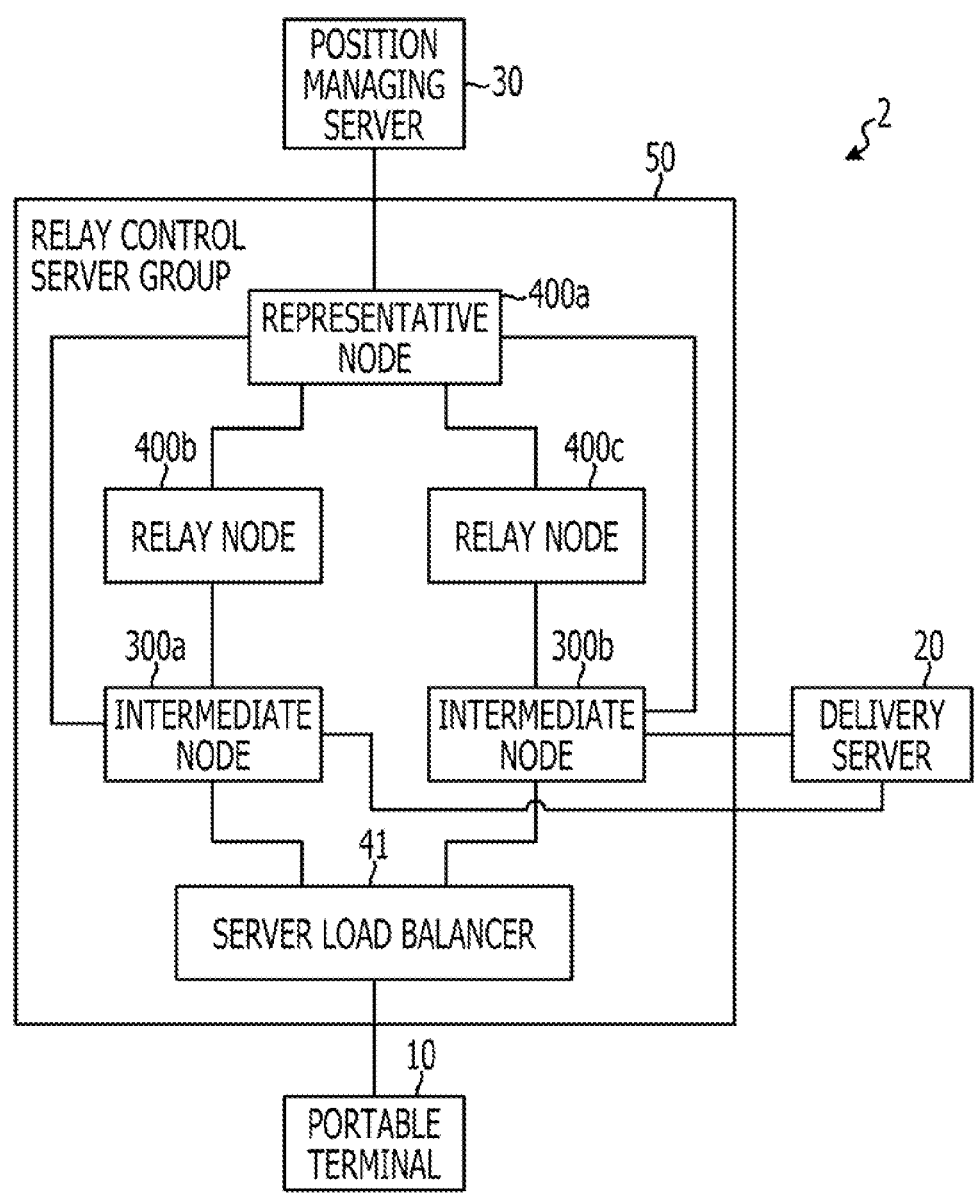
FIG. 14 is a diagram illustrating a configuration of a relay system according to a second embodiment.

First, a system configuration of a relay system 2 according to the second embodiment will be described. FIG. 14 is a diagram illustrating a system configuration of the relay system 2 according to the second embodiment. As shown in FIG. 14, the relay system 2 connects portable terminal 10, delivery server 20, position managing server 30, and relay control server group 50, via a network.

Configuration of Relay Control Server Group According to Second Embodiment

Next, a configuration of the relay control server group 50 according to the second embodiment will be described. As shown in FIG. 14, the relay control server group 50 has a server load balancer 41, intermediate node 300a, intermediate node 300b, representative node 400a, relay node 400b, and relay node 400c.

Configuration of Intermediate Node According to Second Embodiment

Figure 15:
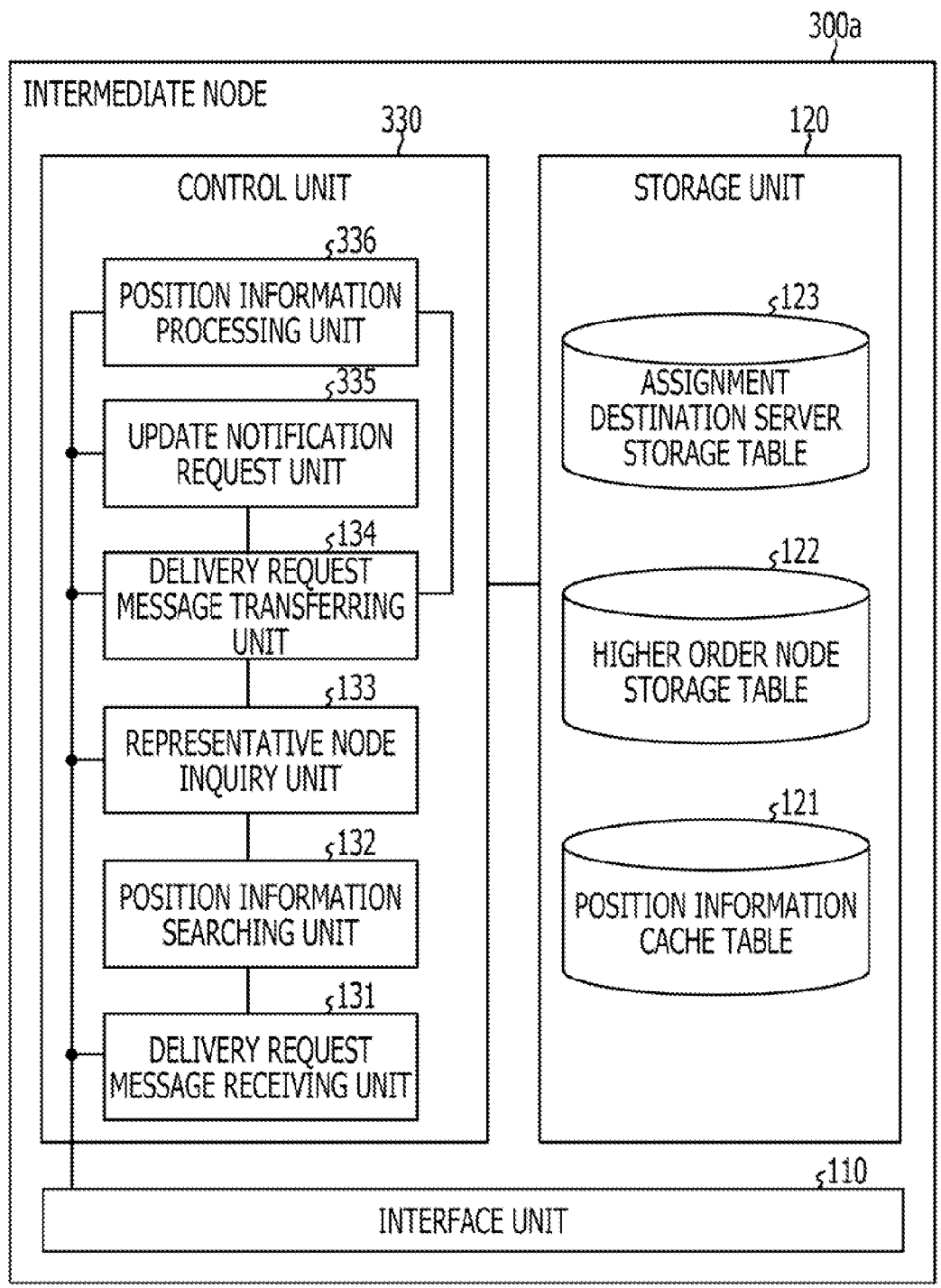
FIG. 15 is a block diagram illustrating a configuration of an intermediate node according to the second embodiment.

Next, a configuration of the intermediate nodes according to the second embodiment will be described. Note that the intermediate node 300a and intermediate node 300b have substantially similar configurations so only the intermediate node 300a will be described here. FIG. 15 is a block diagram illustrating the configuration of the intermediate node 300a according to the second embodiment. The intermediate node 300a of the relay device according to the second embodiment has an interface unit 110, storage unit 120, and control unit 330. Note that besides these functions, an input unit such as a keyboard and mouse, and an output unit such as a monitor and speaker, may also be provided. Also, functional units that perform substantially similar roles as other units shown in FIG. 3 will be denoted with the same reference numerals, and detailed description thereof will be omitted.

The control unit 330 has an internal memory for storing control programs, programs stipulating various types of processing procedures, and data. The control unit 330 has a delivery request message receiving unit 131, position information searching unit 132, representative node inquiry unit 133, delivery request message transfer unit 134, update notification request unit 335, and position information processing unit 336. For example, the control unit 330 may be an integrated circuit such as ASIC or FPGA, or an electronic circuit such as a CPU or MPU.

In the case that the position information of the portable terminal 10 changes, the update notification request unit 335 requests receipt of notification at time of the position changing. For example, in the case that the representative node inquiry unit 133 obtains position information of the portable terminal 10, the update notification request unit 335 searches the higher order node storage table 122 with the user ID as a key, and obtains the relay node address. The update notification request unit 335 then transmits the update notification request storing the user ID and position information to the higher order node of the obtained address.

Specifically, the update notification request unit 335 searches the higher order node storage table 122, with the user ID "Tom" as a key, and obtains the relay node address "10.11". The update notification request unit 335 then transmits the update notification request storing the user ID "Tom" and position information "Area A" to the obtained address "10.11". Note that the update notification request unit 335 corresponds to the transmission unit mentioned elsewhere.

The position information processing unit 336 receives a response as to the update notification request that the update notification request unit 335 has requested from the relay node, and determines the received response type. For example, in the case of receiving a response indicating an "update" from the relay node, the position information processing unit 336 stores the position information stored in the received response in the position information cache table 121. Next, the position information processing unit 336 notifies the delivery request message transfer unit 134. On the other hand, in the case a response indicating "OK" is received from the relay node, the position information processing unit 336 notifies the delivery request message transfer unit 134.

Also, the position information processing unit 336 receives a position update notification from the relay node, extracts the user ID and position information stored in the received position update notification, and stores the extracted position information in the position information cache table 121.

Configuration of Representative Node According to Second Embodiment

Figure 16:
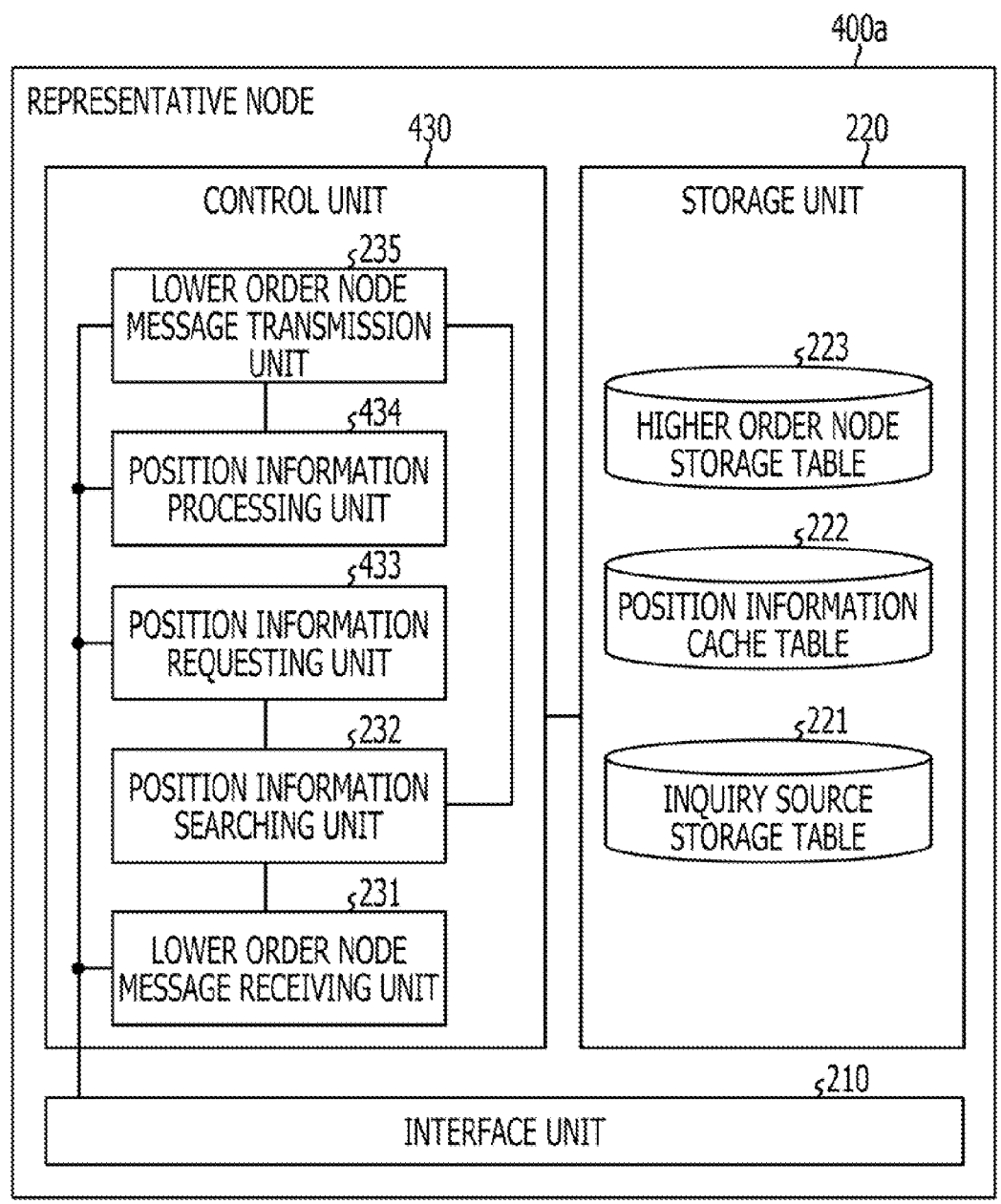
FIG. 16 is a block diagram illustrating a configuration of a representative node according to the second embodiment.

Next, a configuration of the representative node 400a according to the second embodiment will be described with reference to FIG. 16. Note that the representative node 400a and relay nodes 400b and 400c have substantially similar configurations, so only the representative node 400a will be described here. FIG. 16 is a block diagram illustrating the configuration of the representative node 400a according to the second embodiment. The representative node 400a according to the second embodiment has an interface unit 210, storage unit 220, and control unit 430. Note that besides these functions, an input unit such as a keyboard and mouse, and an output unit such as a monitor and speaker, may also be provided. Also, functional units that perform substantially similar roles as other units shown in FIG. 8 will be denoted with the same reference numerals, and detailed description thereof will be omitted.

The control unit 430 has an internal memory for storing control programs, programs stipulating various types of processing procedures, and data. The control unit 430 has a lower order node message receiving unit 231, position information searching unit 232, position information request unit 433, position information processing unit 434, and lower order node message transmission unit 235. For example, the control unit 430 may be an integrated circuit such as ASIC or FPGA, or an electronic circuit such as a CPU or MPU.

The position information request unit 433 further has functions in addition to the functions of the position information request unit 233 described with the first embodiment. In the case that the position information of the portable terminal 10 is updated, the position information request unit 433 transmits a request to receive notification from the higher order node to the higher order node. For example, the position information request unit 433 searches the higher order node storage table 223 with the user ID as a key, and obtains the address of the position managing server or relay node. The position information request unit 433 then transmits the update notification request storing the user ID and position information to the position managing server 30 or higher order node for which an address has been obtained.

The position information processing unit 434 further has functions in addition to the functions of the position information processing unit 234 described with the first embodiment. The position information processing unit 434 receives a response as to the inquiry for position information from the higher order node, and determines the received response type. For example, the position information processing unit 434 receives a response as to the position information inquiry request transmitted by the position information request unit 433 from the position managing server 30, and determines the received response type.

For example, in the case that an "update" response indicating that the position information of the portable terminal 10 has been updated is received from the position managing server 30, the position information processing unit 434 stores the position information stored in the received response in the position information cache table 222. Next, the position information processing unit 434 notifies the lower order node message transmission unit 235. On the other hand, in the case that an "OK" response indicating that the position information of the portable terminal 10 has not changed is received from the position managing server 30, the position information processing unit 434 notifies the lower order node message transmission unit 235.

Also, the position information processing unit 434 receives the update notification request message of the position information from the lower order node, and compares the received position information with the position information stored in the position information cache table 222. For example, the position information processing unit 434 extracts the user ID and position information from the update notification request message transmitted by the position information request unit 433 of the relay node 400b. The position information processing unit 434 then determines whether or not the extracted position information of the portable terminal 10 is stored in the position information cache table 222.

Now, in the case determination is made that the extracted position information of the portable terminal 10 is not stored in the position information cache table 222, the position information processing unit 434 transmits the update notification request message to the position information request unit 433. On the other hand, in the case determination is made that the extracted position information of the portable terminal 10 is stored in the position information cache table 222, the position information processing unit 434 executes the following processing. That is to say, the position information processing unit 434 determines whether or not the extracted position information of the portable terminal 10 matches the position information stored in the position information cache table 222.

In the case determination is made that the position information matches, the position information processing unit 434 notifies the lower order node message transmission unit 235 and transmits an "OK" response to the lower order node. In the case determination is made that the position information does not match, the position information processing unit 434 stores the position information stored in the received response in the position information cache table 222. Next, the position information processing unit 434 notifies the lower order node message transmission unit 235 and transmits an "update" response to the lower order node.

Also, in the case that a position update notification is received from the higher order node, the position information processing unit 434 stores the position information stored in the position update notification in the position information cache table 222, and notifies the lower order node message transmission unit 235.

For example, in the case that a position update notification is received from the position managing server 30, the position information processing unit 434 extracts the user ID and position information stored in the position update notification, and stores the extracted position information in the position information cache table 222. The position information processing unit 434 searches for the address of the relay node 400b from the inquiry source storage table 221. In the case that the address is registered, the position information processing unit 434 notifies the lower order node message transmission unit 235, and transmits the position information update notification to the searched address. On the other hand, in the case the address is not registered, the position information processing unit 434 generates an error log.

Processing Procedures for Processing by Relay System According to Second Embodiment (Processing Procedures of Position Inquiry Processing by Intermediate Node according to Second Embodiment)

Figure 17:
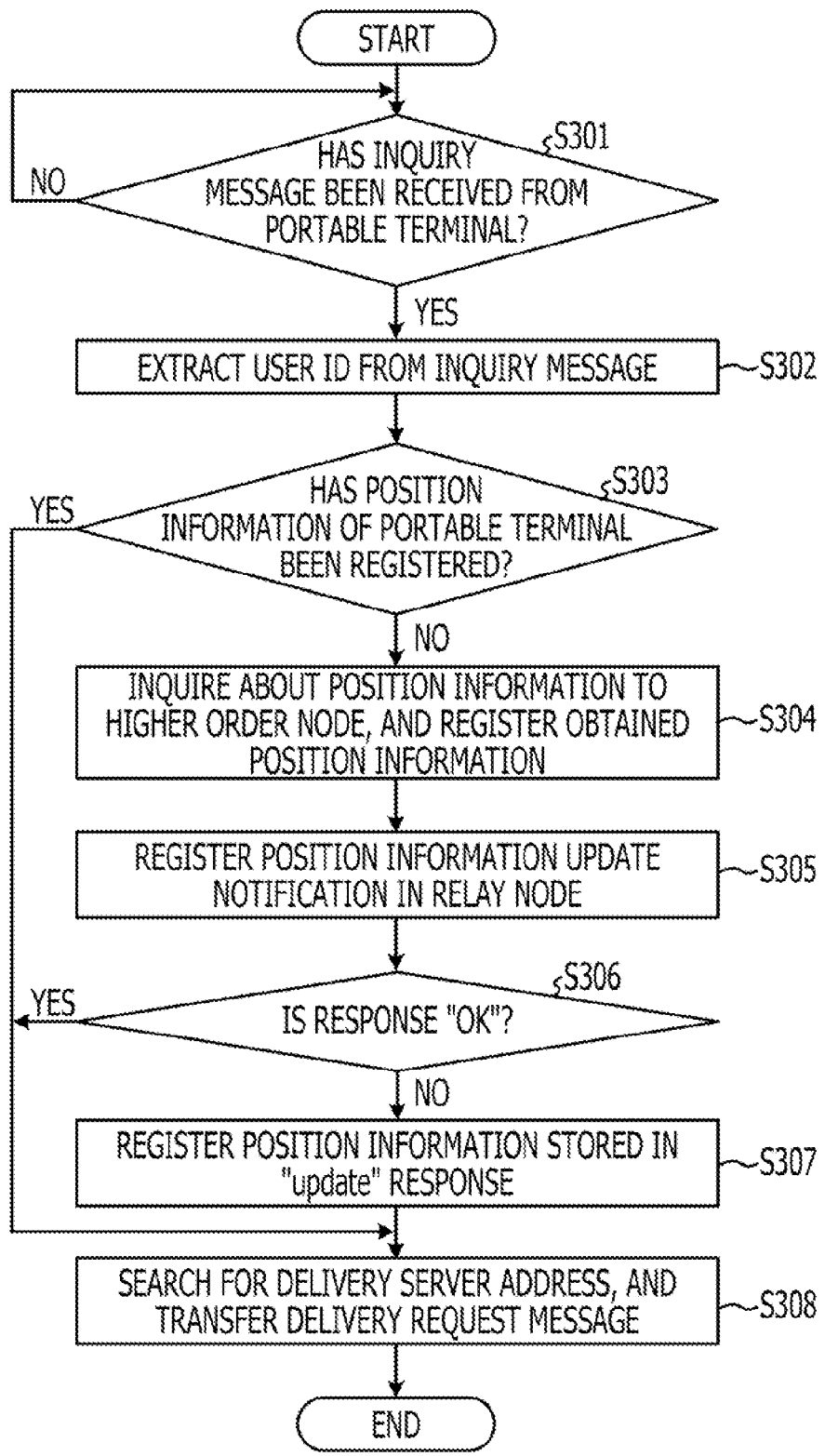
FIG. 17 is a flowchart illustrating process procedures for a position inquiring processing by an intermediate node according to the second embodiment.

Next, processing procedures of the position inquiry processing by the intermediate node 300a according to the second embodiment will be described with reference to FIG. 17. FIG. 17 is a flowchart illustrating processing procedures of the position inquiry processing by the intermediate node 300a according to the second embodiment.

In the case of receiving a delivery request message from the portable terminal 10 (Yes in operation S301), the delivery request message receiving unit 131 extracts the user ID from the delivery request message (operation S302). Next, the position information searching unit 132 searches the position information cache table 121 using the user ID extracted by the delivery request message receiving unit 131 as a key, and determines whether or not the position information of the portable terminal 10 is registered (operation S303).

In the case determination is made by the position information searching unit 132 that the position information of the portable terminal 10 is not registered (No in operation S303), the representative node inquiry unit 133 inquires about the position information of the portable terminal 10 to the representative node, and registers the obtained position information (operation S304). Next, the update notification request unit 335 registers the position information update notification to the relay node (operation S305). The position information processing unit 336 receives a response from the relay node, and determines whether or not the received response is "OK" (operation S306).

In the case determination is made that the received response is not "OK" (No in operation S306), the position information processing unit 336 registers the position information stored in the "update" response (operation S307). Next, the delivery request message transfer unit 134 searches for the address of the delivery server 20, transfers the delivery request message (operation S308), and ends the processing.

In the case determination is made that the response received by the position in formation processing unit is "OK" (Yes in operation S306), the delivery request message transfer unit 134 searches for the address of the delivery server 20, transfers the delivery request message (operation S308), and ends the processing.

In the case determination is made by the position information searching unit 132 that the position information of the portable terminal 10 is registered (Yes in operation S303), the delivery request message transfer unit 134 searches for the address of the delivery server 20, transfers the delivery request message (operation S308), and ends the processing.

Figure 18:
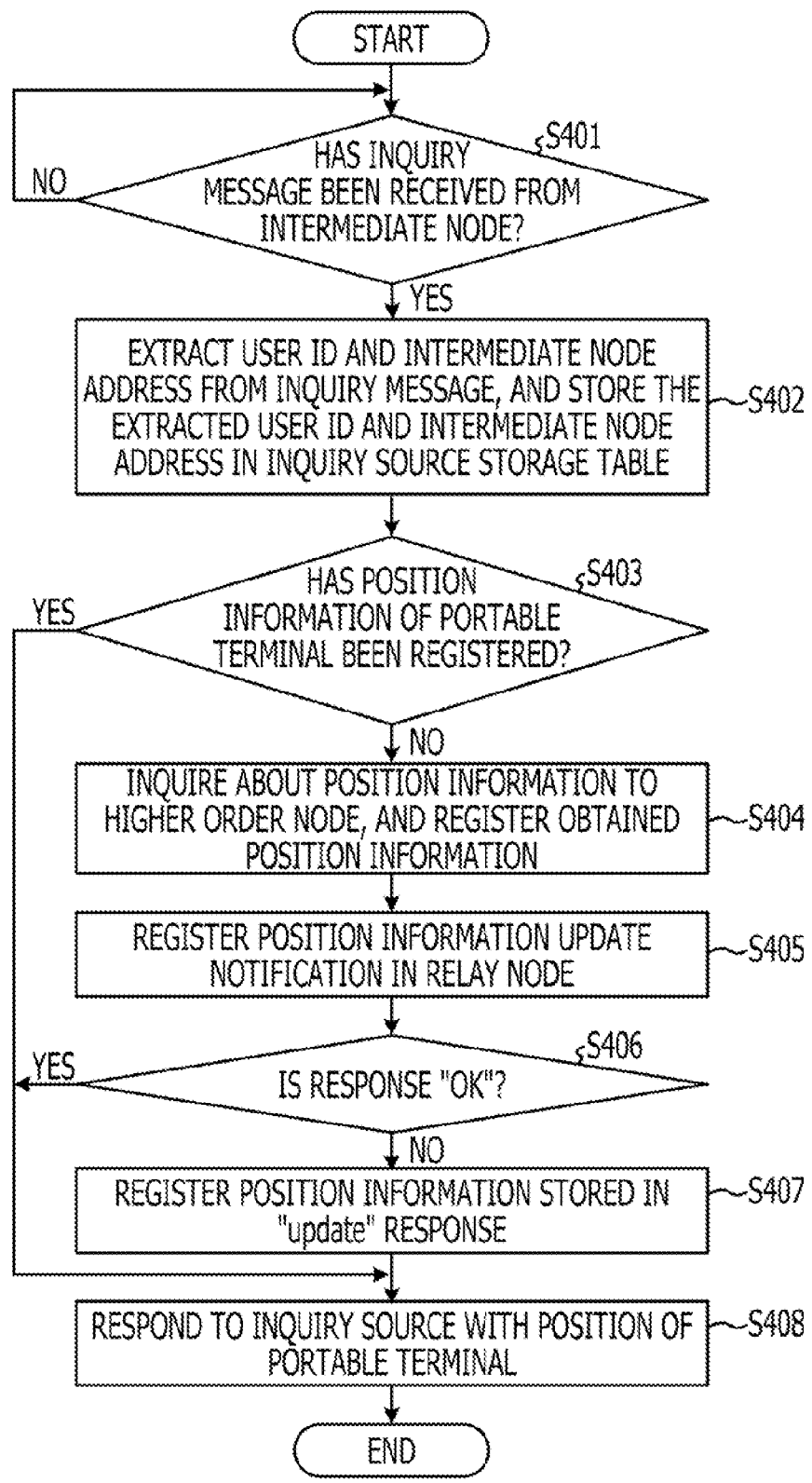
FIG. 18 is a flowchart illustrating process procedures for a position inquiring processing by a representative node according to the second embodiment.

Processing Procedures of Position Inquiry Processing by Representative Node According to Second Embodiment Next, the processing procedures of the position inquiry processing by the representative node 400a according to the second embodiment will be described with reference to FIG. 18. FIG. 18 is a flowchart illustrating the processing procedures of the position inquiry processing by the representative node 400a according to the second embodiment.

In the case that an inquiry message is received from the intermediate node 300a (Yes in operation S401), the lower order node message receiving unit 231 executes the processing in operation S402. That is to say, the lower order node message receiving unit 231 extracts the user ID and intermediate node address from the inquiry message, and stores the extracted user ID and intermediate node address in the inquiry source storage table 221 (operation S402). Next, the position information searching unit 232 determines whether or not the position information of the portable terminal is registered (operation S403).

In the case determination is made by the position information searching unit 232 that the position information of the portable terminal 10 is not registered (No in operation S403), the position information request unit 433 executes the processing in operation S404. That is to say, the position information requesting unit 433 inquires about the position information of the portable terminal 10 to the position managing server 30, and registers the obtained position information (operation S404). Next, the position information requesting unit 433 registers the position information update notification to the higher order node (operation S405). The position information processing unit 434 receives a response from the higher order node and determines whether or not the received response is "OK" (operation S406).

In the case determination is made that the received response is not "OK" (No in operation S406), the position information processing unit 434 registers the position information stored in the "update" response (operation S407). Next, the lower order node message transmission unit 235 transmits the position of the portable terminal 10 to the inquiry source (operation S408), and ends the processing.

In the case determination is made that the received response is "OK" (Yes in operation S406), the lower order node message transmission unit 235 transmits the position of the portable terminal 10 to the inquiry source (operation S408) and ends the processing.

In the case determination is made by the position information searching unit 232 that the position information of the portable terminal 10 is registered (Yes in operation S403), the lower order node message transmission unit 235 transmits the position of the portable terminal 10 to the inquiry source (operation S408) and ends the processing.

Figure 19:
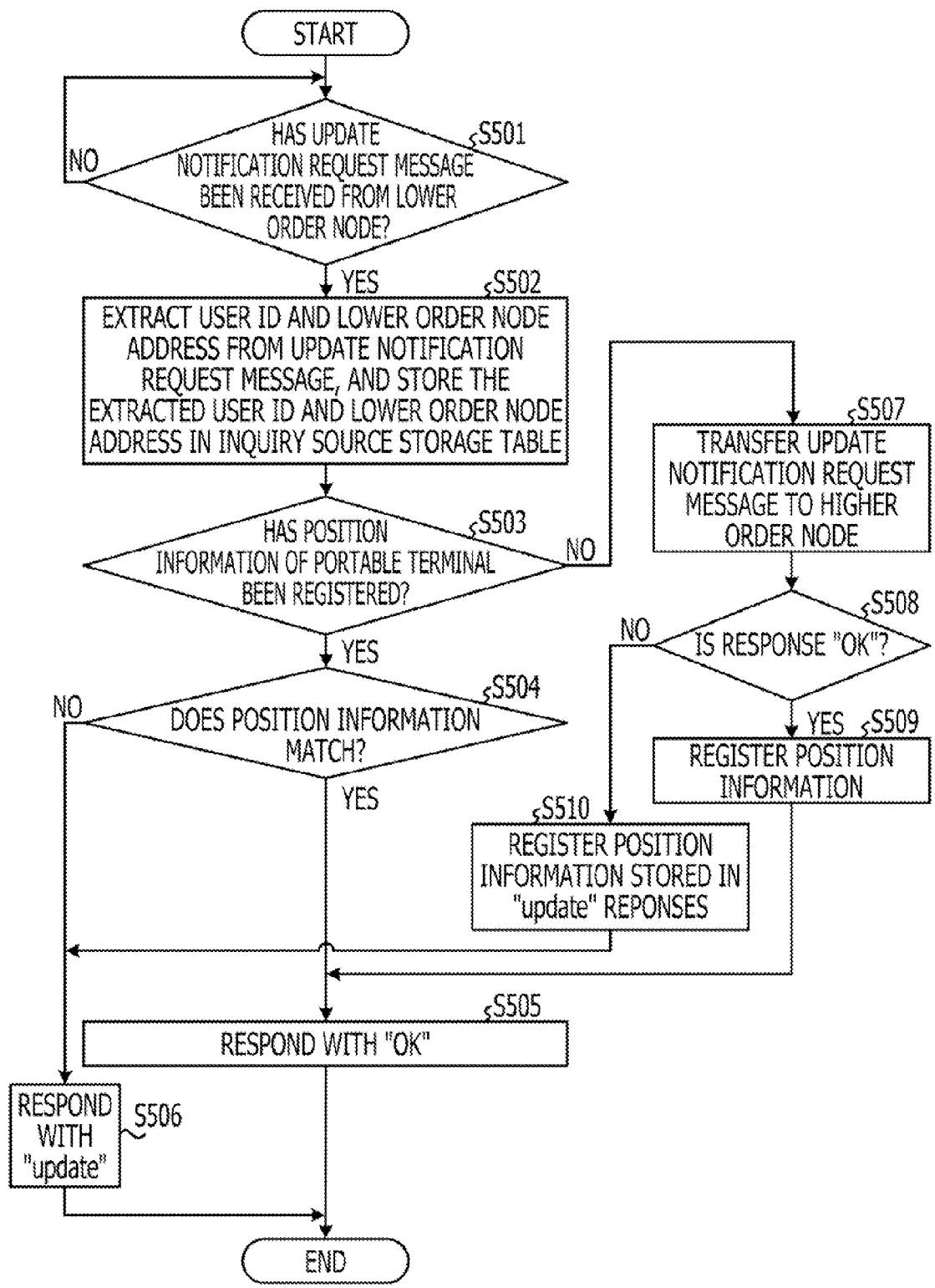
FIG. 19 is a flowchart illustrating process procedures for position information updating request processing by a representative node according to the second embodiment.

Processing Procedures of Position Information Update Request Processing by Representative Node According to Second Embodiment Next, the processing procedures of the position information update request processing by the representative node 400a according to the second embodiment will be described with reference to FIG. 19. FIG. 19 is a flowchart illustrating the processing procedures of the position information update request processing by the representative node 400a according to the second embodiment.

In the case that an update notification request is received from the intermediate node 300a or the lower order relay node (Yes in operation S501), the lower order node message receiving unit 231 executes the processing in operation S502. That is to say, the lower order node message receiving unit 231 extracts the user ID and lower order node address and position information from the update notification request message, and stores the extracted user ID and lower order node address in the inquiry source storage table 221 (operation S502). Next, the position information searching unit 232 determines whether or not the position information of the portable terminal 10 is registered (operation S503).

In the case determination is made that the position information of the portable terminal 10 is registered (Yes in operation S503), the position information searching unit 232 determines whether or not the position information matches (operation S504). In the case determination is made by the position information searching unit 232 that the position information matches (Yes in operation S504), the lower order node message transmission unit 235 responds with "OK" (operation S505), and ends the processing. On the other hand, in the case determination is made by the position information searching unit 232 that the position information does not match (No in operation S504), the lower order node message transmission unit 235 responds with "update" (operation S506), and ends the processing.

In the case determination is made by the position information searching unit 232 that the position information of ht portable terminal 10 is not registered (No in operation S503), the position information requesting unit 433 transmits an update notification request message to the higher order node (operation S507). Next, the position information processing unit 434 receives a response from the higher order node, and determines whether or not the received response is "OK" (operation S508).

In the case determination is made that the received response is "OK" (Yes in operation S508), the position information processing unit 434 registers the position information (operation S509), and goes to the processing in operation S505. On the other hand, in the case determination is made that the received response is not "OK" (No in operation S508), the position information processing unit 434 registers the position information stored in the "update" response (operation S510), and goes to the processing in operation S506.

Figure 20:
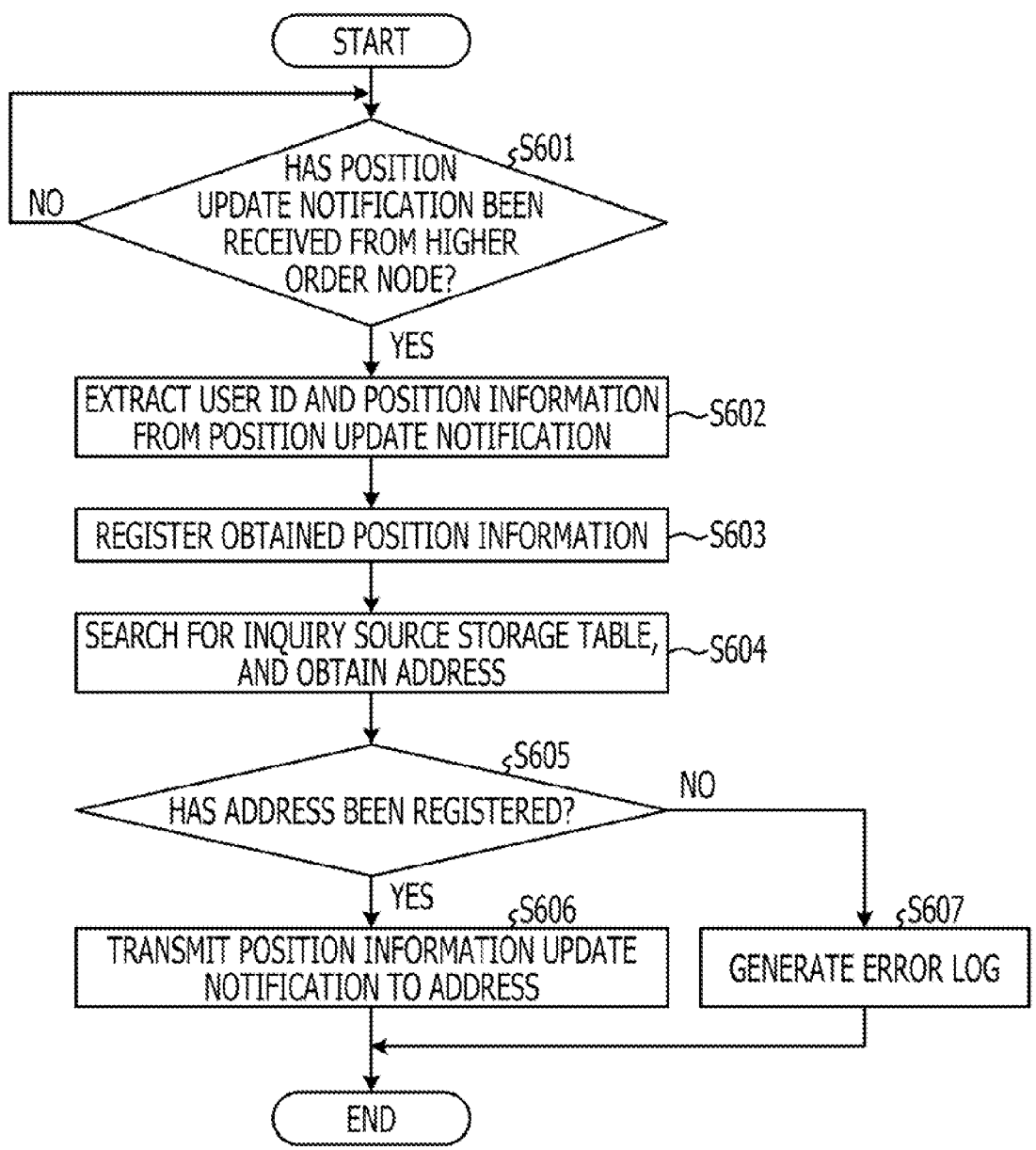
FIG. 20 is a flowchart illustrating process procedures for position information updating notification reception processing by a representative node according to the second embodiment.

Processing Procedures of Position Information Update Notification Receiving Processing by Representative Node According to Second Embodiment Next, the processing procedures of the position information update notification receiving processing by the representative node 400a according to the second embodiment will be described with reference to FIG. 20. FIG. 20 is a flowchart illustrating the processing procedures of the position information update notification receiving processing by the representative node 400a according to the second embodiment.

In the case that a position update notification is received from the position managing server 30 or higher order node (Yes in operation S601), the position information processing unit 434 extracts the user ID and position information from the position update notification (operation S602). Next, the position information processing unit 434 registers the extracted position information (operation S603).

The position information processing unit 434 searches the inquiry source storage table 221, obtains the address of the inquiry source (operation S604), and determines whether or not the address is registered (operation S605). In the case determination is made by the position information processing unit 434 that the address is registered (Yes in operation S605), the lower order node message transmission unit 235 transmits the position information update notification to the obtained address (operation S606). On the other hand, in the case determination is made by the position information processing unit 434 that the address is not registered (No in operation S605), the lower order node message transmission unit 235 generates and outputs an error log(operation S607).

Figure 21:
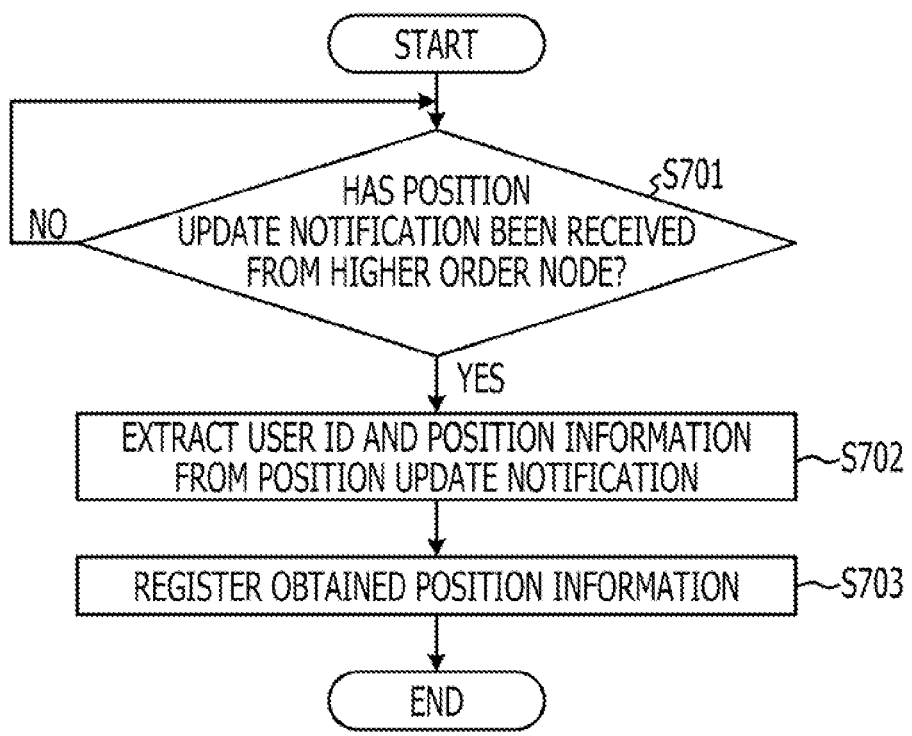
FIG. 21 is a flowchart illustrating process procedures for position information updating notification reception processing by an intermediate node according to the second embodiment.

Processing Procedures of Position Information Update Notification Receiving Processing by Intermediate Node According to Second Embodiment Next, the processing procedures of the position information update notification receiving processing by the intermediate node 300a according to the second embodiment will be described with reference to FIG. 21. FIG. 21 is a flowchart illustrating the processing procedures of the position information update notification receiving processing by the intermediate node 300a according to the second embodiment.

In the case a position update notification is received from the higher order node (Yes in operation S701), the position information processing unit 336 extracts the user ID and position information from the position update notification (operation S702). Next, the position information processing unit 336 registers the extracted position information (operation S703).

Advantages of Second Embodiment

As described above, according to the second embodiment, by comparing the position information obtained by the intermediate node 300a and the position information stored by the higher order node, accurate position information can be obtained even if the position of the portable terminal 10 changes after the position information of the portable terminal 10 is obtained.

Third Embodiment

Description has been given of an example according to the second embodiment wherein the relay system obtains position information, and if there is any change to the obtained position information, an update notification is received. However, there may be cases in a relay system wherein there is change to the higher order node. Thus, with a third embodiment, description will be given of an example wherein, in the case that there is a change to the higher order node in a relay system, the intermediate node transmits a delivery stop request and delivery request to the relay node.

Configuration of Relay System According to Third Embodiment

Figure 22:
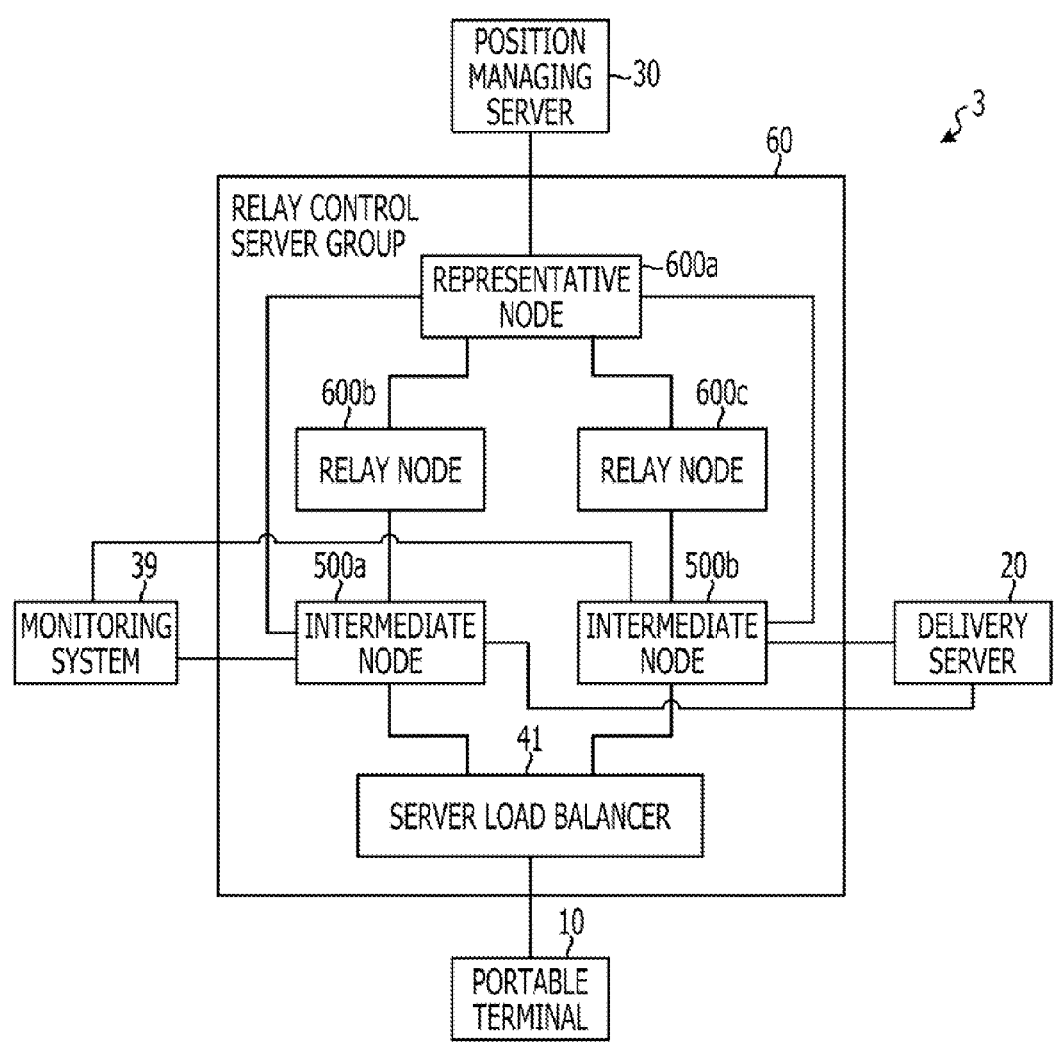
FIG. 22 is a diagram illustrating a configuration of a relay system according to a third embodiment.

Next, a configuration of the relay system 3 according to a third embodiment will be described. FIG. 22 is a diagram illustrating a configuration of the relay system according to the third embodiment. The relay system 3 according to the third embodiment has a portable terminal 10, delivery server 20, position managing server 30, monitoring system 39, and relay control server group 60. Note that functional units that perform substantially similar roles as other units shown in FIG. 2 will be denoted with the same reference numerals, and detailed description thereof will be omitted.

The monitoring system 39 is a server that monitors the relay system 3. For example, regardless of there being multiple relay nodes, the monitoring system 39 monitors the load state of the relay system 3 by determining whether or not the intermediate node is connected only to identified relay nodes. Also, in the case of receiving notification from the monitoring person that the direct connections relation of the intermediate node and relay node in the relay system 3 is changed, the monitoring system 39 transmits a relay node change message to the intermediate nodes 500a and 500b.

Configuration of Intermediate Control Server Group According to Third Embodiment The relay control server group 60 according to the third embodiment has a server load balancer 41, intermediate node 500a, intermediate node 500b, representative node 600a, relay node 600b, and relay node 600c.

Configuration of Intermediate Node According to Third Embodiment

Figure 23:
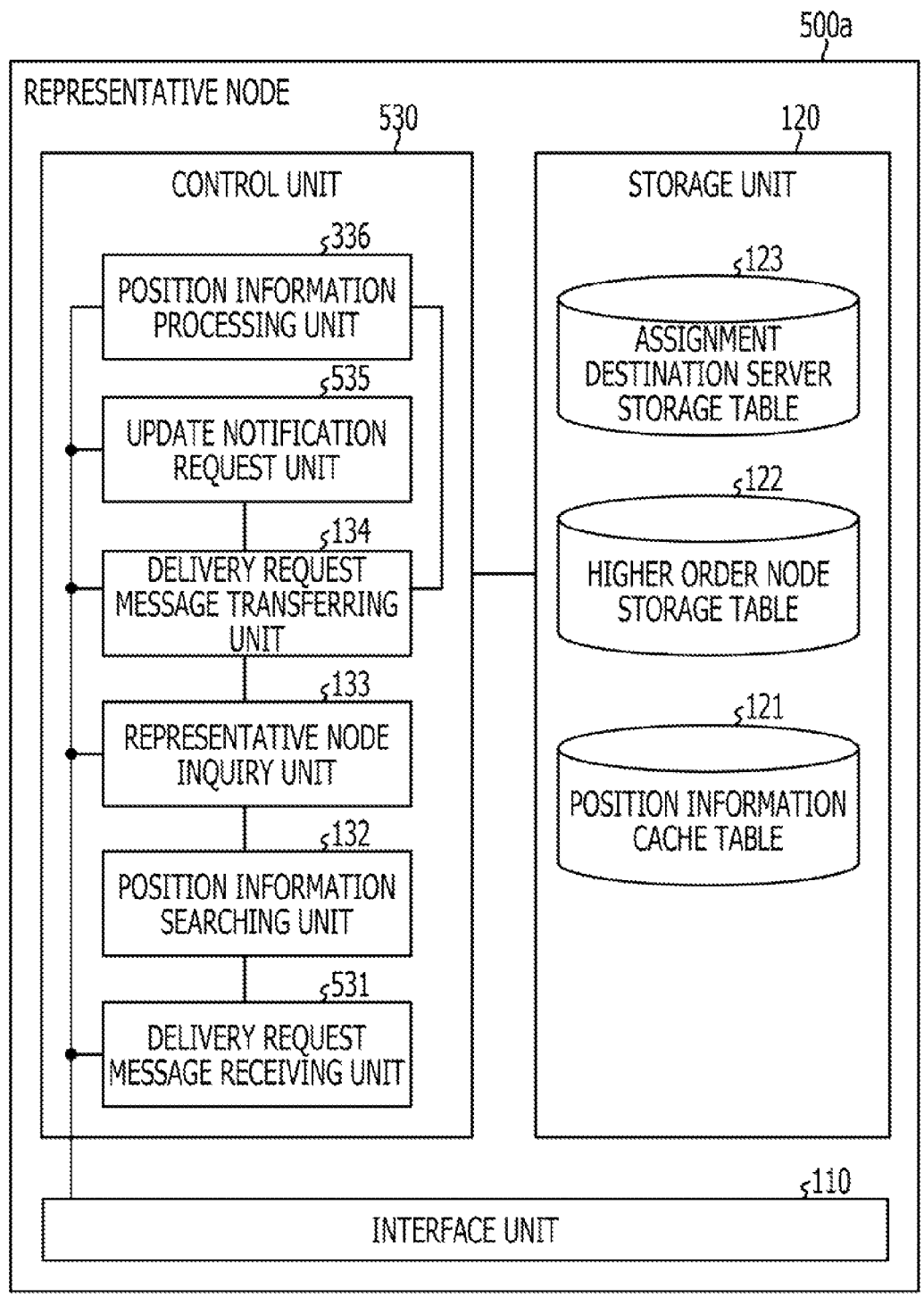
FIG. 23 is a block diagram illustrating a configuration of the intermediate note according to the third embodiment.

Next, a configuration of the intermediate node according to the third embodiment will be described. Note that the intermediate node 500a and intermediate node 500b have substantially similar configurations, so only the intermediate node 500a will be described here. FIG. 23 is a block diagram illustrating a configuration of the intermediate node 500a according to the third embodiment. The intermediate node 500a according to the third embodiment has an interface unit 110, storage unit 120, and control unit 530. Note that besides these functions, an input unit such as a keyboard and mouse, and an output unit such as a monitor and speaker, may also be provided. Note that functional units that perform substantially similar roles as other units shown in FIGS. 3 and 15 will be denoted by the same reference numerals, and detailed description thereof will be omitted.

The control unit 530 has an internal memory for storing control programs, programs stipulating various types of processing procedures, and data. The control unit 530 has a delivery request message receiving unit 531, position information searching unit 132, representative node inquiry unit 133, delivery request message transfer unit 134, update notification request unit 535, and position information processing unit 336. For example, the control unit 430 may be an integrated circuit such as ASIC or FPGA, or an electronic circuit such as a CPU or MPU.

The delivery request message receiving unit 531 further has functions in addition to the functions of the delivery request message receiving unit 131 described with the first embodiment. For example, the delivery request message receiving unit 531 receives a relay node change message from the monitoring system, and extracts the user ID and relay node address from the received relay node change message.

The update notification request unit 535 further has functions in addition to the functions of the update notification request unit 335 described with the second embodiment. For example, the update notification request unit 535 generates a position update notification request message storing the user ID and position information, and transmits the generated position update notification request message to the address after the change.

Configuration of Representative Node According to Third Embodiment

Figure 24:
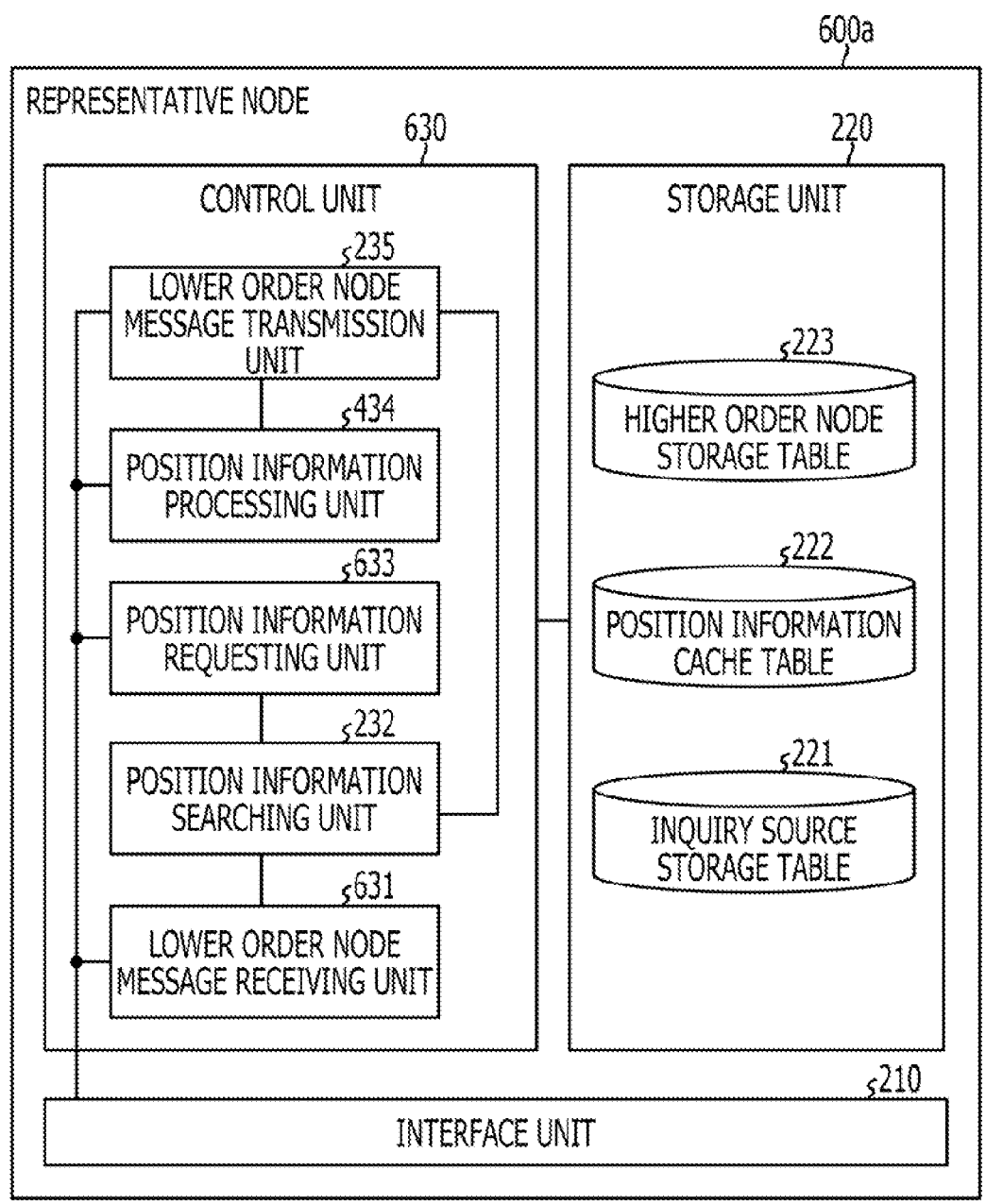
FIG. 24 is a block diagram illustrating a configuration of the representative node according to the third embodiment.

Next, a configuration of the representative node 600a according to the third embodiment will be described with reference to FIG. 24. Note that the representative node 600a, relay node 600b, and relay node 600c have substantially similar configurations so only the representative node 600a will be described here. FIG. 24 is a block diagram illustrating the configuration of the representative node 600a according to the third embodiment. The representative node 600a according to the third embodiment has an interface unit 210, storage unit 220, and control unit 630. Note that besides these functions, an input unit such as a keyboard and mouse, and an output unit such as a monitor and speaker, may also be provided. Note that functional units that perform substantially similar roles as other units shown in FIGS. 8 and 16 will be denoted with the same reference numerals will be appended thereto, and detailed description thereof will be omitted.

The control unit 630 has an internal memory for storing control programs, programs stipulating various types of processing procedures, and data. The control unit 630 has a lower order node message receiving unit 631, position information searching unit 232, position information requesting unit 633, position information processing unit 434, and lower order node message transmission unit 235. For example, the control unit 630 may be an integrated circuit such as ASIC or FPGA, or an electronic circuit such as a CPU or MPU.

The lower order node message receiving unit 631 further has functions in addition to the functions of the lower order node message receiving unit 231 described with the first embodiment. The lower order node message receiving unit 631 receives the position update request from the lower order node, and extracts the user ID from the received position update request. The lower order node message receiving unit 631 searches for an entry in the inquiry source storage table 221 whereby the user ID and address match, and deletes an entry whereby the user ID and address match from the inquiry source storage table 221.

The position information request unit 633 further has functions in addition to the functions of the position information request unit 433 described with the second embodiment. The position information request unit 633 searches the higher order node storage table 223 with the user ID as a key, and obtains the address of the higher order node. The position information request unit 633 transmits an update notification stop message to the higher order node for which an address is obtained.

Processing Procedures for Processing by Relay System According to Third Embodiment (Processing Procedures of Relay Node Change Processing by Intermediate Node According to Third Embodiment)

Figure 25:
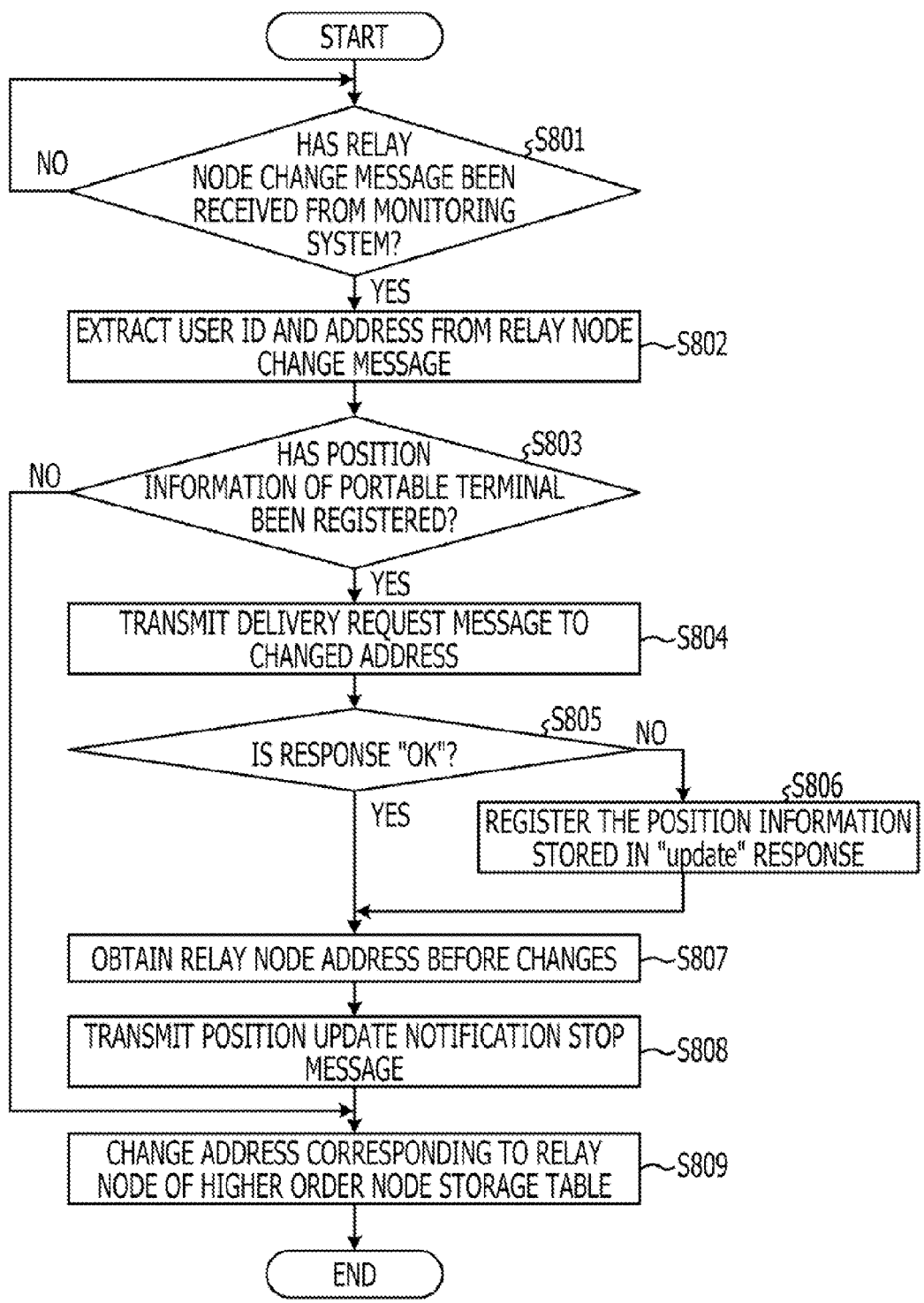
FIG. 25 is a flowchart illustrating processing procedures for relay node changing processing by an intermediate node according to the third embodiment.

The processing procedures of the relay node change processing by the intermediate node according to the third embodiment will be described with reference to FIG. 25. FIG. 25 is a flowchart illustrating the processing procedures of the relay node change processing by the intermediate node according to the third embodiment.

In the case that a relay node change message is received from the monitoring system 39 (Yes in operation S801), the delivery request message receiving unit 531 extracts a user ID and address from the received relay node change message (operation S802). Next, the position information searching unit 132 determines whether or not the position information of the portable terminal 10 is registered (operation S803).

Consequently, in the case determination is made by the position information searching unit 132 that the position information is registered (Yes in operation S803), the update notification request unit 535 transmits a delivery request message to the address after the change (operation S804). Next, the position information processing unit 336 receives a response, and determines whether or not the received response is "OK" (operation S805).

In the case determination is made that the response is not "OK" (No in operation S805), the position information processing unit 336 registers position information stored in the "update" response (operation S806), and obtains the address of the relay node before the change (operation S807). On the other hand, in the case determination is made that the response is "OK" (Yes in operation S805), the position information processing unit 336 obtains the address of the relay node before the change (operation S807).

Next, the update notification request unit 535 transmits a position update notification stop message to the relay node before the change (operation S808), changes the address corresponding to the user and relay node of the higher order node storage table 122 (operation S809), and ends the processing.

On the other hand, in the case determination is made by the position information searching unit 132 that the position information is not registered (No in operation S803), the update notification request unit 535 changes the address corresponding to the user and relay node of the higher order node storage table 122 (operation S809), and ends the processing.

Figure 26:
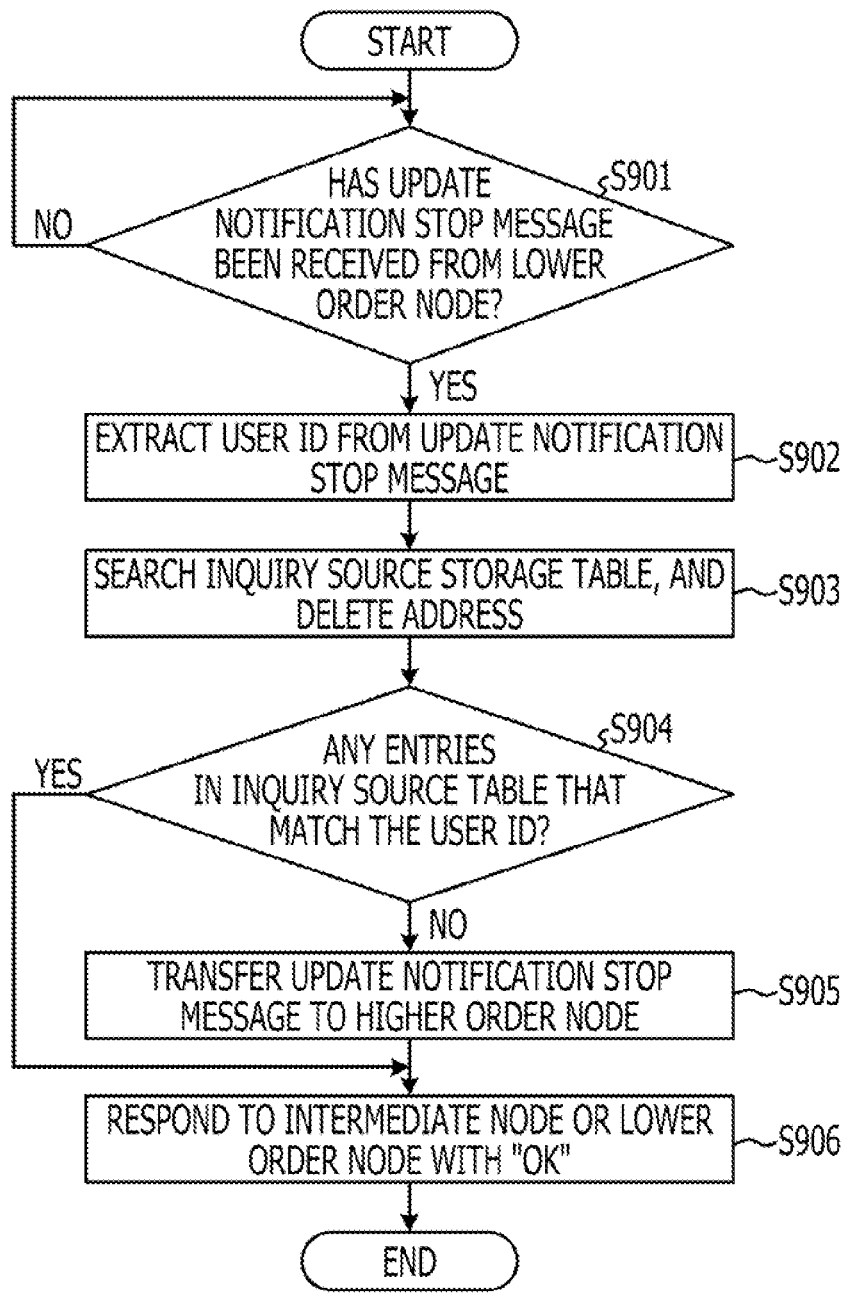
FIG. 26 is a flowchart illustrating processing procedures of position updating notification stopping message reception processing by a representative node according to the third embodiment.

The processing procedures of the position update notification stop message receiving processing by the representative node 600a according to the third embodiment will be described with reference to FIG. 26. FIG. 26 is a flowchart illustrating the processing procedures of the position update notification stop message receiving processing by the representative node 600a according to the third embodiment.

In the case of receiving an update notification stop message from the intermediate node 500a or lower order node (Yes in operation S901), the lower order node message receiving unit 631 extracts the user ID from the update notification stop message (operation S902). Next, the lower order node message receiving unit 631 searches the inquiry source storage table 221, and deletes the address (operation S903). The lower order node message receiving unit 631 then determines whether or not an entry exists wherein the user ID matches the inquiry source storage table 221 (operation S904).

In the case determination is made by the lower order node message receiving unit 631 that an entry does not exist wherein the user ID matches the inquiry source storage table 221 (No in operation S904), the position information request unit 633 executes the processing in operation S905. That is to say, the position information request unit 633 transmits an update notification stop message to the higher order node (operation S905). Next, the lower order node message transmission unit 235 responds with "OK" to the intermediate node 500a or lower order node (operation S906), and ends the processing.

In the case determination is made by the lower order node message receiving unit 631 that an entry exists wherein the user ID matches the inquiry source storage table 221 (Yes in operation S904), the lower order node message transmission unit 235 executes the processing in operation S906. That is to say, the lower order node message transmission unit 235 responds with "OK" to the intermediate node 500a or lower order node (operation S906), and ends the processing.

Advantages of Third Embodiment

As described above, with the third embodiment, regardless of there being multiple relay nodes, in the case that the intermediate node is connected only to an identified relay node, the monitoring system 39 transmits a relay node change message to the intermediate nodes 500a and 500b. Accordingly, with the third embodiment, the relay nodes 600b and 600c can be effectively used.

Fourth Embodiment

Now, there may be cases with a rely system wherein there is no delivery request from a certain portable terminal for a defined amount of time. In such cases, the relay system uselessly stores the position information of the portable terminal. Thus, with the fourth embodiment, description will be given of a case where, in the case that there is no delivery request from a certain portable terminal for a defined amount of time, the position information of the portable terminal is deleted, and a delivery stop request is transmitted to an higher order relay node.

Configuration of Relay System According to Fourth Embodiment

Figure 27:
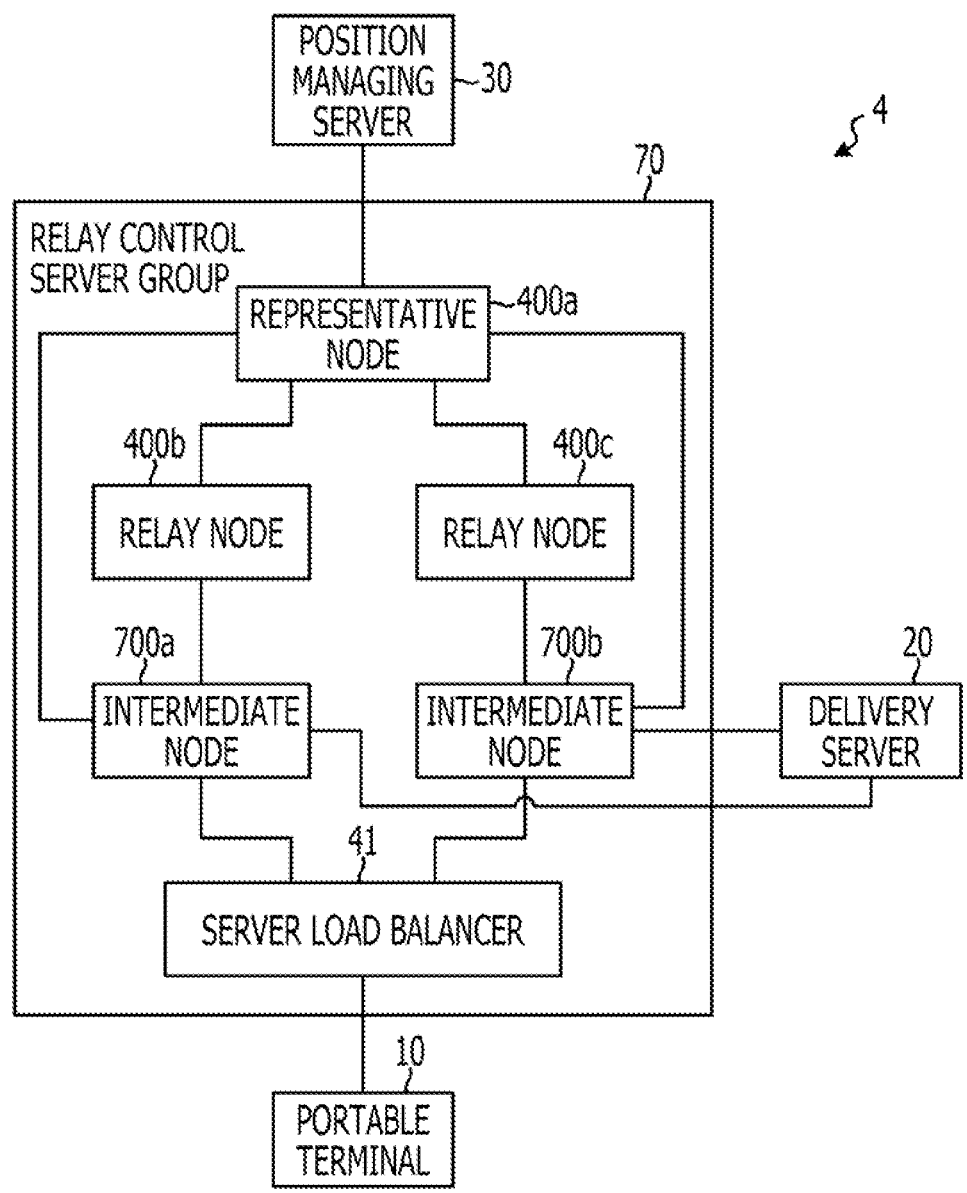
FIG. 27 is a diagram illustrating a configuration of a relay system according to a fourth embodiment.

Next, a configuration of a relay system 4 according to the fourth embodiment will be described. FIG. 27 is a diagram illustrating a configuration of the relay system according to the fourth embodiment. The relay system according to the fourth embodiment has a portable terminal 10, delivery server 20, position managing server 30, and relay control server group 70. Note that functional units that perform substantially similar roles as other units shown in FIG. 1 will be denoted with the same reference numerals, and detailed description thereof will be omitted.

Configuration of Relay Control Server Group According to Fourth Embodiment

The relay control server group 70 according to the fourth embodiment has a server load balancer 41, intermediate node 700a, intermediate node 700b, representative node 400a, relay node 400b, and relay node 400c.

Configuration of Intermediate Node According to Fourth Embodiment

Figure 28:
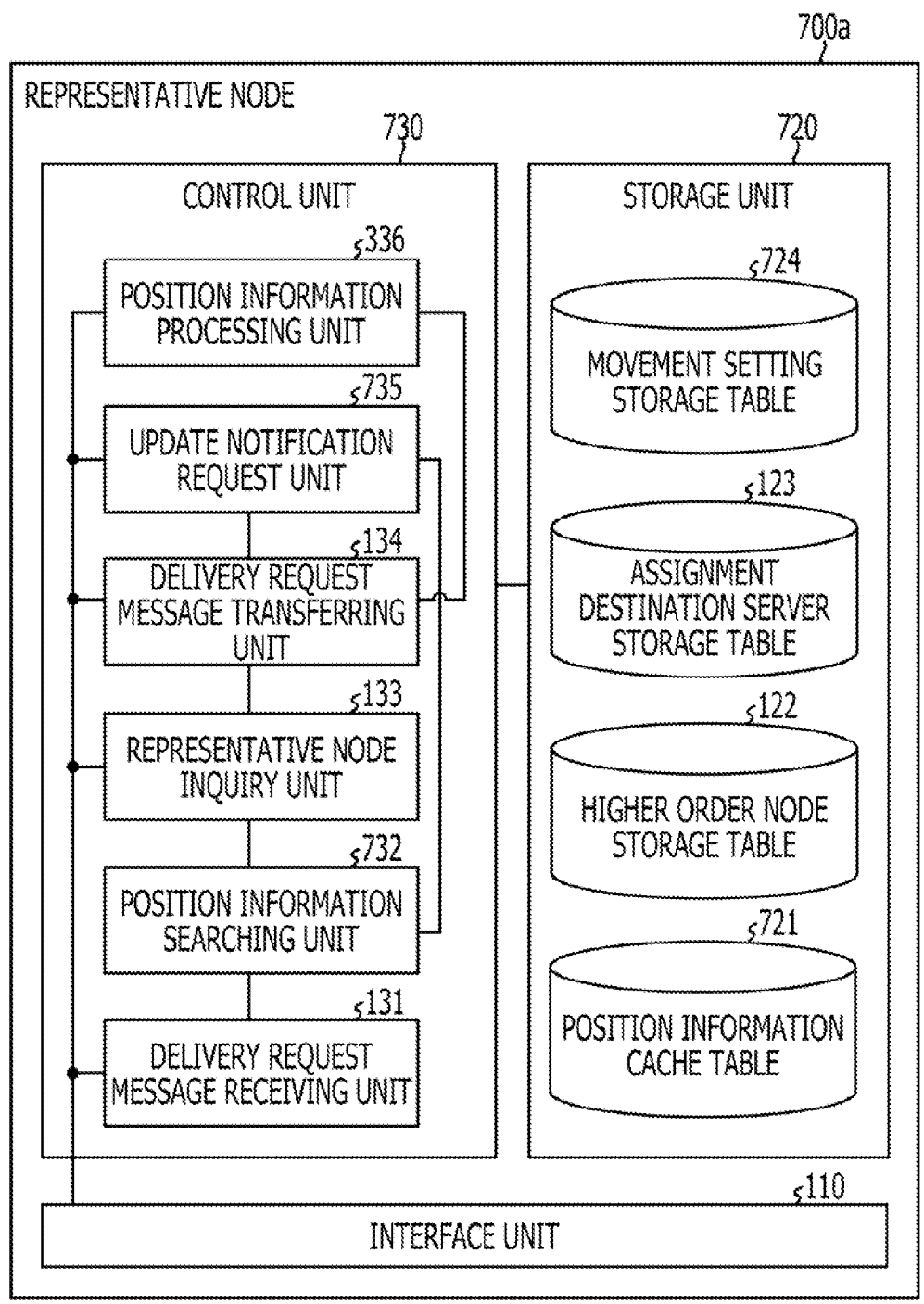
FIG. 28 is a block diagram illustrating a configuration of an intermediate node according to the fourth embodiment.

Next, a configuration of an intermediate node according to the fourth embodiment will be described. Note that the intermediate node 700a and intermediate node 700b have substantially similar configurations, so only the intermediate node 700a will be described here. FIG. 28 is a block diagram illustrating a configuration of the intermediate node 700a according to the fourth embodiment. The intermediate node 700a according to the fourth embodiment has an interface unit 110, storage unit 720, and control unit 730. Note that besides these functions, an input unit such as a keyboard and mouse, and an output unit such as a monitor and speaker, may also be provided. Note that functional units that perform substantially similar roles as other units shown in FIGS. 3 and 15 will be denoted with the same reference numerals, and detailed description thereof will be omitted.

The storage unit 720 has a position information cache table 721, higher order node storage table 122, assignment destination server storage table 123, and movement setting storage table 724.

The position information of the portable terminal 10 is stored in the cache table 721. FIG. 29 is a diagram illustrating an example of information stored as the position information cache table 721. For example, information correlating the "user ID", "position", and "reference time" is stored in the position information cache table 721, as shown in FIG. 29. "User ID" indicates an identifier that uniquely identifies the portable terminal 10. "Position" indicates the position information of the portable terminal 10. "Reference Time" indicates the point-in-time that the position information is referenced. Specifically, in the case of FIG. 29, the portable terminal 10 having the user ID is "Alice" is shown to have referenced the position "Area A" at "13:10:11". Also, in the case of FIG. 29, the portable terminal 10 having the user ID of "Bob" is shown to have referenced the position "Area B" at "13:31:23".

A specified setting time for determining whether or not the information stored in the position information cache table 721 will be discarded is stored in the movement setting storage table 724. For example, FIG. 30 shows that "parameter" and "value" are correlated and stored in the movement setting storage table 724. "Parameter" indicates the movement set beforehand. Also, "value" indicates the specified time. Specifically, in the case of FIG. 30, for a portable terminal 10 that has had no delivery requests for "one hour" or more, determination is made that the cache discarding time has been exceeded, and the position information of the portable terminal 10 will be deleted from the position information cache table 721.

The control unit 730 has an internal memory for storing control programs, programs stipulating various types of processing procedures, and data. The control unit 730 has a delivery request message receiving unit 131, position information searching unit 732, representative node inquiry unit 133, delivery request message transfer unit 134, update notification request unit 735, and position information processing unit 336. Also, in the case that the specified time has passed, the control function may have a function to notify the position information searching unit 732. For example, the control unit 730 may be an integrated circuit such as ASIC or FPGA, or an electronic circuit such as a CPU or MPU.

The position information searching unit 732 further has functions in addition to the functions of the position information searching unit 132 described with the first embodiment. In the case of receiving notification that the specified time that has been set beforehand has passed, the position information searching unit 732 searches the position information cache table 721, and determines whether or not a portable terminal 10 that has not transmitted a delivery request message for more than the "one hour" of cache discarding time exists.

Description will be given using an example of a case wherein the position information searching unit 732 has referenced FIGS. 29 and 30 at "14:20:34". The position information searching unit 732 determines that one hour or more has passed since the previous reference time for the user ID "Alice". That is to say, the position information searching unit 732 determines that the user ID "Alice" has exceeded the cache discarding time of "one hour". On the other hand, the position information searching unit 732 determines that one hour or more has not passed since the previous reference time for the user ID "Bob". That is to say, the position information searching unit 732 determines that the user ID "Bob" has not exceeded the cache discarding time.

The position information searching unit 732 deletes the entry of the portable terminal 10 that has exceeded the cache discarding time. For example, the position information searching unit 732 deletes the entry of the user ID "Alice" shown in FIG. 29 from the position information cache table 721. The position information searching unit 732 notifies the update notification request unit 735 after deleting the entry of the portable terminal 10 that has exceeded the cache discarding time from the position information cache table 721.

The update notification request unit 735 further has functions in addition to the functions of the update notification request unit 335 described with the second embodiment. In the case that the portable terminal 10 has exceeded the cache discarding time, the update notification request unit 735 transmits an update notification stopping message as to the higher order node notifying the position information of the portable terminal 10 herein.

For example, upon accepting notification from the position information searching unit 732 that the portable terminal 10 has exceeded the cache discarding time, the update notification request unit 735 searches the higher order node storage table 122 using the user ID as a key, and obtains the address of the higher order node. The update notification request unit 735 then transmits the update notification stop message storing the user ID to the higher order of the obtained address.

Specifically, upon accepting a notification from the position information searching unit 732 that the user ID "Alice" has exceeded the cache discarding time, the update notification request unit 735 searches the higher order node storage table 122 shown in FIG. 5. The update notification request unit 735 transmits the update notification stop message storing the user ID "Alice" to the searched address "10.11".

Processing Procedures for Processing by Relay System According to Fourth Embodiment (Processing Procedures of Delay Request Message Transfer Processing by Intermediate Node According to Fourth Embodiment)

Figure 31:
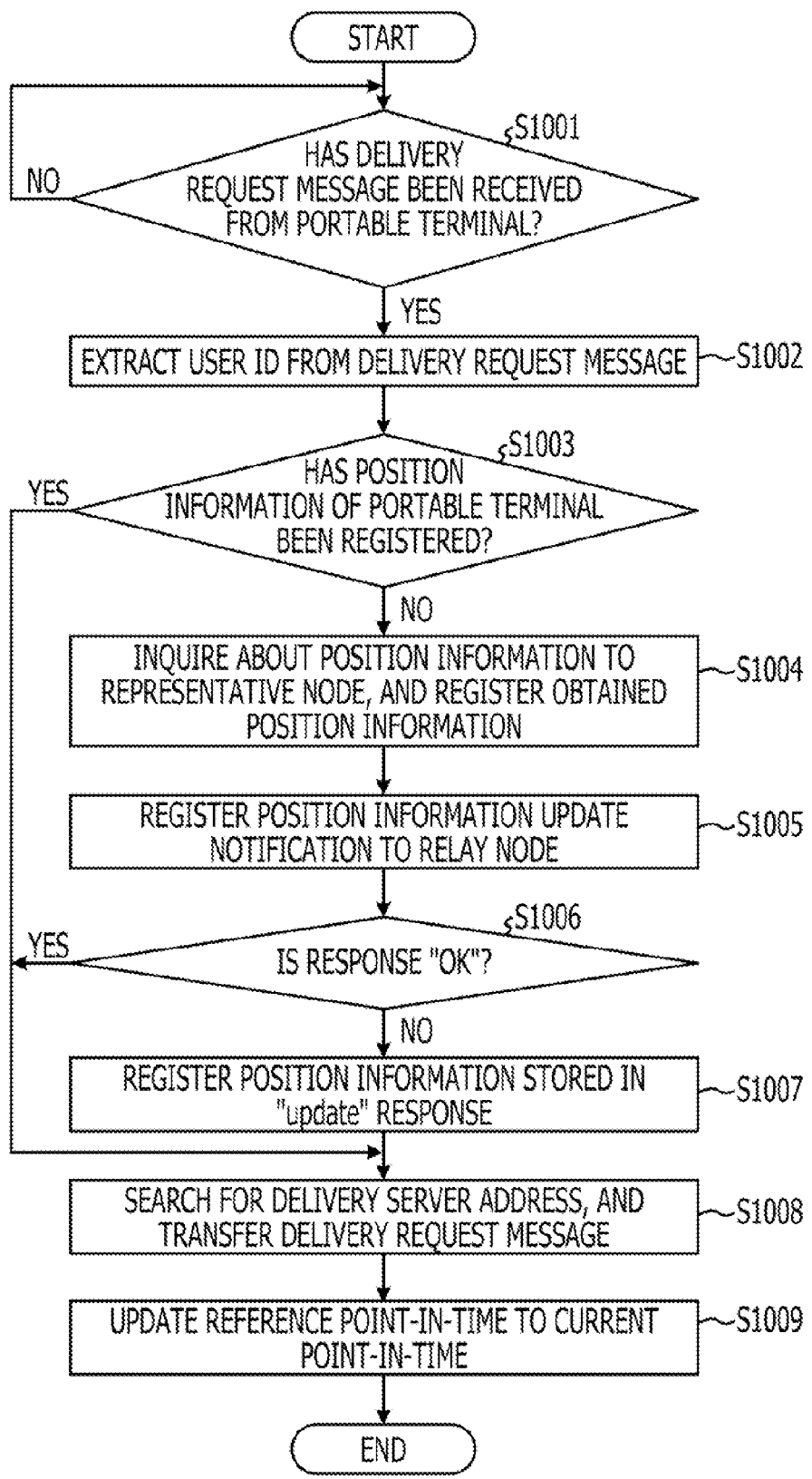
FIG. 31 is a flowchart illustrating processing procedures for delivery request message transfer processing by an intermediate node according to the fourth embodiment.

Next, the processing procedures of the delivery request message transfer processing by the intermediate node 700a according to the fourth embodiment will be described with reference to FIG. 31. FIG. 31 is a flowchart illustrating the processing procedures of the delivery request message transfer processing by the intermediate node 700a according to the fourth embodiment.

In the case of receiving a delivery request message from the portable terminal 10 (Yes in operation S1001), the delivery request message receiving unit 131 extracts the user ID from the delivery request message (operation S1002). Next, the position information searching unit 732 searches the position information cache table 721 using the user ID extracted by the delivery request message receiving unit 131 as a key, and determines whether or not the position information of the portable terminal 10 is registered (operation S1003).

In the case determination is made by the position information searching unit 732 that the position information of the portable terminal 10 is not registered (No in operation S1003), the representative node inquiry unit 133 inquires about the position information of the portable terminal 10 to the representative node 400*a*, and registers the obtained position information (operation S1004). Next, the update notification requesting unit 735 registers the position information update notification in the relay node (operation S1005). The position information processing unit 336 receives a response from the relay node, and determines whether or not the received response is "OK" (operation S1006).

In the case determination is made that the received response is not "OK" (No in operation S1006), the position information processing unit 336 registers the position information stored in the "update" response (operation S1007). Next, the delivery request message transfer unit 134 searches the address of the delivery server 20, and transfers the delivery request message (operation S1008).

In the case determination is made that the response received by the position information processing unit 336 is "OK" (Yes in operation S1006), the delivery request message transfer unit 134 searches for the address of the delivery server 20, and transfers the delivery request message (operation S1008).

In the case determination is made that the position information of the portable terminal 10 is registered by the position information searching unit 732 (Yes in operation S1003), the delivery request message transfer unit 134 searches for the address of the delivery server 20, and transfers the delivery request message (operation S1008).

Upon the delivery request message transferring unit 134 having sent the delivery request message, the position information searching unit 732 updates the reference point-in-time of the position information cache table 721 to the current point-in-time (operation S1009), and ends the processing.

Figure 32:
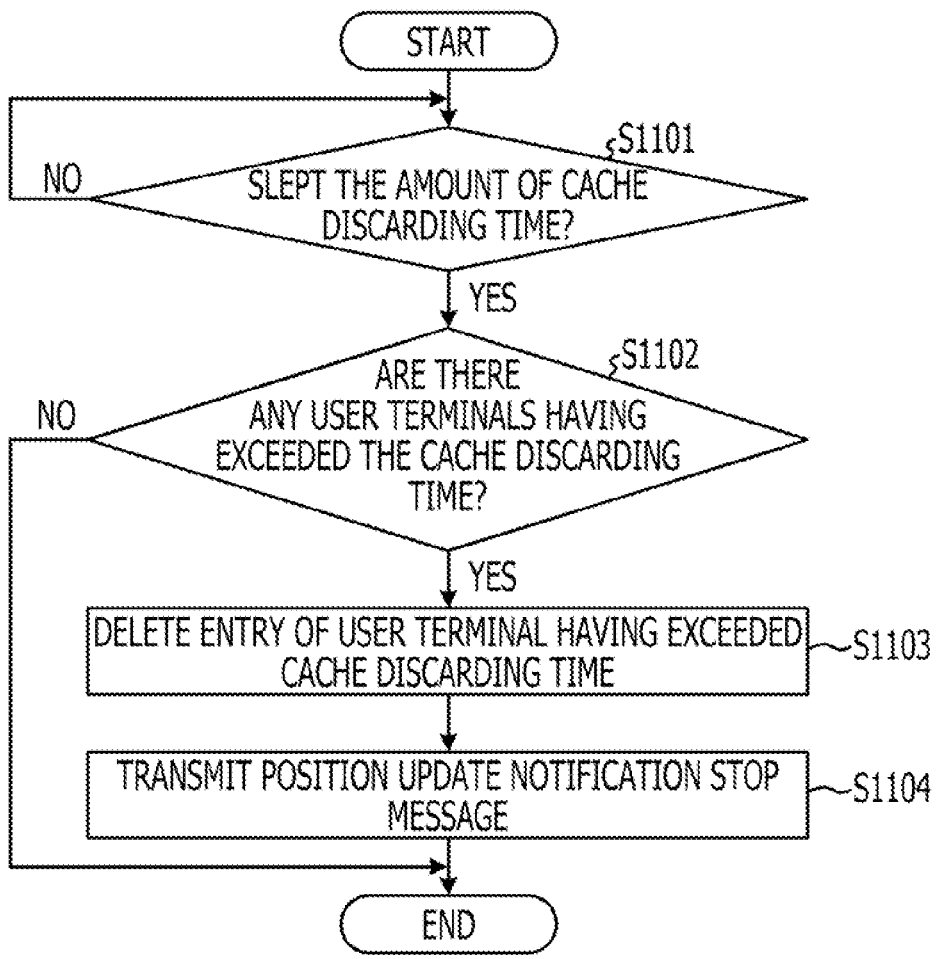
FIG. 32 is a flowchart illustrating processing procedures for position information discarding determining processing by an intermediate node according to the fourth embodiment.

Processing Procedures of Position Information Discard Determining Processing by Intermediate Node According to Fourth Embodiment Next, the processing procedures of the position information discard determining processing by the intermediate node 700*a* according to the fourth embodiment will be described with reference to FIG. 32. FIG. 32 is a flowchart illustrating the processing procedures of the position information discard determining processing by the intermediate node 700*a* according to the fourth embodiment.

In the case that the position information discard determining time has arrived (Yes in operation S1101), the position information searching unit 732 determines whether or not the portable terminal 10 has exceeded the cache discarding time (operation S1102). In the case determination is made that a portable terminal 10 exists which has exceeded the cache discarding time (Yes in operation S1102), the position information searching unit 732 deletes the entry of the portable terminal 10 that has exceeded the cache discarding time (operation S1103).

Next, the update notification request unit 735 transmits the update notification stop message (operation S1104), and ends the processing. On the other hand, in the case determination is made that a portable terminal exists which exceeds the cache discarding time (No in operation S1102), the position information searching unit 732 ends the processing.

Advantages of the Fourth Embodiment

As described above, according to the fourth embodiment, upon the delivery request message transferring unit 134 transmitting the delivery request message, the position information searching unit 732 updates the reference point-in-time of the position information cache table 721 to the current point-in-time. Also, according to the fourth embodiment, the position information of the portable terminal 10 not having transmitted a delivery request message for a specified amount of time is searched for from the position information cache table 721. According to the fourth embodiment, the position information of the portable terminal 10 not having transmitted a delivery request message for a specified amount of time is discarded from the position information cache table 721, thereby effectively using the memory.

Fifth Embodiment

There may be cases in a relay system wherein a problem occurs with the relay node. In such cases, the relay system cannot transfer the delivery request from the portable terminal to the delivery server. Thus, description will be given for an example of a relay system wherein a main relay node and sub relay node are set, and in the case that a problem occurs with the main relay node, the system is switched to the sub relay node.

Configuration of Relay System According to Fifth Embodiment

Figure 33:
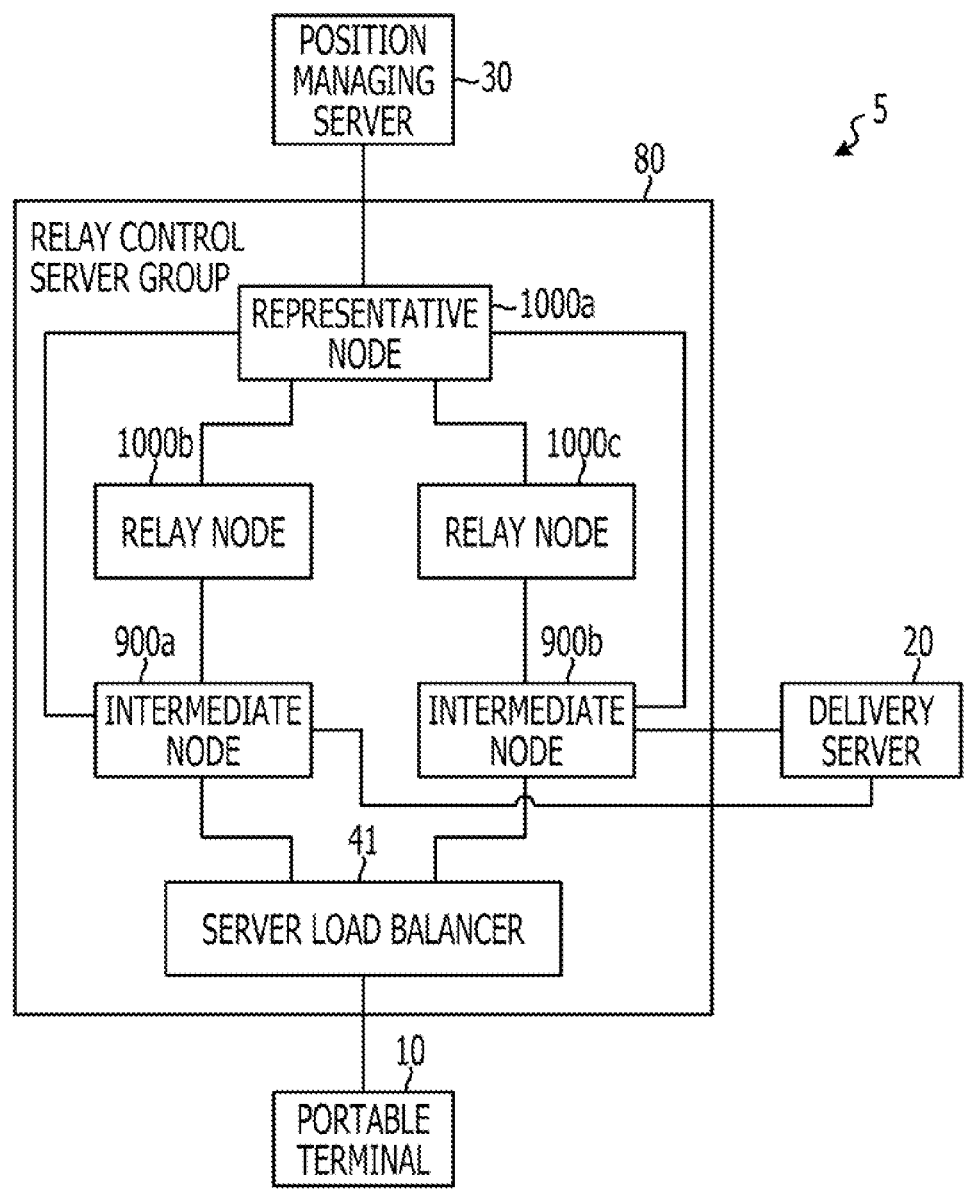
FIG. 33 is a diagram illustrating a configuration of a relay system according to a fifth embodiment.

Next, a configuration of the relay system 5 according to the fifth embodiment will be described. FIG. 33 is a diagram illustrating a configuration of the relay system 5 according to the fifth embodiment. The relay system 5 according to the fifth embodiment has a portable terminal 10, delivery server 20, position managing server 30, and intermediate control server group 80. Note that functional units that perform substantially similar roles as other units shown in FIG. 1 will be denoted with the same reference numerals, and detailed description thereof will be omitted.

Configuration of Relay Control Server Group According to Fifth Embodiment

The intermediate control server group 80 according to the fifth embodiment has a server load balancer 41, intermediate node 900*a*, intermediate node 900*b*, representative node 1000*a*, relay node 1000*b*, and relay node 1000*c*.

Configuration of Intermediate Node According to Fifth Embodiment

Figure 34:
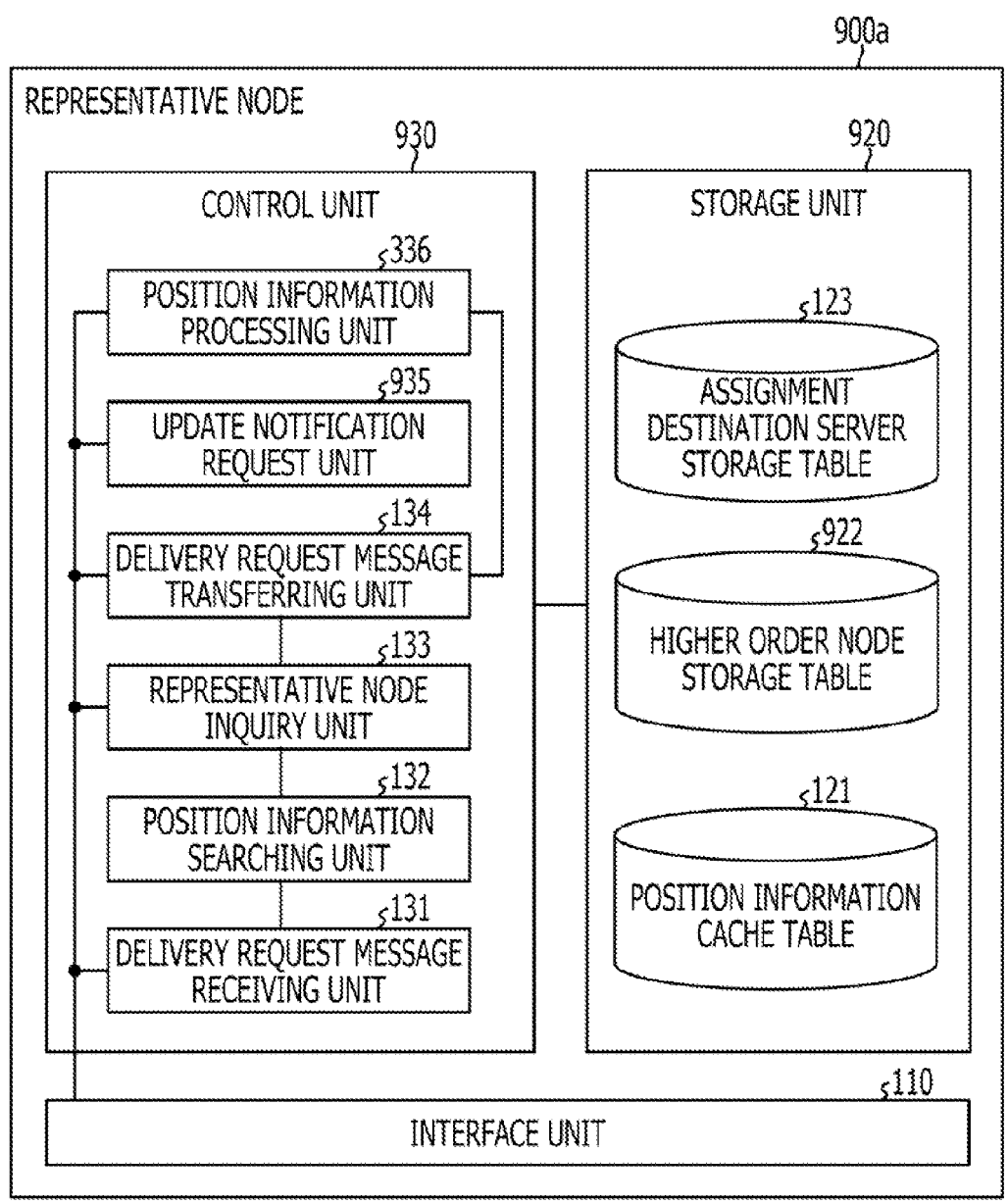
FIG. 34 is a block diagram illustrating a configuration of an intermediate node according to the fifth embodiment.

First, the configuration of an intermediate node according to the fifth embodiment will be described. Note that the intermediate node 900*a* and the intermediate node 900*b* have substantially similar configurations, so only the intermediate node 900*a* will be described here. FIG. 34 is a block diagram illustrating the configuration of the intermediate node 900*a* according to the fifth embodiment. The intermediate node 900*a* according to the fifth embodiment has an interface unit 110, storage unit 920, and control unit 930. Note that besides these functions, an input unit such as a keyboard and mouse, and an output unit such as a monitor and speaker, may also be provided. Note that functional units that perform substantially similar roles as other units shown in FIGS. 3 and 15 will be denoted with the same reference numerals, and detailed description thereof will be omitted.

The storage unit 920 is a storage device such as a semiconductor memory device or hard disk, for example, and has a position information cache table 121, higher order node storage table 922, and assignment destination server storage table 123.

Information of the higher order node connected to the intermediate node 900a is stored in the higher order node storage table 922. FIG. 35 is a diagram illustrating an example of information stored as the higher order node storage table 922. For example, as shown in FIG. 35, information correlating "user ID", "node type", "system", and "address" is stored in the higher order node storage table 922. "User ID" is an identifier that uniquely identifies the portable terminal 10. "Node type" indicates whether the type of higher order node connected to the intermediate node 900a is a representative node or a relay node. "System" indicate whether the relay node connected to the intermediate node 900a is a main or sub node. "Address" indicates the address of the higher order node connected to the intermediate node 900a.

Specifically, in the case of FIG. 35, information showing that the address of the representative node 1000a of the portable terminal 10 having the user IDs of "Alice" and "Tom" is "10.10" is stored. Also, information showing that the address of the main relay node 1000b of the portable terminal 10 having the user IDs of "Alice" and "Tom" is "10.11" is stored. Also, information showing that the address of the sub relay node 1000b of the portable terminal 10 having the user IDs of "Alice" and "Tom" is "10.40" is stored.

The control unit 930 has an internal memory for storing control programs, programs stipulating various types of processing procedures, and data. The control unit 930 has a delivery request message receiving unit 131, position information searching unit 132, representative node inquiry unit 133, delivery request message transfer unit 134, update notification request unit 935, and position information processing unit 336. For example, the control unit 930 may be an integrated circuit such as ASIC or FPGA, or an electronic circuit such as a CPU or MPU.

The update notification request unit 935 further has functions in addition to the functions of the update notification request unit 335 described with the second embodiment. Upon the delivery request message transferring unit 134 transferring the delivery request message, the update notification request unit 935 requests the sub relay node 1000c to register the position information update notification.

Configuration of Representative Node According to Fifth Embodiment

Figure 36:
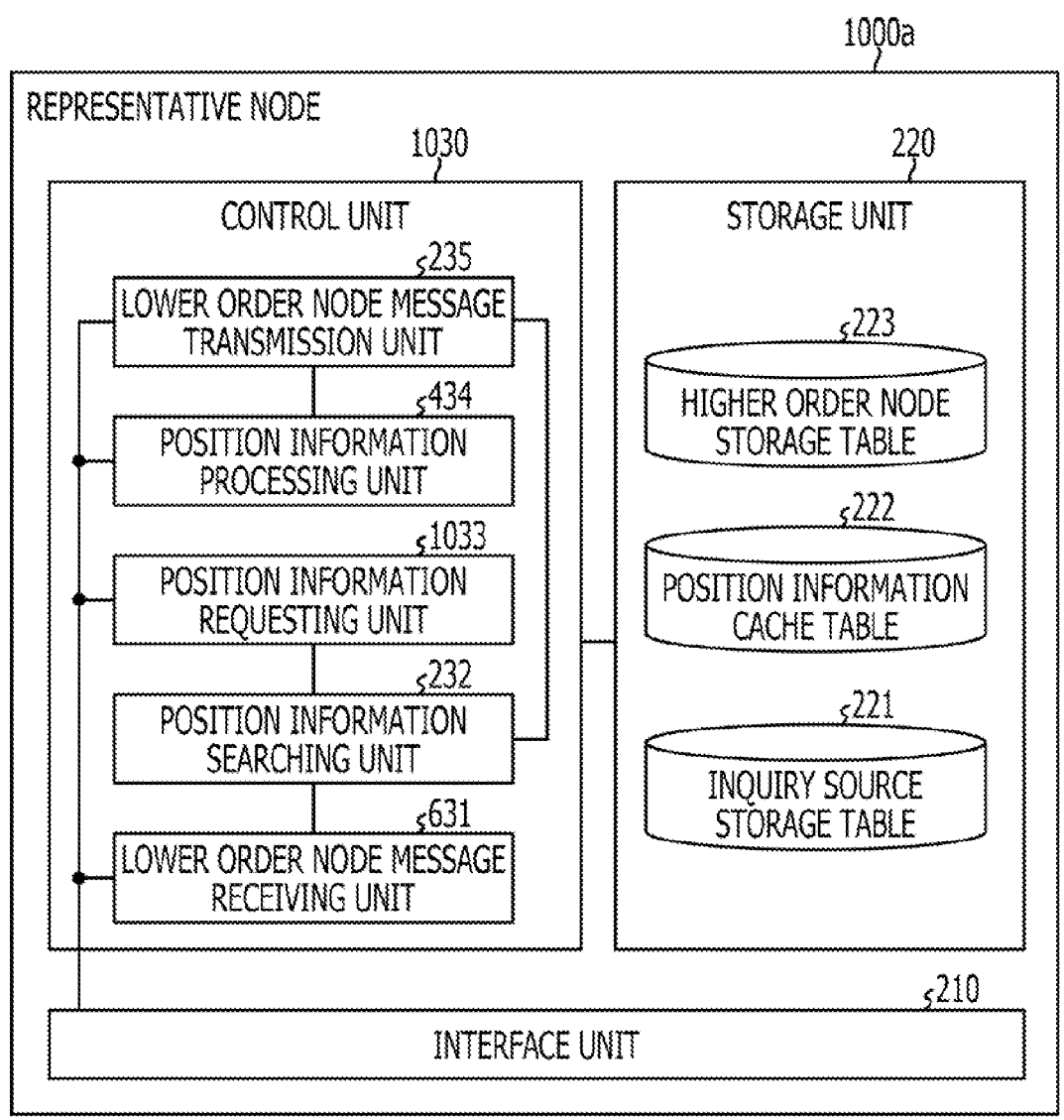
FIG. 36 is a block diagram illustrating a representative node according to the fifth embodiment.

Next, a configuration of the representative node 1000a according to the fifth embodiment will be described. Note that the representative node 1000a, representative node 1000b, and representative node 1000c have substantially similar configurations, so only the representative node 1000a will be described here. FIG. 36 is a block diagram illustrating the configuration of the representative node 1000a according to the fifth embodiment. The representative node 1000a according to the fifth embodiment has an interface unit 210, storage unit 220, and control unit 1030. Also, note that besides these functions, an input unit such as a keyboard and mouse, and an output unit such as a monitor and speaker, may also be provided. Note that functional units that perform substantially similar roles as other units shown in FIGS. 8 and 16 will be denoted with the same reference numerals, and detailed description thereof will be omitted.

The control unit 1030 has an internal memory for storing control programs, programs stipulating various types of processing procedures, and data. The control unit 1030 has a lower order node message receiving unit 631, position information searching unit 232, position information request unit 1033, position information processing unit 434, and lower order node message transmission unit 235. For example, the control unit 1030 may be an integrated circuit such as ASIC or FPGA, or an electronic circuit such as a CPU or MPU.

The position information request unit 1033 further has functions in addition to the functions of the position information request unit 433 described with the second embodiment. In the case that the position information of the portable terminal 10 is updated, the position information request unit 1033 transmits a request to receive notification from the higher order node to the relay node. For example, the position information request unit 1033 searches the higher order node storage table 223 with the user ID as a key, and obtains the address of the sub relay node. The position information request unit 1033 then transmits the update notification request storing the user ID and position information to the sub relay node for which an address has been obtained.

Processing Procedures of Processing by Intermediate System According to Fifth Embodiment (Processing Procedures of Delivery Request Message Transfer Processing by Intermediate Node According to Fifth Embodiment)

Figure 37:
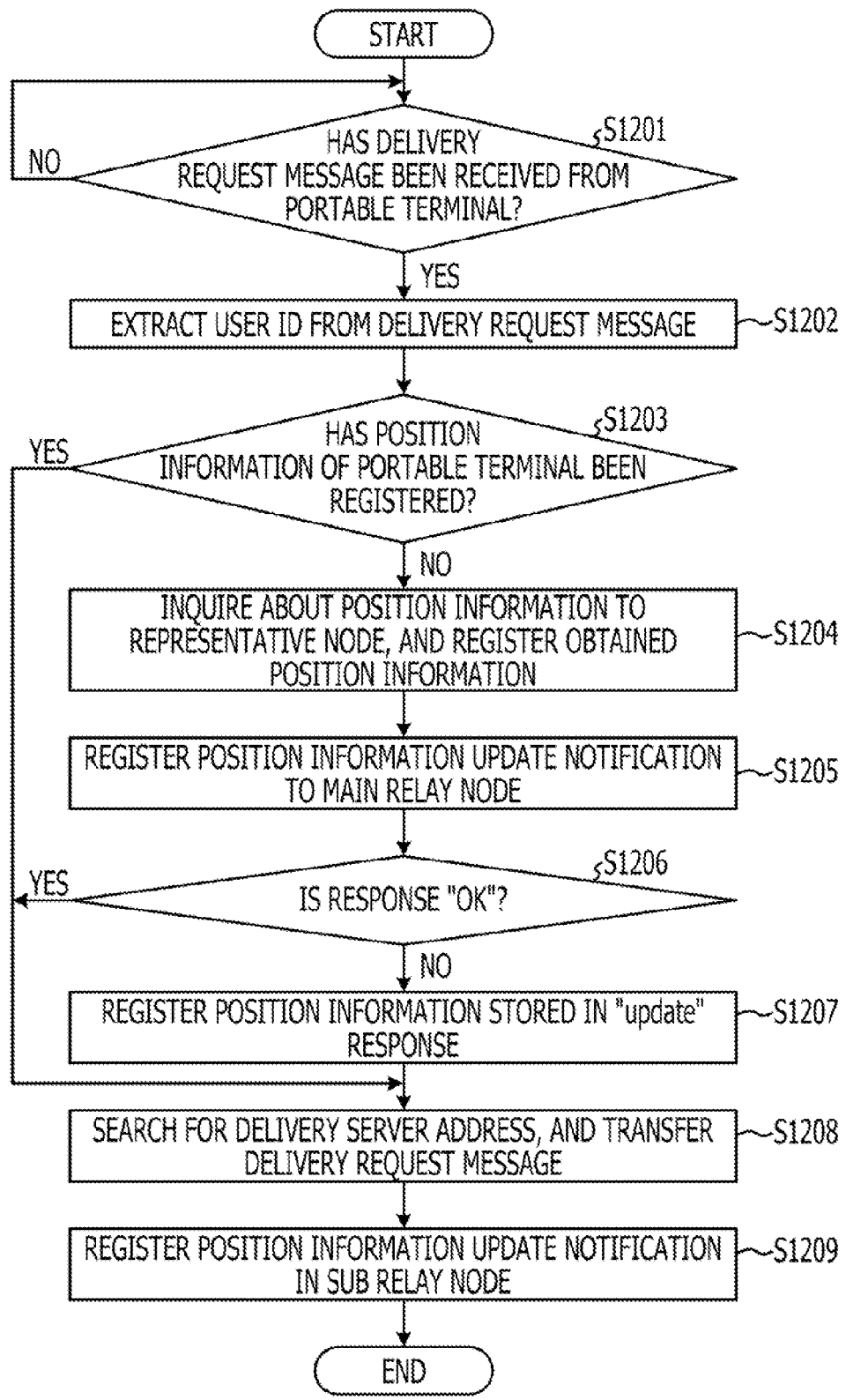
FIG. 37 is a flowchart illustrating processing procedures for delivery request message transfer processing by an intermediate node according to the fifth embodiment.

Next, the processing procedures of the delivery request message transfer processing by the intermediate node 900a according to the fifth embodiment will be described with reference to FIG. 37. FIG. 37 is a flowchart illustrating the processing procedures of the delivery request message transfer processing by the intermediate node 900a according to the fifth embodiment.

In the case that the delivery request message is received from the portable terminal 10 (Yes in operation S1201), the delivery request message receiving unit 131 extracts a user ID from the delivery request message (operation S1202). Next, the position information searching unit 132 searches the position information cache table 121 with the user ID extracted by the delivery request message receiving unit 131 as a key, and determines whether or not the position information of the portable terminal 10 is registered (operation S1203).

In the case determination is made by the position information searching unit 132 that the position information of the portable terminal 10 is not registered (No in operation S1203), the representative node inquiry unit 133 inquires about the position information of the portable terminal 10 to the representative node, and registers the obtained position information (operation S1204). Next, the update notification request unit 935 registers the position information update notification to the main relay node (operation S1205). The position information processing unit 336 then receives a response from the main relay node, and determines whether or not the received response is "OK" (operation S1206).

In the case determination is made that the received response is not "OK" (No in operation S1206), the position information stored in the "update" response is registered (operation S1207). Next, the delivery request message transfer unit 134 searches for the address of the delivery server 20, and transfers the delivery request message (operation S1208).

In the case determination is made that the received response is "OK" (Yes in operation S1206), the delivery request message transfer unit 134 searches for the address of the delivery server 20, and transfers the delivery request message (operation S1208).

In the case determination is made by the position information searching unit 132 that the position information of the portable terminal 10 is registered (Yes in operation S1203), the delivery request message transfer unit 134 searches for the address of the delivery server 20, and transfers the delivery request message (operation S1208).

The update notification request unit 935 registers the position information update notification in the sub relay node (operation S1209), and ends the processing.

Advantages of Fifth Embodiment

As described above, according to the fifth embodiment, by making the relay nodes 1000b and 1000c redundant, the intermediate nodes 900a and 900b can obtain position information in a short time even if a problem occurs with either the relay node 1000b or 1000c.

Sixth Embodiment

In a relay system, the delivery server delivers an application to a portable terminal which is a contractor of an identified service, for example. However, in the case that the user of the portable terminal cancels the contract, the relay system should delete the position information of the portable terminal so as to not delivery an application to the portable terminal. Thus, description will be given for an example of a relay device wherein, based on instructions by a manager, a "delete user message", which is a notification to delete the position information of the portable terminal from the position information cache table, is transmitted from the position managing server to the representative node.

Configuration of Relay System According to Sixth Embodiment

Figure 38:
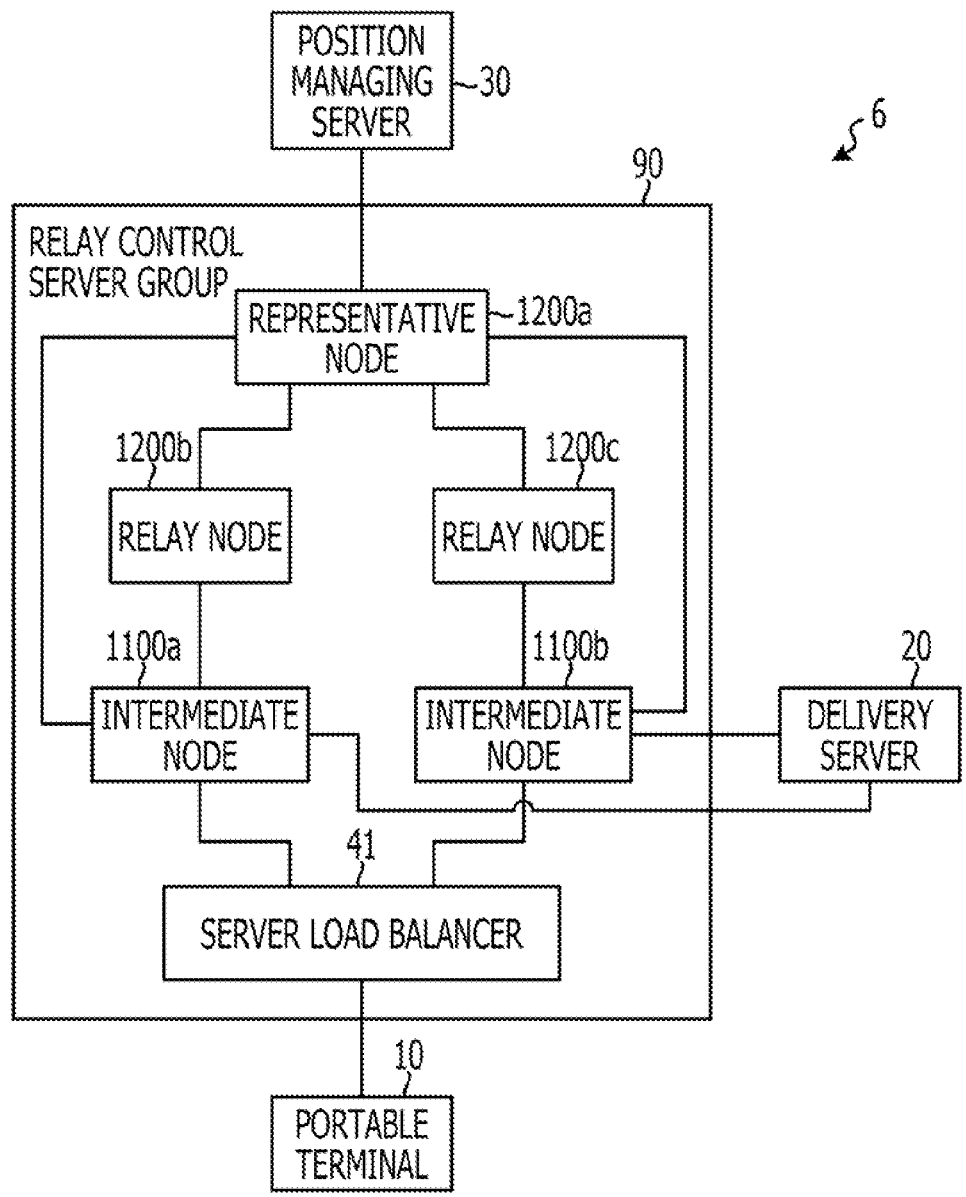
FIG. 38 is a diagram illustrating a configuration of a relay system according to a sixth embodiment.

Next, a configuration of a relay system 6 according to the sixth embodiment will be described. FIG. 38 is a diagram illustrating a configuration of a relay system 6 according to the sixth embodiment. The relay system 6 according to the sixth embodiment has a portable terminal 10, delivery server 20, position managing server 30, and relay control server group 90. Note that functional units that perform substantially similar roles as other units shown in FIG. 1 will be denoted with the same reference numerals, and detailed description thereof will be omitted.

Configuration of Relay Control Server Group According to Sixth Embodiment

The relay control server group 90 according to the sixth embodiment has a server load balancer 41, intermediate node 1100a, intermediate node 1100b, representative node 1200a, relay node 1200b, and relay node 1200c.

Configuration of Intermediate Node According to Sixth Embodiment

Figure 39:
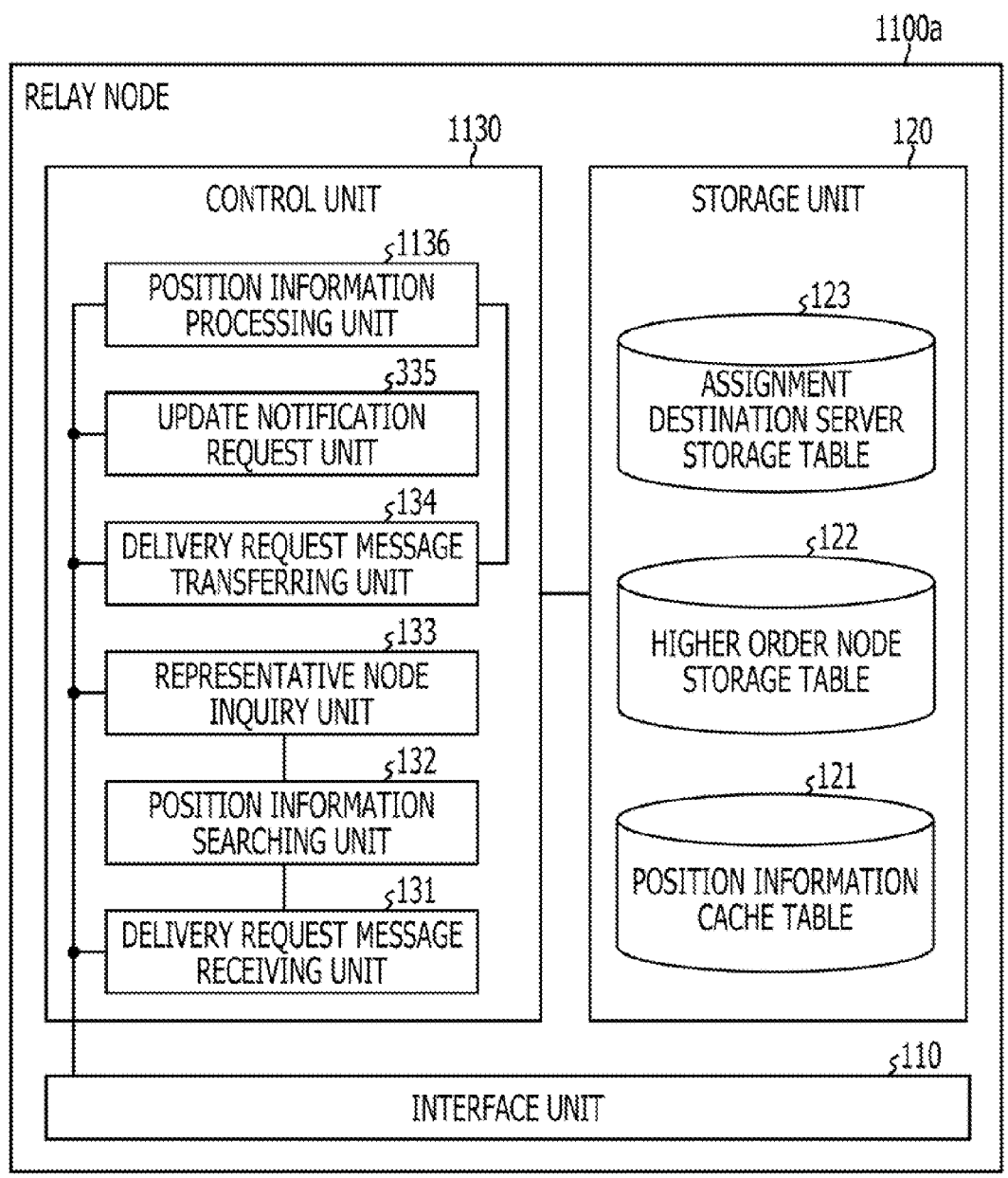
FIG. 39 is a block diagram illustrating a configuration of an intermediate node according to the sixth embodiment.

First, a configuration of the intermediate node according to the sixth embodiment will be described. Note that the intermediate node 1100a and intermediate node 1100b have substantially similar configurations, so only the intermediate node 1100a will be described here. FIG. 39 is a block diagram illustrating the configuration of the intermediate node according to the sixth embodiment. The intermediate node according to the sixth embodiment has an interface unit 110, storage unit 120, and control unit 1130. Note that besides these functions, an input unit such as a keyboard and mouse, and an output unit such as a monitor and speaker, may also be provided. Note that functional units that perform substantially similar roles as other units shown in FIGS. 3 and 15 will be denoted with the same reference numerals, and detailed description thereof will be omitted.

The control unit 1130 has an internal memory for storing control programs, programs stipulating various types of processing procedures, and data. The control unit 1130 has a delivery request message receiving unit 131, position information searching unit 132, representative node inquiry unit 133, delivery request message transfer unit 134, update notification request unit 335, and position information processing unit 1136. For example, the control unit 1130 may be an integrated circuit such as ASIC or FPGA, or an electronic circuit such as a CPU or MPU.

In the case of receiving a delete user message from the relay node 1200b which is a path control node, the position information processing unit 1136 extracts the user ID from the delete user message. The position information processing unit 1136 deletes the user entry from the position information cache table 121 and higher order node storage table 122, and ends the processing.

Configuration of Representative Node According to Sixth Embodiment

Figure 40:
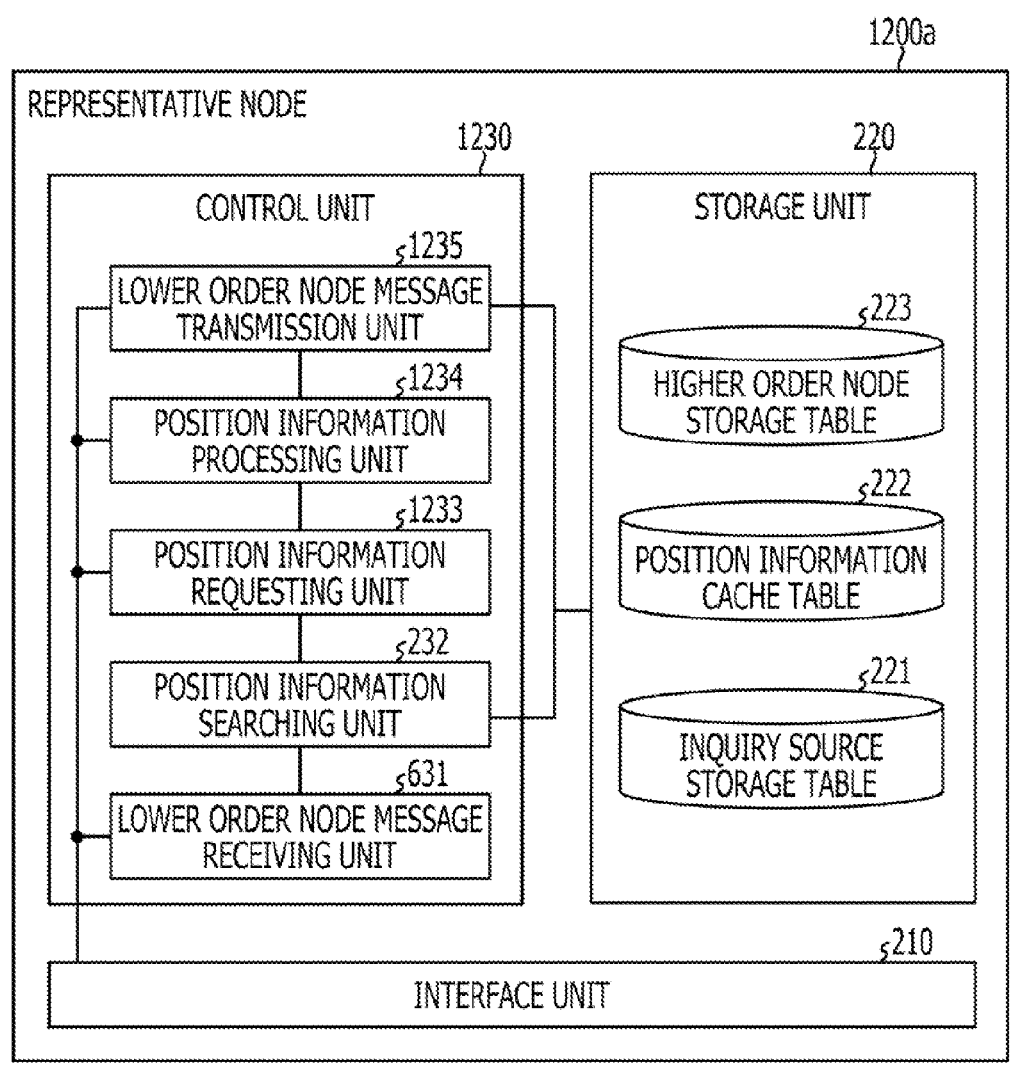
FIG. 40 is a block diagram illustrating a configuration of a representative node according to the sixth embodiment.

Next, a configuration of the representative node 1200a according to the sixth embodiment will be described. Note that the representative node 1200a and the relay nodes 1200b and 1200c have substantially similar configurations, so only the representative node 1200a will be described here. FIG. 40 is a block diagram illustrating a configuration of the representative node 1200a according to the sixth embodiment. The representative node 1200a according to the sixth embodiment has an interface unit 210, storage unit 220, and control unit 1230. Note that besides these functions, an input unit such as a keyboard and mouse, and an output unit such as a monitor and speaker, may also be provided. Note that functional units that perform substantially similar roles as other units shown in FIG. 8 will be denoted with the same reference numerals, and detailed description thereof will be omitted.

The control unit 1230 has an internal memory for storing control programs, programs stipulating various types of processing procedures, and data. The control unit 1230 has a lower order node message receiving unit 631, position information searching unit 232, position information request unit 1233, position information processing unit 1234, and lower order node message transmission unit 1235. For example, the control unit 1230 may be an integrated circuit such as ASIC or FPGA, or an electronic circuit such as a CPU or MPU.

The position information request unit 1233 further has functions in addition to the functions of the position information request unit 433 described with the second embodiment. In the case that the position information processing unit 1234 receives a delete user message from the position managing server 30, the position information request unit 1233 transmits the update notification stop message to the position managing server 30.

The position information processing unit 1234 further has functions in addition to the functions of the position information processing unit 434 described with the second embodiment. In the case that a delete user message is received from the position managing server 30, the position information processing unit 1234 extracts the user ID from the delete user message. For example, in the case determination is made that there is an entry that matches the user ID, the position information processing unit 1234 notifies the lower order node message transmission unit 1235. Also, the position information processing unit 1234 deletes the entry of the applicable portable terminal from the position information cache table 222, inquiry source storage table 221, and higher order node storage table 223. Also, in the case that a delete user message is received from the position managing server 30, the position information processing unit 1234 notifies the position information request unit 1233.

The lower order node message transmission unit 1235 has functions in addition to the functions of the lower order node message transmission unit 235 described with the first embodiment. In the case that a notification is accepted from the position information processing unit 1234, the lower order node message transmission unit 1235 transmits a delete user message to the inquiry source node.

Figure 41:
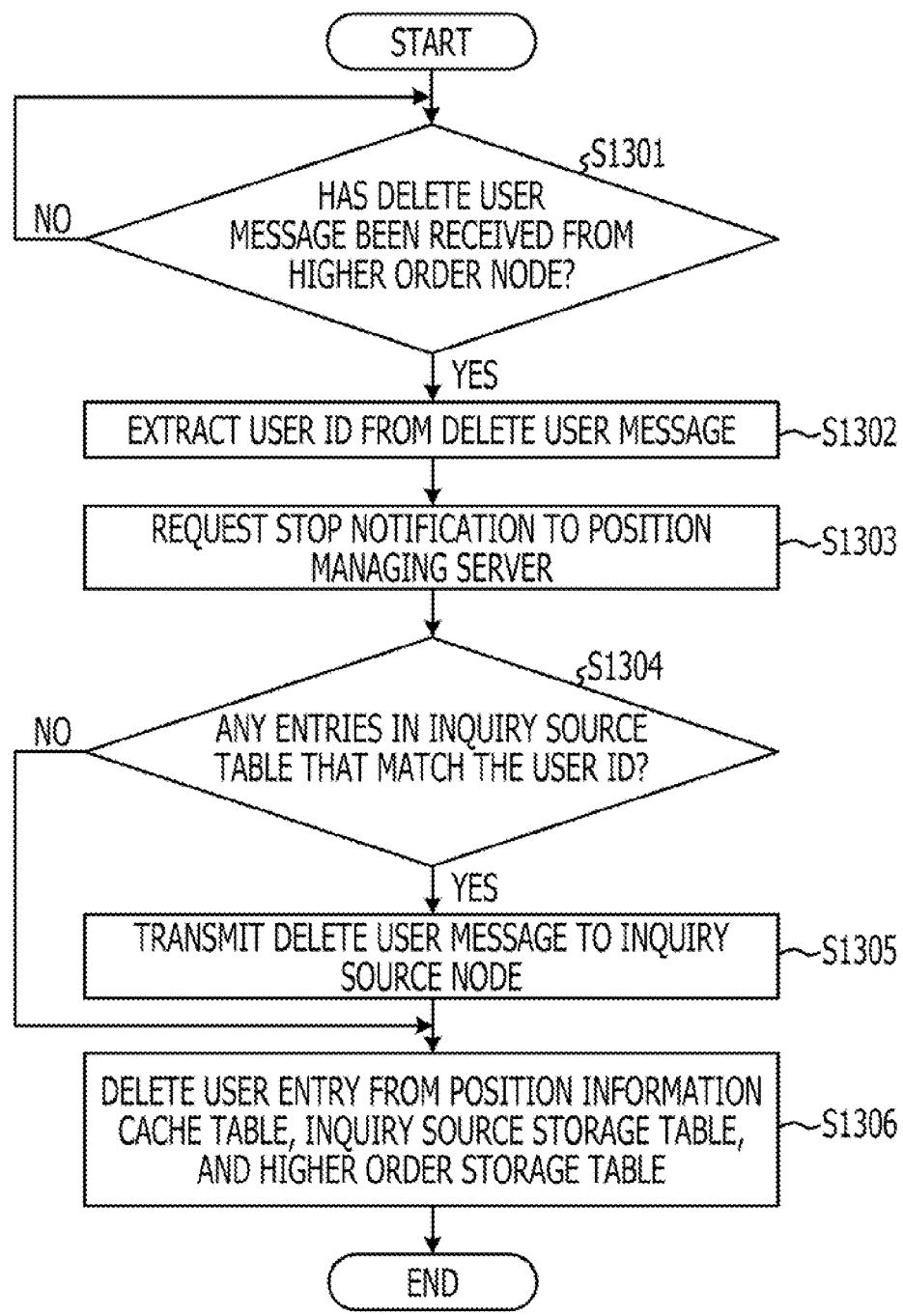
FIG. 41 is a flowchart illustrating process procedures of portable terminal information deleting processing by a representative node according to the sixth embodiment.

Processing Procedures for Portable Terminal Information Deleting Processing by Representative Node According to Sixth Embodiment Next, the processing procedures for portable terminal information deleting processing by the representative node 1200a according to the sixth embodiment will be described with reference to FIG. 41. FIG. 41 is a flowchart illustrating the processing procedures for portable terminal information deleting processing by the representative node 1200a according to the sixth embodiment.

In the case that a delete user message is received from an higher order node (Yes in operation S1301), the position information processing unit 1234 extracts the user ID from the delete user message (operation S1302). Next, in the case that the higher order node is the position managing server 30, the position information request unit 1233 transmits the update notification stop message (operation S1303).

The position information processing unit 1234 determines whether or not the entry matching the user ID is registered in the inquiry source storage table 221 (operation S1304). Consequently, in the case determination is made by the position information processing unit 1234 that the entry matching the user ID is registered in the inquiry source storage table 221 (Yes in operation S1304), the lower order node message transmission unit 1235 executes the processing in operation S1305. That is to say, the lower order node message transmission unit 1235 transmits a delete user message to the inquiry source node (operation S1305). Next, the position information processing unit 1234 deletes the user entry from the position information cache table 222, inquiry source storage table 221, and higher order node storage table 223 (operation S1306), and ends the processing.

On the other hand, in the case determination is made that the entry matching the user ID is not registered in the inquiry source storage table 221 (No in operation S1304), the position information processing unit 1234 executes the processing in operation S1306. That is to say, the position information processing unit 1234 deletes the user entry from the position information cache table 222, inquiry source storage table 221, and higher order node storage table 223 (operation S1306), and ends the processing.

Figure 42:
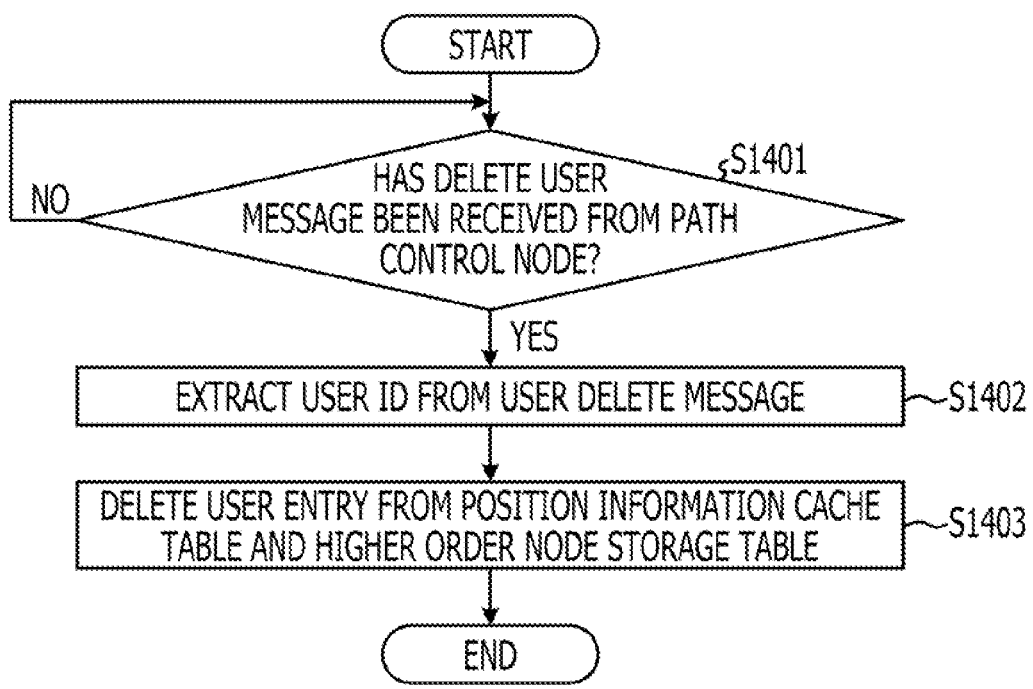
FIG. 42 is a flowchart illustrating processing procedures of portable terminal information deleting processing by an intermediate node according to the sixth embodiment.

Processing Procedures of Portable Terminal Information Deleting Processing by Intermediate Node According to Sixth Embodiment Next, the processing procedures of the portable terminal information deleting processing by the intermediate node 1100a according to the sixth embodiment will be described with reference to FIG. 42. FIG. 42 is a flowchart illustrating the processing procedures of the portable terminal information deleting processing by the intermediate node 1100a according to the sixth embodiment.

In the case that a delete user message is received from a path control node (Yes in operation S1401), the position information processing unit 1136 extracts the user ID from the delete user message (operation S1402). The position information processing unit 1136 deletes the user entry from the position information cache table 121 and the upper node storage table 122 (operation S1403), and ends the processing.

Advantages of Sixth Embodiment

As described above, according to the sixth embodiment, the position managing server 30 having received a notification from the service provider notifies so as to quickly delete the position information of the portable terminal that has discontinued service, whereby the position information cache table can be effectively used.

Seventh Embodiment

Now, the relay system disclosed in the present application may be executed with various types of embodiments other than the above-described embodiments. Thus, other embodiments of the relay system disclosed in the present application will be disclosed with the seventh embodiment.

System Configuration, Etc.

Of the processing described according to the present embodiments as being performed automatically, all or a portion of the processing can also be performed manually. Alternatively, of the processing described according to the present embodiments as being performed manually, all or a portion of the processing can also be performed automatically by known methods. Additionally, the processing procedures, control procedures, and specific names shown in the above document or in the diagrams can be changed optionally except where specified. Also, the information stored in the storage unit shown in the diagram is only an example thereof, and not necessarily will the information as shown in the diagrams be stored.

Also, the various configuration portions shown in the diagrams are functionally conceptual, and are not necessarily configured physically as shown in the diagrams. For example, with the intermediate node 300a the update notification request unit 335 and the position information processing unit 336 may be integrated. Also, position managing server 30 is described as transmitted a "delete user message" to the representative node 1200a, but should not be limited to this. For example, the monitoring system 39 may transmit the "delete user message" to the representative node 1200a.

Further, all or an optional portion of the various processing functions performed by the various devices are realized with the CPU or with a program that is analyzed and executed with the CPU, or may be realized with hardware with a wired logic.

Program

Now, the various types of programs described with the above-described embodiments can be realized by executing a program prepared beforehand with a computer system such as a personal computer or a workstation. Thus, an example of a computer system executing a program that has substantially similar functions as the above-described embodiments will be described below.

Figure 43:
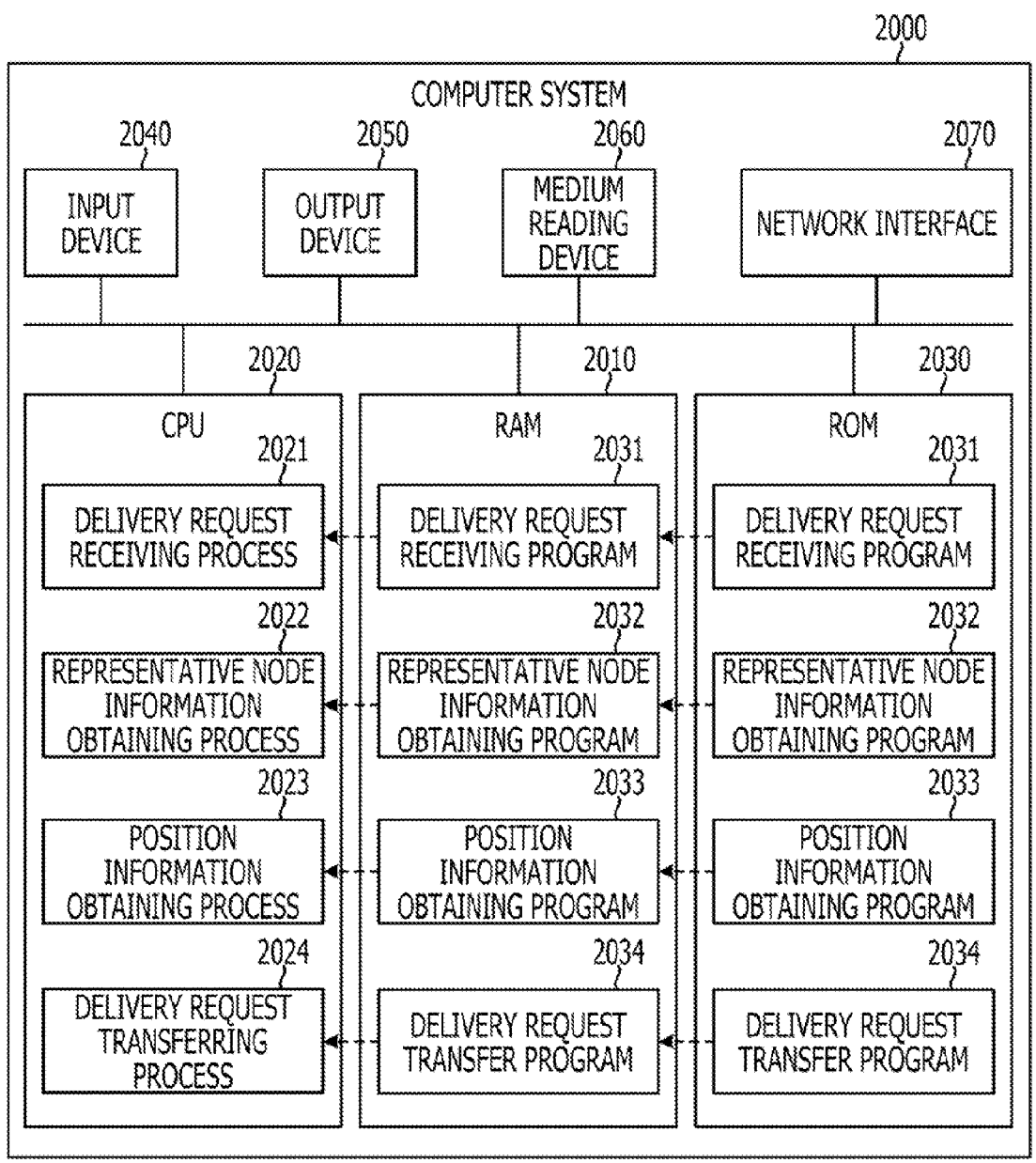
FIG. 43 is a diagram illustrating a computer system that executes a relay server control program.

FIG. 43 is a diagram illustrating a computer system 2000 executing a relay server control program. As shown in FIG. 43, the computer system 2000 has a RAM 2010, CPU 2020 and ROM 2030, input device 2040, output device 2050, medium reading device 2060 and network interface 2070. Programs that perform substantially similar functions as the above-described embodiments are stored beforehand in the ROM 2030. That is to say, as shown in FIG. 43, a delivery request receiving program 2031, representative node information obtaining program 2032, position information obtaining program 2033, and delivery request transfer program 2034 are stored in the ROM 2030 beforehand.

The CPU 2020 reads out the delivery request receiving program 2031, representative node information obtaining program 2032, position information obtaining program 2033, and delivery request transfer program 2034, and expands these in the RAM 2010. The CPU 2020 reads out and executes the programs 2031 through 2034, which as shown in FIG. 43 become various processes. That is to say, the programs 2031 through 2034 become the delivery request receiving process 2021, representative node information obtaining process 2022, position information obtaining process 2023, and delivery request transfer process 2024. Note that the delivery request receiving process 2021 corresponds to the delivery request message receiving unit 131 shown in FIG. 15, and the representative node information obtaining process 2022 corresponds to the position information searching unit 132. Similarly, the position information obtaining process 2023 corresponds to the representative node inquiry unit 133, and the delivery request transfer process 2024 corresponds to the delivery request message transfer unit 134.

Figure 44:
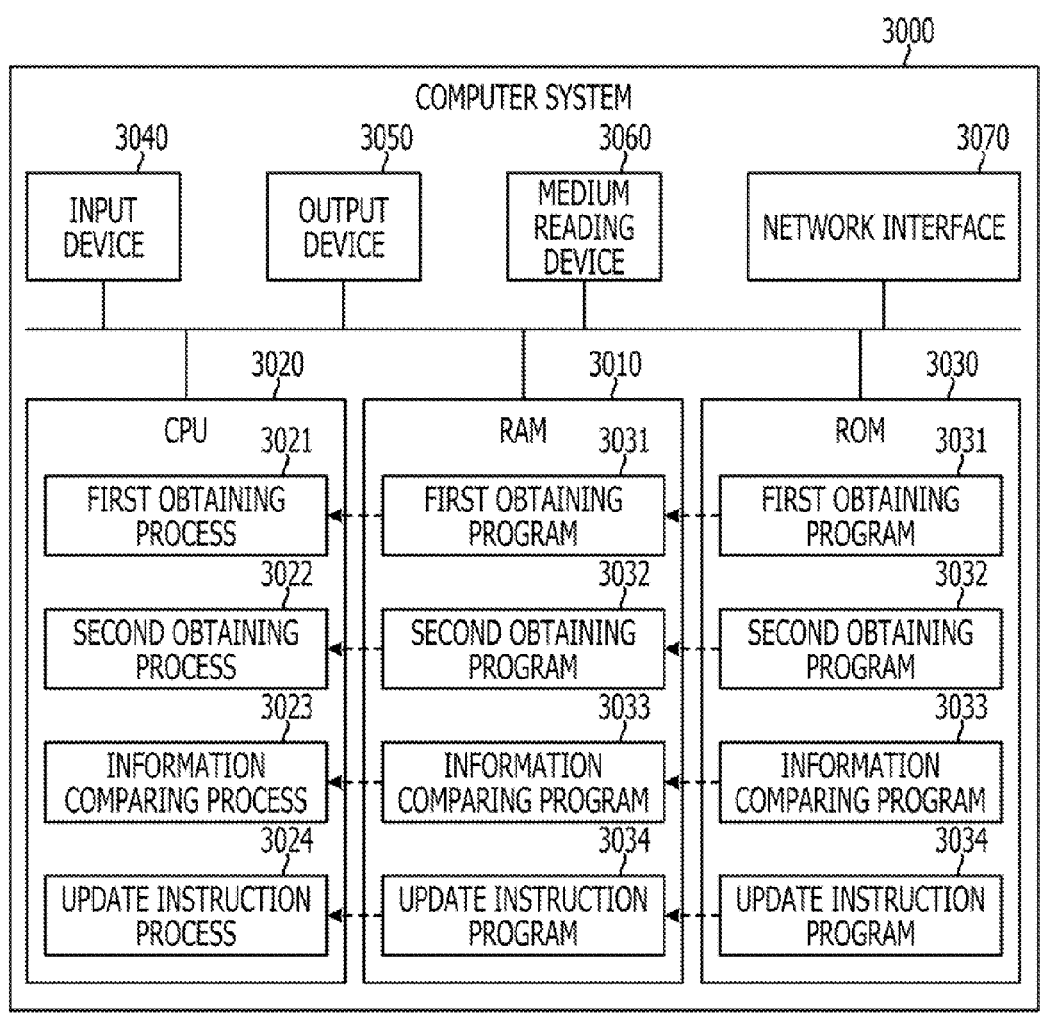
FIG. 44 is a diagram illustrating a computer system that executes a relay node control program.
Figure 45:
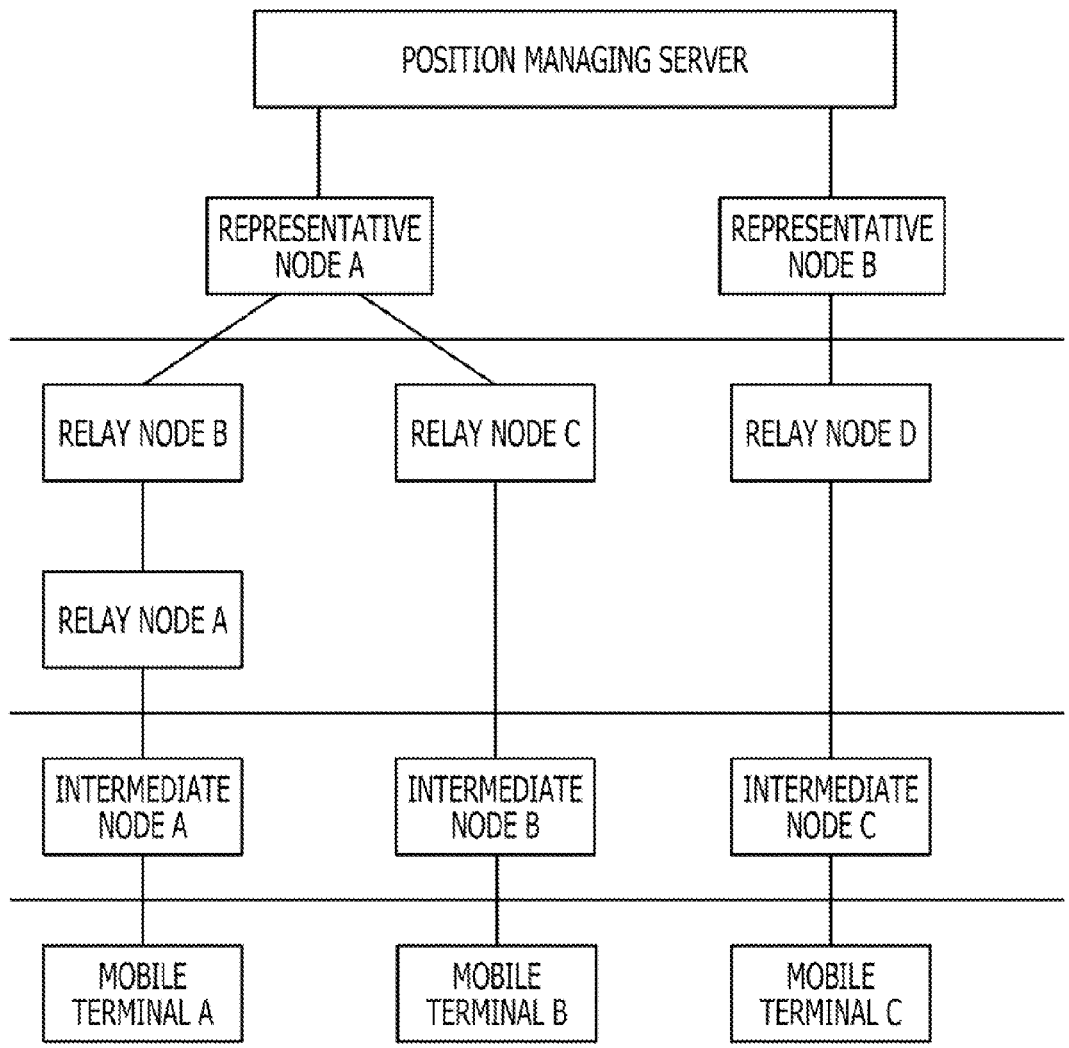
FIG. 45 is a diagram illustrating an example to reduce load on the position managing server by providing a relay control node.
Figure 46:
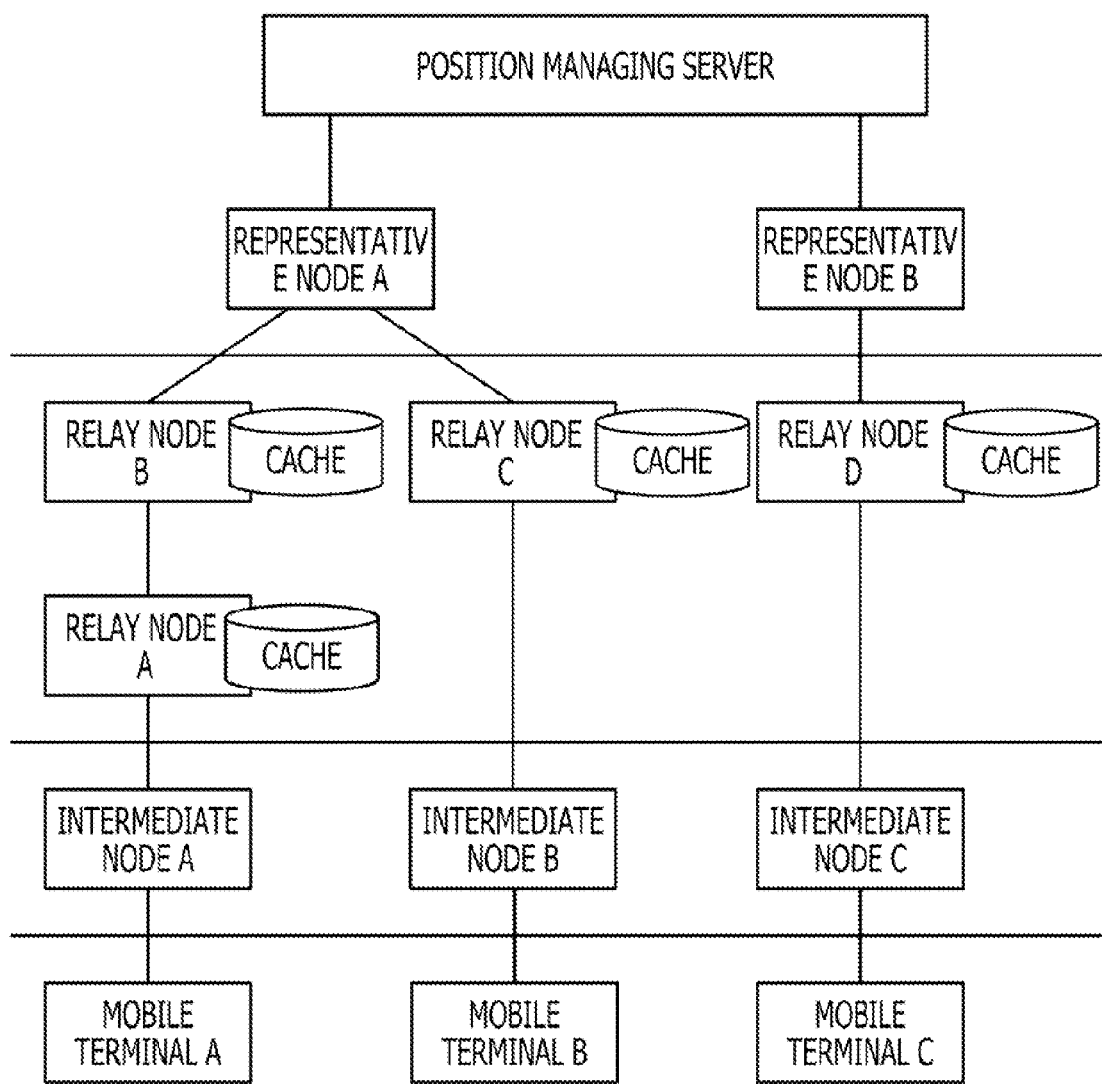
FIG. 46 is a diagram illustrating an example of reducing the load on the position managing server by causing a relay node to have a position information cache.

FIG. 44 is a diagram illustrating a computer system 3000 that executes a relay node control program. As shown in FIG. 44, the computer system 3000 has a RAM 3010, CPU 3020 and ROM 3030, input device 3040, output device 3050, medium reading device 3060, and network interface 3070. Programs that perform substantially similar functions as the above-described embodiments are stored beforehand in the ROM 3030. That is to say, as shown in FIG. 44, a first obtaining program 3031, second obtaining program 3032, information comparing program 3033, and update instructing program 3034 are stored in the ROM 3030 beforehand.

The CPU 3020 reads out the first obtaining program 3031, second obtaining program 3032, information comparing program 3033, and update instructing program 3034, and expands these in the RAM 3010. The CPU 3020 reads out and executes the programs 3031 through 3034, which becomes various processes as shown in FIG. 44. That is to say, the programs 3031 through 3034 become the first obtaining process 3021, second obtaining process 3022, information comparing process 3023, update instructing process 3024. Note that the first obtaining process 3021, second obtaining process 3022, and information comparing process 3023 correspond to the position information processing unit 434 shown in FIG. 16, and the update instructing process 3024 corresponds to the lower order node message transmission unit 235.

Now, the above-mentioned programs 2031 through 2034 are not necessarily stored in the ROM 2030. Also, the above-mentioned programs 3031 through 3034 are not necessarily stored in the ROM 3030. For example, these may be stored in a "portable physical medium" such as a flexible disk (FD), CD-ROM, MO disk, DVD disk, magneto-optical disk, or IC card that is inserted in the computer system 2000 or 3000. Also, these may be stored in a "fixed physical medium" such as a hard disk drive (HDD) that is provided within the computer system 2000. Further, these may be stored in "another computer system" that is connected to the computer system 2000 or 3000 via a public network, the Internet, a LAN (Local Area Network), or WAN (Wide Area Network). The computer system 2000 or 3000 may read out the programs from these and execute the programs.

That is to say, the programs herein are stored in a recording medium such as the above-mentioned "portable physical medium", "fixed physical medium", or "communication medium", so as to be computer-readable. The computer system 2000 or 3000 reads out and executes the programs from such storage medium, thereby realizing functions substantially similar to the above-described embodiments. Note that the programs mentioned in these other embodiments are not limited to being executed by the computer system 2000 or 3000. For example, in the case of the other computer system or server executing a program, or in a case of these collaborating to execute a program, the present invention can be similarly applied.

What is claimed is:

1. A computer-readable, non-transitory medium storing a control program that causes a computer, which is a relay server, to execute a procedure, the procedure comprising:
receiving, from a mobile terminal, a delivery request to a delivery server device that provides an application to the mobile terminal;
obtaining position information of the mobile terminal from a representative device connected to a position managing server that holds the position information of the mobile terminal when the delivery request is received;
transmitting the position information of the mobile terminal obtained from the representative device to a relay device that relays a communication to inquire about the position information of the mobile terminal to the representative device;
updating the position information obtained from the representative device with the position information received from the relay device when the position information of the mobile terminal is received from the relay device; and
transferring the received delivery request to the delivery server device identified based on the updated position information.

2. The computer-readable, non-transitory medium according to claim 1, the procedure further comprising:
storing the position information of the mobile terminal obtained in a storage unit; and
causing the information processing device to execute determination as to whether or not the position information of the mobile terminal transmitted the delivery request is stored in the storage unit when the delivery request is received,
wherein the obtaining processing makes an inquiry to the representative device when the position information of the mobile terminal which has transmitted the delivery request has not been stored in the storage unit.

3. The computer-readable, non-transitory medium according to claim 2, the procedure further comprising:
deleting the position information of the mobile terminal when the delivery request has not been received for a specified amount of time from the mobile terminal wherein the position information is stored in the storage unit.

4. The computer-readable, non-transitory medium according to claim 1, the procedure further comprising:
when the relay device is changed to another relay device, instructing delivery stopping of the position information of the mobile terminal to the relay device and requesting delivery of the position information of the mobile terminal to the another relay device.

5. A computer-readable, non-transitory medium storing a control program that causes a computer which is a relay device to execute a procedure, the procedure comprising:
receiving position information of a mobile terminal from a representative device connected to a position managing server holding the position information of the mobile terminal;
receiving position information of the mobile terminal from a relay server device receiving a delivery request to a delivery server device providing an application from the mobile terminal;
comparing the position information received from the representative device and the position information received from the relay server device; and
when the position information received from the representative device is found to be newer information as a result of the comparison, transmitting the position information received from the representative device to the relay server device, and instructing an update to the position information of the mobile terminal.

6. A relay server comprising:
a receiving unit to receive a delivery request to a delivery server device providing applications to a mobile terminal from the mobile terminal;
a obtaining unit to obtain position information of the mobile terminal from a representative device connected to a position managing server which holds the position information of the mobile terminal when the delivery request is received;
a transmission unit to transmit position information of the obtained mobile terminal to a relay device that relays communication inquiring about the position information of the mobile terminal to the representative device; and
a transferring unit which, when receiving position information of the mobile terminal from the relay device, updates the position information obtained from the representative device with the position information received from the relay device, and transfers the received delivery request to a delivery server device identified based on the updated position information.

7. The relay server according to claim 6, the relay server further comprising:
a storage unit to store position information of the mobile terminal; and
a determining unit to determines, when the delivery request is received, whether or not the position information of the mobile terminal transmitting the delivery request is stored in the storage unit;
wherein, in the case determination is made by the determining unit that the position information of the mobile terminal transmitting the delivery request is not stored in the storage unit, the obtaining unit makes an inquiry to the representative device.

8. The relay server according to claim 7, wherein when the delivery request is not received for a specified amount of time from the mobile terminal wherein the position information is stored in the storage unit, the determining unit deletes the position information of the mobile terminal from the storage unit.

9. The relay server according to claim 6, wherein when the relay device connected to the device itself is changed to another relay device, the transmission unit instructs the delivery stopping of the position information of the mobile terminal to the relay device and requests delivery of the position information of the mobile terminal to the another relay device.

10. A relay server comprising:
a processor configured to execute a procedure, the procedure comprising:
receiving, from a mobile terminal, a delivery request to a delivery server device that provides an application to the mobile terminal;
obtaining position information of the mobile terminal from a representative device connected to a position managing server that holds the position information of the mobile terminal when the delivery request is received;
transmitting the position information of the mobile terminal obtained from the representative device to a relay device that relays a communication to inquire about the position information of the mobile terminal to the representative device; and
updating the position information obtained from the representative device with the position information received from the relay device when the position information of the mobile terminal is received from the relay device, and transferring the received delivery request to the delivery server device identified based on the updated position information.

11. A relay device comprising:
a first receiving unit to receive position information of a mobile terminal, transmitted from a representative device connected to a position managing server holding the position information of the mobile terminal;
a second receiving unit to receive position information of the mobile terminal from a relay server device receiving a delivery request at the delivery server device providing the application, from the mobile terminal;
an information comparing unit to compare the position information received by the first receiving unit and position information received by the second receiving unit; and
an update instruction unit which, when a determination is made that the position information received by the first receiving unit is newer information, transmits the position information received by the first receiving unit to the relay server device, and instructs an update to the position information of the mobile terminal.

12. A relay device comprising:
a processor configured to execute a procedure, the procedure comprising:
receiving position information of a mobile terminal from a representative device connected to a position managing server holding the position information of the mobile terminal;
receiving the position information of the mobile terminal from a relay server device receiving a delivery request to a delivery server device providing an application from the mobile terminal;
comparing the position information received from the representative device and the position information received from the relay server device; and
when the position information received from the representative device is found to be newer information as a result of the comparison, transmitting the position information received from the representative device to the relay server device, and instructing an update to the position information of the mobile terminal.

13. A relay control method executed by a system having a representative device that is connected to a position managing server holding position information of a mobile terminal, a relay server device that is connected to the mobile terminal, and a relay device that is positioned between the relay server device and the representative device, the relay control method comprising:
receiving, by the relay server device, a delivery request to a delivery server device, from the mobile terminal, that provides an application to the mobile terminal;
obtaining, when the delivery request is received, position information of the mobile terminal from the representative device connected to the position managing server holding the position information of the mobile terminal, by the relay server device;
transmitting the obtained position information of the mobile terminal to the relay device, by the relay server device;
when the position information of the mobile terminal is received from the relay device, updating the position information obtained from the representative device with the position information received from the relay device, and transmitting, by the relay server device, the received delivery request to the delivery server device identified based on the update position information;

receiving, by the relay device, the position information of the mobile terminal from the representative device;

receiving, by the relay device, position information of the mobile terminal from the relay server device;

comparing, by the relay device, the position information received from the representative device with the position information received from the relay server device; and when the position information received from the representative device is found to be the newer information as a result of the comparison, transmitting, by the relay device, the position information received from the representative device to the relay service device, and instructs an update of the position information of the mobile terminal.

\* \* \* \* \*